United States Patent
Mizushima et al.

(10) Patent No.: US 9,546,918 B2
(45) Date of Patent: Jan. 17, 2017

(54) SENSOR ELEMENT, FORCE DETECTION DEVICE, ROBOT, ELECTRONIC COMPONENT TRANSPORT DEVICE, ELECTRONIC COMPONENT INSPECTION DEVICE, AND COMPONENT PROCESSING DEVICE

(71) Applicant: Seiko Epson Corporation, Tokyo (JP)

(72) Inventors: Nobuyuki Mizushima, Shiojiri (JP); Toshiyuki Kamiya, Fujimi (JP); Hiroki Kawai, Matsumoto (JP)

(73) Assignee: Seiko Epson Corporation (JP)

( * ) Notice: Subject to any disclaimer, the term of this patent is extended or adjusted under 35 U.S.C. 154(b) by 177 days.

(21) Appl. No.: 14/524,481

(22) Filed: Oct. 27, 2014

(65) Prior Publication Data

US 2015/0120052 A1 Apr. 30, 2015

(30) Foreign Application Priority Data

Oct. 31, 2013 (JP) ................. 2013-227699
Oct. 31, 2013 (JP) ................. 2013-227700
Oct. 31, 2013 (JP) ................. 2013-227701

(51) Int. Cl.
*H01L 41/083* (2006.01)
*G01L 1/16* (2006.01)
*B25J 19/02* (2006.01)

(52) U.S. Cl.
CPC .............. *G01L 1/16* (2013.01); *B25J 19/028* (2013.01)

(58) Field of Classification Search
CPC ............ G01L 23/10; G01L 1/16; G01L 1/162; G01L 9/0022; H01L 41/083; H01L 41/1132; H03H 3/0407; H03H 9/02015; H03H 9/02023; H03H 9/19
USPC ........................................ 310/338, 346, 360
See application file for complete search history.

(56) References Cited

U.S. PATENT DOCUMENTS

| 5,821,432 A | 10/1998 | Sidler et al. |
|---|---|---|
| 2011/0074515 A1 | 3/2011 | Yoshida |
| 2013/0112010 A1 | 5/2013 | Matsumoto et al. |
| 2013/0152700 A1 | 6/2013 | Kamiya et al. |

FOREIGN PATENT DOCUMENTS

| JP | 62-153767 | 7/1987 |
|---|---|---|
| JP | 63-289460 | 11/1988 |
| JP | 10-068665 | 3/1998 |
| JP | 2002-310831 A | 10/2002 |

(Continued)

*Primary Examiner* — Thomas Dougherty
(74) *Attorney, Agent, or Firm* — Harness, Dickey & Pierce, P.L.C.

(57) ABSTRACT

A sensor element includes, when three axes orthogonal to one another are set to be an A-axis, a B-axis, and a C-axis, first piezoelectric plate that is configured to have an X cut quartz crystal plate and outputs a charge in response to an external force along the A-axis direction, second piezoelectric plate that is configured to have a Y cut quartz crystal plate, is stacked in the A-axis direction with the first piezoelectric plate, and outputs a charge in response to the external force in the B-axis direction, and third piezoelectric plate that is configured to have a Y cut quartz crystal plate, is stacked in the A-axis direction so as to interpose the second piezoelectric plate between the first piezoelectric plate and the third piezoelectric plate and be arranged to turn around the A-axis, and outputs a charge in response to the external force in the C-axis direction.

19 Claims, 29 Drawing Sheets

(56) References Cited

FOREIGN PATENT DOCUMENTS

| | | |
|---|---|---|
| JP | 2003-060248 A | 2/2003 |
| JP | 2011-097553 A | 5/2011 |
| JP | 2013-101020 A | 5/2013 |
| JP | 2013-130431 A | 7/2013 |
| JP | 2013-130433 A | 7/2013 |

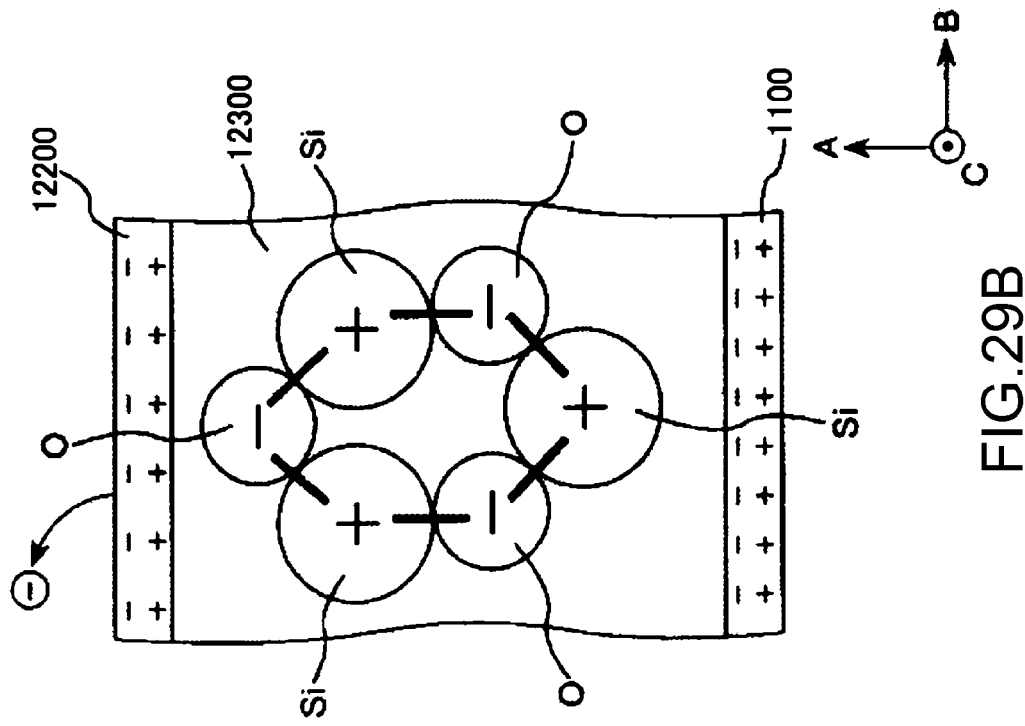
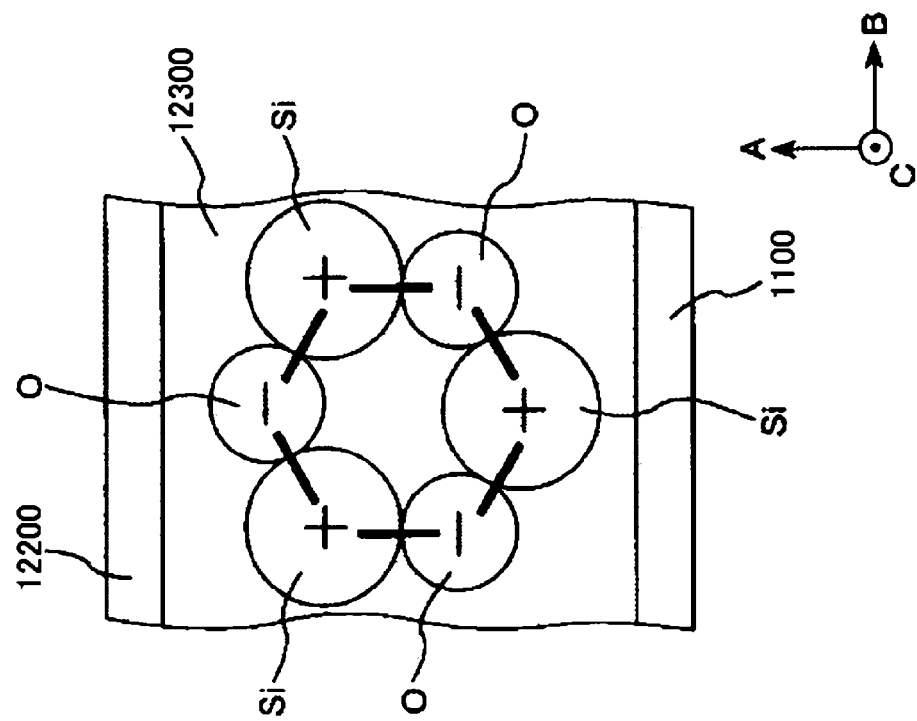

SENSOR ELEMENT, FORCE DETECTION DEVICE, ROBOT, ELECTRONIC COMPONENT TRANSPORT DEVICE, ELECTRONIC COMPONENT INSPECTION DEVICE, AND COMPONENT PROCESSING DEVICE

The entire disclosures of Japanese Patent Application Nos. 2013-227699, filed Oct. 31, 2013, 2013-227700, filed Oct. 31, 2013 and 2013-227701, filed Oct. 31, 2013 are expressly incorporated by reference herein.

BACKGROUND

1. Technical Field

The present invention relates to a sensor element, a force detection device, a robot, an electronic component transport device, an electronic component inspection device, and a component processing device.

2. Related Art

In recent years, an industrial robot has been progressively introduced into production facilities such as factories in order to improve production efficiency. This industrial robot includes an arm which can be driven in one or more axial directions, a hand attached to a distal end of the arm, and an end effector of a component inspection device, a component transport device, and a component processing device. The industrial robot can carry out various tasks such as component manufacturing work including component assembly work, component processing work, and component inspection work, and component transport work.

In this industrial robot, a force detection device is disposed between the arm and the end effector. The force detection device includes a piezoelectric element (charge output element) which outputs a charge in response to an applied external force, and a conversion circuit (converter) which converts the charge output from the piezoelectric element into a voltage, and can detect the external force applied to the piezoelectric element. The industrial robot uses this force detection device so as to detect the external force generated during the component manufacturing work or the component transport work. Based on a detection result, the industrial robot controls the arm and the end effector. As a result, the industrial robot can accurately carry out the component manufacturing work or the component transport work.

As this force detection device, a quartz crystal-type piezoelectric sensor using quartz crystal as the piezoelectric element is widely used (for example, refer to JP-A-10-68665). The quartz crystal-type piezoelectric sensor disclosed in JP-A-10-68665 is widely used in the industrial robot since the quartz crystal-type piezoelectric sensor has excellent characteristics such as a wide dynamic range, high stiffness, high natural frequency, and strong resistance against a load.

However, in this quartz crystal-type piezoelectric element, the charge output from the quartz crystal is weak. Accordingly, it is not possible to ignore influence of output drift which is caused by temperature changes. In particular, even when the external force is not applied, there is a possibility that stress is generated in the quartz crystal by thermal expansion caused by the temperature changes. This stress may cause a possibility that the charge is detected in the quartz crystal-type piezoelectric element even when the external force is not applied.

As described above, according to the quartz crystal-type piezoelectric element in the related art, there is a possibility of a problem such as poor detection accuracy caused by the temperature changes.

SUMMARY

An advantage of some aspects of the invention is to provide a sensor element, a force detection device, a robot, an electronic component transport device, an electronic component inspection device, and a component processing device which can suppress or prevent a problem caused by temperature changes.

The invention can be implemented as the following forms or application examples.

Application Example 1

This application example is directed to a sensor element including, when three axes orthogonal to one another are set to be an A-axis, a B-axis, and a C-axis, at least one first piezoelectric plate that is configured to have an X cut quartz crystal plate and outputs a charge in response to an external force along the A-axis direction, at least one second piezoelectric plate that is configured to have a Y cut quartz crystal plate, that is stacked in the A-axis direction with the first piezoelectric plate, and that outputs a charge in response to the external force in the B-axis direction, and at least one third piezoelectric plate that is configured to have a Y cut quartz crystal plate, that is stacked in the A-axis direction so as to interpose the second piezoelectric plate between the first piezoelectric plate and the third piezoelectric plate, and so as to be arranged to turn around the A-axis, and that outputs a charge in response to the external force in the C-axis direction.

With this configuration, thermal expansion coefficients in the B-axis direction of the first piezoelectric plate and the second piezoelectric plate can be coincident with each other in practice. Accordingly, when the first piezoelectric plate and the second piezoelectric plate expand or contract due to temperature changes, the first piezoelectric plate and the second piezoelectric plate expand or contract by the same amount. As a result, the first piezoelectric plate and the second piezoelectric plate can suppress or prevent compressive stress or tensile stress generated by thermal expansion. Therefore, it is possible to suppress or prevent an output of the charge which is caused by the temperature changes.

Application Example 2

In the sensor element according to the application example described above, it is preferable that the first piezoelectric plate and the second piezoelectric plate have respective thermal expansion coefficients in the B-axis direction which are coincident with each other in practice.

With this configuration, when the first piezoelectric plate and the second piezoelectric plate expand or contract due to temperature changes, the first piezoelectric plate and the second piezoelectric plate expand or contract by the same amount. Accordingly, the first piezoelectric plate and the second piezoelectric plate can suppress or prevent the compressive stress or tensile stress generated by the thermal expansion. Therefore, it is possible to suppress or prevent the output of the charge which is caused by the temperature changes.

Application Example 3

In the sensor element according to the application example described above, it is preferable that the first piezoelectric plate, the second piezoelectric plate, and the third piezoelectric plate respectively have a z-axis which is a crystal axis, an x-axis which is orthogonal to the z-axis, and which is oriented in a direction where the charge is generated when a load is applied, and a y-axis which is orthogonal to the z-axis and the x-axis, and that the y-axis direction of the first piezoelectric plate is coincident with the B-axis direction.

With this configuration, the thermal expansion coefficients in the B-axis direction of the first piezoelectric plate and the second piezoelectric plate can be coincident with each other in practice.

Application Example 4

In the sensor element according to the application example described above, it is preferable that the x-axis direction of the second piezoelectric plate is coincident with the B-axis direction.

With this configuration, the first piezoelectric plate and the second piezoelectric plate can expand or contract by the same amount due to the temperature changes.

Application Example 5

In the sensor element according to the application example described above, it is preferable that in the first piezoelectric plate, the second piezoelectric plate, and the third piezoelectric plate, the respective thermal expansion coefficients in the z-axis direction are smaller than the respective thermal expansion coefficients in the x-axis direction and the y-axis direction.

With this configuration, the thermal expansion coefficients in the B-axis direction of the first piezoelectric plate and the second piezoelectric plate can be reliably coincident with each other in practice.

Application Example 6

In the sensor element according to the application example described above, it is preferable that in the second piezoelectric plate and the third piezoelectric plate, respective thermal expansion coefficients in the B-axis direction are different from each other.

With this configuration, the third piezoelectric plate, the second piezoelectric plate, and the first piezoelectric plate can be stacked in the A-axis direction sequentially in this order.

Application Example 7

In the sensor element according to the application example described above, it is preferable that a plurality of the first piezoelectric plates, the second piezoelectric plates, and the third piezoelectric plates are respectively stacked.

With this configuration, as a plurality of the first piezoelectric plates, the second piezoelectric plates, and the third piezoelectric plates are respectively stacked, the output charge can be increased to that extent. Accordingly, it is possible to improve detection accuracy.

Application Example 8

In the sensor element according to the application example described above, it is preferable that a plurality of the first piezoelectric plates, the second piezoelectric plates, and the third piezoelectric plates are stacked in the direction of the A-axis sequentially in this order.

With this configuration, as a plurality of the first piezoelectric plates, the second piezoelectric plates, and the third piezoelectric plates are respectively stacked, the output charge can be increased to that extent. Accordingly, it is possible to improve the detection accuracy.

Application Example 9

This application example is directed to a sensor element which has three stacked piezoelectric plates whose thermal expansion coefficient in at least one direction out of an x-axis direction, a y-axis direction, and a z-axis direction which are orthogonal to one another is different, and which outputs a charge generated by deformation in respectively different directions. When three directions orthogonal to one another are set to be an A-axis, a B-axis, and a C-axis, the three piezoelectric plates are stacked on one another in the A-axis direction. The three piezoelectric plates have respective thermal expansion coefficients in the B-axis direction which are coincident with one other in practice, so that the charge is not generated even if stress is generated in the B-axis direction due to thermal expansion.

With this configuration, the thermal expansion coefficients in the B-axis direction of the three piezoelectric plates can be coincident with one another in practice. Accordingly, the three piezoelectric plates can suppress or prevent the compressive stress or tensile stress generated by the thermal expansion. Therefore, it is possible to suppress or prevent the output of the charge which is caused by the temperature changes.

Application Example 10

This application example is directed to a force detection device including a sensor element including, when three axes orthogonal to one another are set to be an A-axis, a B-axis, and a C-axis, at least one first piezoelectric plate that is configured to have an X cut quartz crystal plate and outputs a charge in response to an external force along the A-axis direction, at least one second piezoelectric plate that is configured to have a Y cut quartz crystal plate, that is arranged to oppose the first piezoelectric plate, and that outputs a charge in response to the external force along the B-axis direction, and at least one third piezoelectric plate that is configured to have a Y cut quartz crystal plate, that is arranged on a side of the second piezoelectric plate which is opposite to the first piezoelectric plate in a state where the third piezoelectric plate is displaced from the second piezoelectric plate around an axis in a thickness direction of the second piezoelectric plate, and that outputs a charge in response to the external force along the C-axis direction, and an external force detection circuit that detects the external force, based on a voltage output from the sensor element.

With this configuration, it is possible to obtain an advantageous effect which is the same as that of the sensor element according to the application example. Further, it is possible to detect the external force, based on the charge output from the sensor element.

Application Example 11

In the force detection device according to the application example described above, it is preferable that four or more of the sensor elements are disposed.

With this configuration, as four or more of the sensor elements are disposed, it is possible to improve the detection accuracy of the force detection device to that extent.

Application Example 12

This application example is directed to a robot including at least one arm connection body that has a plurality of arms and is formed by rotatably connecting the arms adjacent to each other within the plurality of arms, an end effector that is disposed on a distal end side of the arm connection body, and the force detection device according to the application example, which is disposed between the arm connection body and the end effector, and which detects an external force applied to the end effector.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the robot to detect whether the end effector comes into contact with an obstacle. Therefore, it is possible to easily perform an obstacle avoiding operation and an object damage avoiding operation which are difficult for position control in the related art. Accordingly, it is possible to more safely carry out the work.

Application Example 13

This application example is directed to an electronic component transport device including a grip unit that grips an electronic component, and the force detection device according to the application example, which detects an external force applied to the grip unit.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the electronic component transport device to detect whether the grip unit comes into contact with an obstacle. Therefore, it is possible to easily perform the obstacle avoiding operation and the object damage avoiding operation which are difficult for the position control in the related art. Accordingly, it is possible to more safely carry out the electronic component transport work.

Application Example 14

This application example is directed to an electronic component inspection device including a grip unit that grips an electronic component, an inspection unit that inspects the electronic component, and the force detection device according to the application example, which detects an external force applied to the grip unit.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the electronic component inspection device to detect whether the grip unit comes into contact with an obstacle. Therefore, it is possible to easily perform the obstacle avoiding operation and the object damage avoiding operation which are difficult for the position control in the related art. Accordingly, it is possible to more safely carry out the electronic component inspection work.

Application Example 15

This application example is directed to a component processing device including a tool displacement unit which has a tool mounted thereon and displaces the tool, and the force detection device according to the application example, which detects an external force applied to the tool.

With this configuration, it is possible to obtain an advantageous effect which is the same as that of the sensor element according to the application examples. Then, it is possible to carry out more accurate component processing work by feeding back the external force detected by the force detection device. In addition, the external force detected by the force detection device enables the component processing device to detect whether the tool comes into contact with an obstacle. Therefore, emergency stop is possible when the obstacle comes into contact with the tool. Accordingly, the component processing device can more safely carry out the component processing work.

As another application example, a sensor element includes, when three axes orthogonal to one another are set to be an A-axis, a B-axis, and a C-axis, at least one first piezoelectric plate that is configured to have an X cut quartz crystal plate and outputs a charge in response to an external force along the A-axis direction, at least one second piezoelectric plate that is configured to have a Y cut quartz crystal plate, that is arranged to oppose the first piezoelectric plate, and that outputs a charge in response to the external force along the B-axis direction, at least one third piezoelectric plate that is configured to have a Y cut quartz crystal plate, that is arranged on a side of the first piezoelectric plate which is opposite to the second piezoelectric plate in a state where the third piezoelectric plate is displaced from the second piezoelectric plate around an axis in a thickness direction of the second piezoelectric plate, and that outputs a charge in response to the external force along the C-axis direction, a first electrode layer that is disposed between the first piezoelectric plate and the second piezoelectric plate, and a second electrode layer that is disposed between the first piezoelectric plate and the third piezoelectric plate. A difference between a thermal expansion coefficient in the B-axis direction of the first piezoelectric plate and a thermal expansion coefficient in the B-axis direction of the second electrode layer is equal to or smaller than 10% of the thermal expansion coefficient of the first piezoelectric plate in the B-axis direction.

With this configuration, it is possible to minimize the difference between the thermal expansion coefficient of the first piezoelectric plate in the B-axis direction and the thermal expansion coefficient of the second electrode layer in the B-axis direction. Accordingly, when the first piezoelectric plate and the second electrode layer expand or contract due to the temperature changes, the first piezoelectric plate and the second electrode layer expand or contract by the same amount. As a result, the first piezoelectric plate and the second electrode layer can suppress or prevent the compressive stress or tensile stress generated by the thermal expansion. Therefore, it is possible to suppress or prevent the output of the charge which is caused by the temperature changes.

As another application example, in the sensor element, it is preferable that the second electrode layer is configured to include a material which mainly contains at least one type of metal selected from a group consisting of Ni, Co, and Bi, or an alloy containing these metals.

With this configuration, it is possible to minimize the difference between the thermal expansion coefficient of the first piezoelectric plate in the B-axis direction and the thermal expansion coefficient of the second electrode layer in the B-axis direction.

As another application example, in the sensor element, it is preferable that in the second electrode layer, the thermal expansion coefficient in the A-axis direction, the thermal expansion coefficient in the B-axis direction, and the thermal expansion coefficient in the C-axis direction are equal to one another.

With this configuration, when the second electrode layer is formed, it is possible to form the second electrode layer without considering an orientation of a crystal axis of a configuration material thereof. Accordingly, it is possible to relatively easily form the second electrode layer.

As another application example, in the sensor element, it is preferable that the first piezoelectric plate, the second piezoelectric plate, and the third piezoelectric plate respectively have an x-axis, a y-axis, and a z-axis which are crystal axes orthogonal to one another, and that the y-axis direction of the first piezoelectric plate is coincident with the B-axis direction.

With this configuration, it is possible to arrange the sensor element so that the difference between the thermal expansion coefficient of the first piezoelectric plate in the B-axis direction and the thermal expansion coefficient of the second electrode layer in the B-axis direction is equal to or smaller than 10% of the thermal expansion coefficient of the first piezoelectric plate in the B-axis direction.

As another application example, in the sensor element, it is preferable that in the first piezoelectric plate, the second piezoelectric plate, and the third piezoelectric plate, the respective thermal expansion coefficients in the z-axis direction are smaller than the respective thermal expansion coefficients in the x-axis direction and the y-axis direction.

With this configuration, the thermal expansion coefficients in the B-axis direction of the first piezoelectric plate and the second electrode layer can be reliably coincident with each other in practice.

As another application example, in the sensor element, it is preferable that the first electrode layer is configured to include a material which is the same as that of the second electrode layer.

With this configuration, it is possible to relatively easily form the second electrode layer.

As another application example, in the sensor element, it is preferable that a plurality of the first piezoelectric plates, the second piezoelectric plates, and the third piezoelectric plates are respectively stacked.

With this configuration, as a plurality of the first piezoelectric plates, the second piezoelectric plates, and the third piezoelectric plates are respectively stacked, the output charge can be increased to that extent. Accordingly, it is possible to improve the detection accuracy.

As another application example, in the sensor element, it is preferable that a plurality of the second piezoelectric plates, the first piezoelectric plates, and the third piezoelectric plates are stacked sequentially in the A-axis direction, and that an electrode layer is disposed between the respective first piezoelectric plates, and between the respective second piezoelectric plates and the respective third piezoelectric plates.

With this configuration, as a plurality of the first piezoelectric plates, the second piezoelectric plates, and the third piezoelectric plates are respectively stacked, the output charge can be increased to that extent. Accordingly, it is possible to improve the detection accuracy.

In another application example, a sensor element includes three stacked piezoelectric plates whose thermal expansion coefficient in at least one direction out of an x-axis direction, a y-axis direction, and a z-axis direction which are orthogonal to one another is different, and outputs a charge generated by deformation in respectively different directions. When three directions orthogonal to one another are set to be an A-axis, a B-axis, and a C-axis, the three piezoelectric plates are stacked on one another in the A-axis direction. Electrode layers are respectively disposed between the three piezoelectric plates. A difference between thermal expansion coefficients in the B-axis direction of the three piezoelectric plates and thermal expansion coefficients in the B-axis direction of the electrode layers is equal to or smaller than 10% of the thermal expansion coefficient of the first piezoelectric plate in the B-axis direction.

With this configuration, it is possible to minimize the difference between the thermal expansion coefficient of the three piezoelectric plates in the B-axis direction and the thermal expansion coefficient of the respective electrode layers in the B-axis direction. Accordingly, when the three piezoelectric plates and the respective electrode layers expand or contract due to the temperature changes, the three piezoelectric plates and the respective electrode layers expand or contract by the same amount. As a result, the respective piezoelectric plates and the respective electrode layers can suppress or prevent the compressive stress or tensile stress generated by the thermal expansion. Therefore, it is possible to suppress or prevent the output of the charge which is caused by the temperature changes.

In another application example, a force detection device includes a sensor element and an external force detection circuit. The sensor element includes, when three axes orthogonal to one another are set to be an A-axis, a B-axis, and a C-axis, at least one first piezoelectric plate that is configured to have an X cut quartz crystal plate and outputs a charge in response to an external force along the A-axis direction, at least one second piezoelectric plate that is configured to have a Y cut quartz crystal plate, that is arranged to oppose the first piezoelectric plate, and that outputs a charge in response to the external force along the B-axis direction, at least one third piezoelectric plate that is configured to have a Y cut quartz crystal plate, that is arranged on a side of the first piezoelectric plate which is opposite to the second piezoelectric plate in a state where the third piezoelectric plate is displaced from the second piezoelectric plate around an axis in a thickness direction of the second piezoelectric plate, and that outputs a charge in response to the external force along the C-axis direction, a first electrode layer that is disposed between the first piezoelectric plate and the second piezoelectric plate, and a second electrode layer that is disposed between the first piezoelectric plate and the third piezoelectric plate. A difference between a thermal expansion coefficient in the B-axis direction of the first piezoelectric plate and a thermal expansion coefficient in the B-axis direction of the second electrode layer is equal to or smaller than 10% of the thermal expansion coefficient of the first piezoelectric plate in the B-axis direction. The external force detection circuit detects the external force, based on a voltage output from the sensor element.

With this configuration, it is possible to obtain an advantageous effect which is the same as that of the sensor element according to the application examples. It is possible to detect the external force, based on the charge output from the sensor element.

As another application example, in the force detection device, it is preferable that four or more of the sensor elements are disposed.

With this configuration, as four or more of the sensor element are disposed, it is possible to improve the detection accuracy of the force detection device to that extent.

In another application example, a robot includes at least one arm connection body that has a plurality of arms and is formed by rotatably connecting the arms adjacent to each other within the plurality of arms, an end effector that is disposed on a distal end side of the arm connection body, and the force detection device according to another application example, which is disposed between the arm connection body and the end effector, and which detects an external force applied to the end effector.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the robot to detect whether the end effector comes into contact with an obstacle. Therefore, it is possible to easily perform the obstacle avoiding operation and the object damage avoiding operation which are difficult for the position control in the related art. Accordingly, it is possible to more safely carry out the work.

In another application example, an electronic component transport device includes a grip unit that grips an electronic component, and the force detection device according to another application example, which detects an external force applied to the grip unit.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the electronic component transport device to detect whether the grip unit comes into contact with an obstacle. Therefore, it is possible to easily perform the obstacle avoiding operation and the object damage avoiding operation which are difficult for the position control in the related art. Accordingly, it is possible to more safely carry out the electronic component transport work.

In another application example, an electronic component inspection device includes a grip unit that grips an electronic component, an inspection unit that inspects the electronic component, and the force detection device according to another application example, which detects an external force applied to the grip unit.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the electronic component inspection device to detect whether the grip unit comes into contact with an obstacle. Therefore, it is possible to easily perform the obstacle avoiding operation and the object damage avoiding operation which are difficult for the position control in the related art. Accordingly, it is possible to more safely carry out the electronic component inspection work.

In another application example, a component processing device includes a tool displacement unit which has a tool mounted thereon and displaces the tool, and the force detection device according to another application example, which detects an external force applied to the tool.

With this configuration, it is possible to obtain an advantageous effect which is the same as that of the sensor element according to the application examples. Then, it is possible to carry out more accurate component processing work by feeding back the external force detected by the force detection device. In addition, the external force detected by the force detection device enables the component processing device to detect whether the tool comes into contact with an obstacle. Therefore, emergency stop is possible when the obstacle comes into contact with the tool. Accordingly, the component processing device can more safely carry out the component processing work.

In another application example, a sensor element includes, when three axes orthogonal to one another are set to be an A-axis, a B-axis, and a C-axis, at least one first piezoelectric plate that is configured to have a quartz crystal plate and outputs a charge in response to an external force along the A-axis direction, at least one second piezoelectric plate that is configured to have a quartz crystal plate, and that outputs a charge in response to the external force in the B-axis direction, and at least one third piezoelectric plate that is configured to have a quartz crystal plate, and that outputs a charge in response to the external force in the C-axis direction. As an outer end base material on which a first base material is stacked, the first base material, the first piezoelectric plate, the second piezoelectric plate, the third piezoelectric plate, and a second base material are stacked sequentially in this order so that a thickness direction serves as the A-axis direction. In a thermal expansion coefficient in the B-axis direction, the first base material is disposed so as to be coincident with the first piezoelectric plate in practice. In the thermal expansion coefficient in the B-axis direction, the second base material is disposed so as to be coincident with the third piezoelectric plate in practice.

With this configuration, when the first base material and the second base material expand or contract due to the temperature changes, the first base material and the second base material expand or contract by the same amount as that of the piezoelectric plate adjacent to the first base material and the second base material. As a result, it is possible to suppress or prevent the compressive stress or tensile stress generated by the thermal expansion in the piezoelectric plate adjacent to the first base material and the second base material. Therefore, it is possible to suppress or prevent the output of the charge which is caused by the temperature changes in the first piezoelectric plate configured to have an X plate.

As another application example, in the sensor element, it is preferable that the first piezoelectric plate is an X cut quartz crystal plate, and that each of the second piezoelectric plate and the third piezoelectric plate is a Y cut quartz crystal plate.

With this configuration, the thermal expansion coefficient in the B-axis direction of the first base material and the second base material can be coincident with the thermal expansion coefficient in the B-axis direction of the piezoelectric plate adjacent to the first base material and the second base material in practice.

As another application example, in the sensor element, it is preferable that the first base material and the second base material are configured to have an X cut quartz crystal plate or a Y cut quartz crystal plate.

With this configuration, the thermal expansion coefficient in the B-axis direction of the first base material and the second base material can be reliably coincident with the thermal expansion coefficient in the B-axis direction of the piezoelectric plate adjacent to the first base material and the second base material in practice.

As another application example, in the sensor element, it is preferable that a plurality of the first piezoelectric plates, the second piezoelectric plates, and the third piezoelectric plates are respectively stacked.

With this configuration, as a plurality of the first piezoelectric plates, the second piezoelectric plates, and the third piezoelectric plates are respectively stacked, the output charge can be increased to that extent. Accordingly, it is possible to improve the detection accuracy.

In another application example, a force detection device includes a sensor element and an external force detection circuit. The sensor element includes, when three axes orthogonal to one another are set to be an A-axis, a B-axis, and a C-axis, at least one first piezoelectric plate that is configured to have a quartz crystal plate and outputs a charge in response to an external force along the A-axis direction, at least one second piezoelectric plate that is configured to have a quartz crystal plate, and that outputs a charge in response to the external force in the B-axis direction, and at least one third piezoelectric plate that is configured to have a quartz crystal plate, and that outputs a charge in response to the external force in the C-axis direction. As an outer end base material on which a first base material is stacked, the first base material, the first piezoelectric plate, the second piezoelectric plate, the third piezoelectric plate, and a second base material are stacked sequentially in this order so that a thickness direction serves as the A-axis direction. In a thermal expansion coefficient in the B-axis direction, the first base material is disposed so as to be coincident with the first piezoelectric plate in practice. In the thermal expansion coefficient in the B-axis direction, the second base material is disposed so as to be coincident with the third piezoelectric plate in practice. The external force detection circuit detects the external force, based on a voltage output from the sensor element.

With this configuration, it is possible to obtain an advantageous effect which is the same as that of the sensor element according to the application examples. It is possible to detect the external force, based on the charge output from the sensor element.

As another application example, in the force detection device, it is preferable that four or more of the sensor elements are disposed.

With this configuration, as four or more of the sensor elements are disposed, it is possible to improve the detection accuracy of the force detection device to that extent.

In another application example, a robot includes at least one arm connection body that has a plurality of arms and is formed by rotatably connecting the arms adjacent to each other within the plurality of arms, an end effector that is disposed on a distal end side of the arm connection body, and the force detection device according to another application example, which is disposed between the arm connection body and the end effector, and which detects an external force applied to the end effector.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the robot to detect whether the end effector comes into contact with an obstacle. Therefore, it is possible to easily perform the obstacle avoiding operation and the object damage avoiding operation which are difficult for the position control in the related art. Accordingly, it is possible to more safely carry out the work.

In another application example, an electronic component transport device includes a grip unit that grips an electronic component, and the force detection device according to another application example, which detects an external force applied to the grip unit.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the electronic component transport device to detect whether the grip unit comes into contact with an obstacle. Therefore, it is possible to easily perform the obstacle avoiding operation and the object damage avoiding operation which are difficult for the position control in the related art. Accordingly, it is possible to more safely carry out the electronic component transport work.

In another application example, an electronic component inspection device includes a grip unit that grips an electronic component, an inspection unit that inspects the electronic component, and the force detection device according to another application example, which detects an external force applied to the grip unit.

With this configuration, it is possible to obtain an advantageous effect which is the same as that of the sensor element according to the application examples. Then, it is possible to carry out more accurate work by feeding back the external force detected by the force detection device. In addition, the external force detected by the force detection device enables the electronic component inspection device to detect whether the grip unit comes into contact with an obstacle. Therefore, it is possible to easily perform the obstacle avoiding operation and the object damage avoiding operation which are difficult for the position control in the related art. Accordingly, it is possible to more safely carry out the electronic component inspection work.

In another application example, a component processing device includes a tool displacement unit which has a tool mounted thereon and displaces the tool, and the force detection device according to another application example, which detects an external force applied to the tool.

With this configuration, it is possible to obtain an advantageous effect which is the same as that of the sensor element according to the application examples. Then, it is possible to carry out more accurate component processing work by feeding back the external force detected by the force detection device. In addition, the external force detected by the force detection device enables the component processing device to detect whether the tool comes into contact with an obstacle. Therefore, emergency stop is possible when the obstacle comes into contact with the tool. Accordingly, the component processing device can more safely carry out the component processing work.

BRIEF DESCRIPTION OF THE DRAWINGS

The invention will be described with reference to the accompanying drawings, wherein like numbers reference like elements.

FIG. 6A is a cross-sectional view illustrating a natural state, and FIG. 6B is a cross-sectional view illustrating a state where compressive stress is generated.

FIG. 17A is a cross-sectional view illustrating a natural state, and FIG. 17B is a cross-sectional view illustrating a state where compressive stress is generated.

FIG. 22A is a cross-sectional view illustrating a natural state, and FIG. 22B is a cross-sectional view illustrating a state where compressive stress is generated.

FIG. 25A is a cross-sectional view illustrating a natural state, and FIG. 25B is a cross-sectional view illustrating a state where compressive stress is generated.

FIGS. 29A and 29B are schematic views schematically illustrating an X cut quartz crystal plate of a charge output element in the related art, FIG. 29A is a cross-sectional view illustrating a natural state, and FIG. 29B is a cross-sectional view illustrating a state where compressive stress is generated.

DESCRIPTION OF EXEMPLARY EMBODIMENTS

Hereinafter, preferred embodiments of a sensor element, a force detection device, a robot, an electronic component transport device, an electronic component inspection device, and a component processing device according to an aspect of the invention will be described in detail with reference to the accompanying drawings.

First Embodiment

Figure 1:
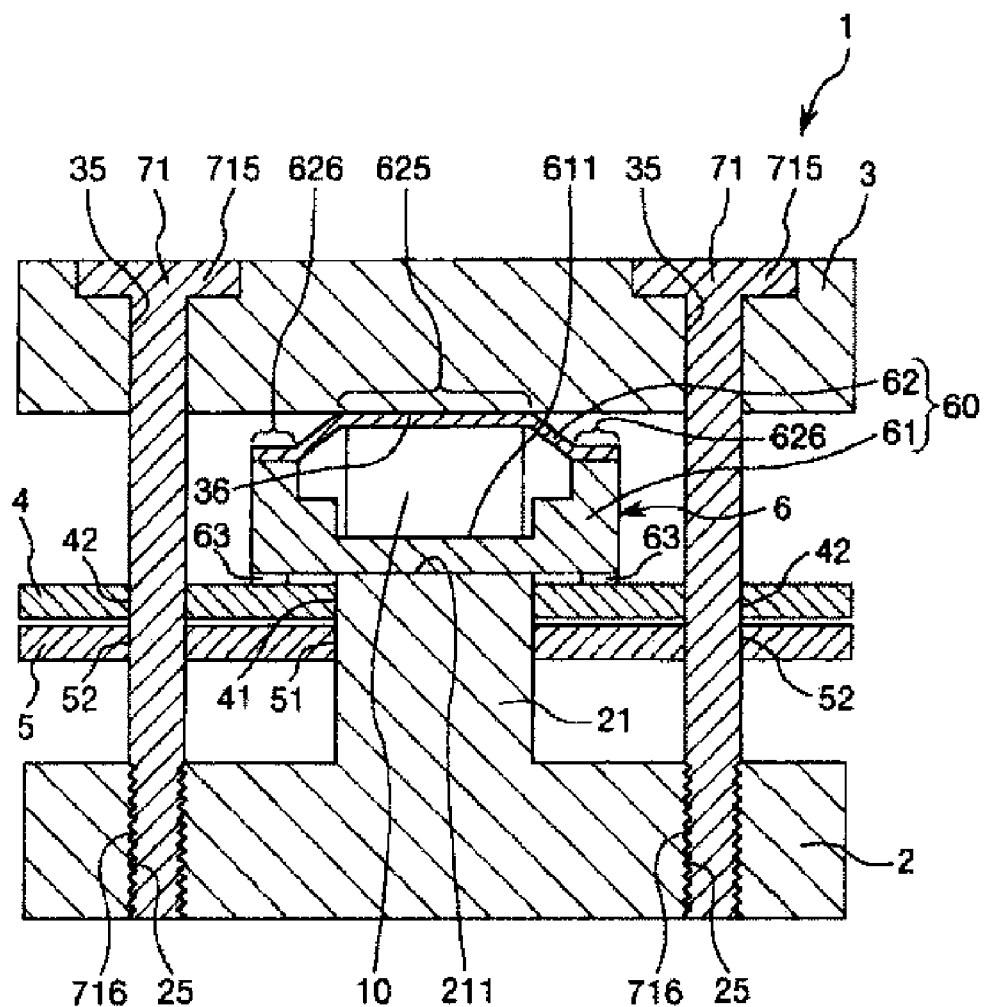
FIG. 1 is a cross-sectional view illustrating a first embodiment of a force detection device (sensor element) according to the invention.
Figure 2:
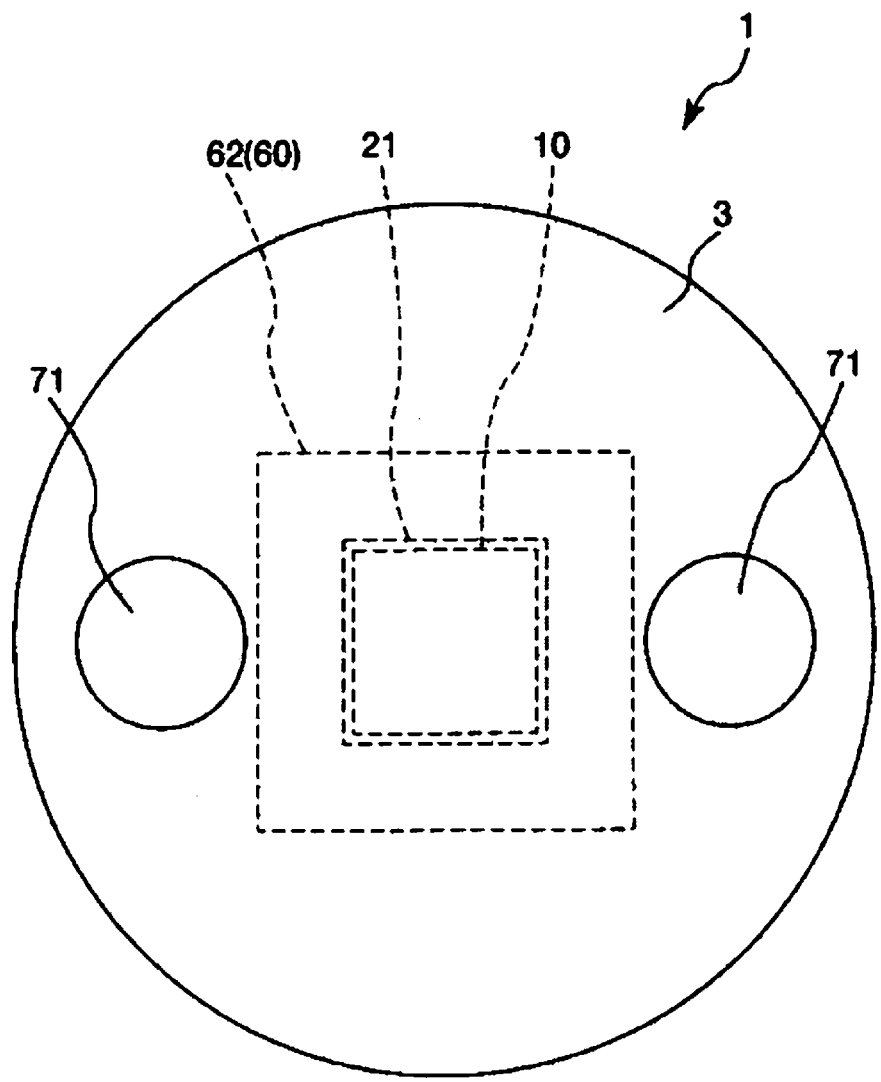
FIG. 2 is a plan view of the force detection device (sensor element) illustrated in FIG. 1.
Figure 3:
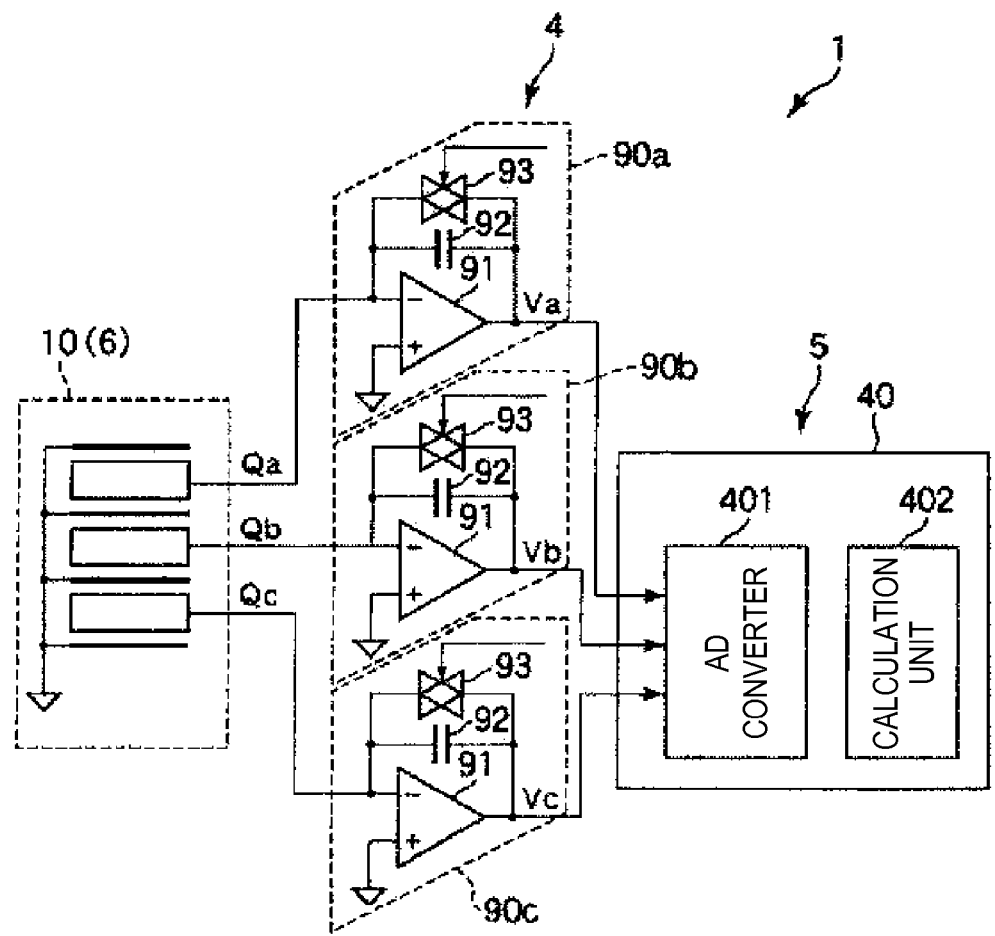
FIG. 3 is a circuit diagram schematically illustrating the force detection device illustrated in FIG. 1.
Figure 4:
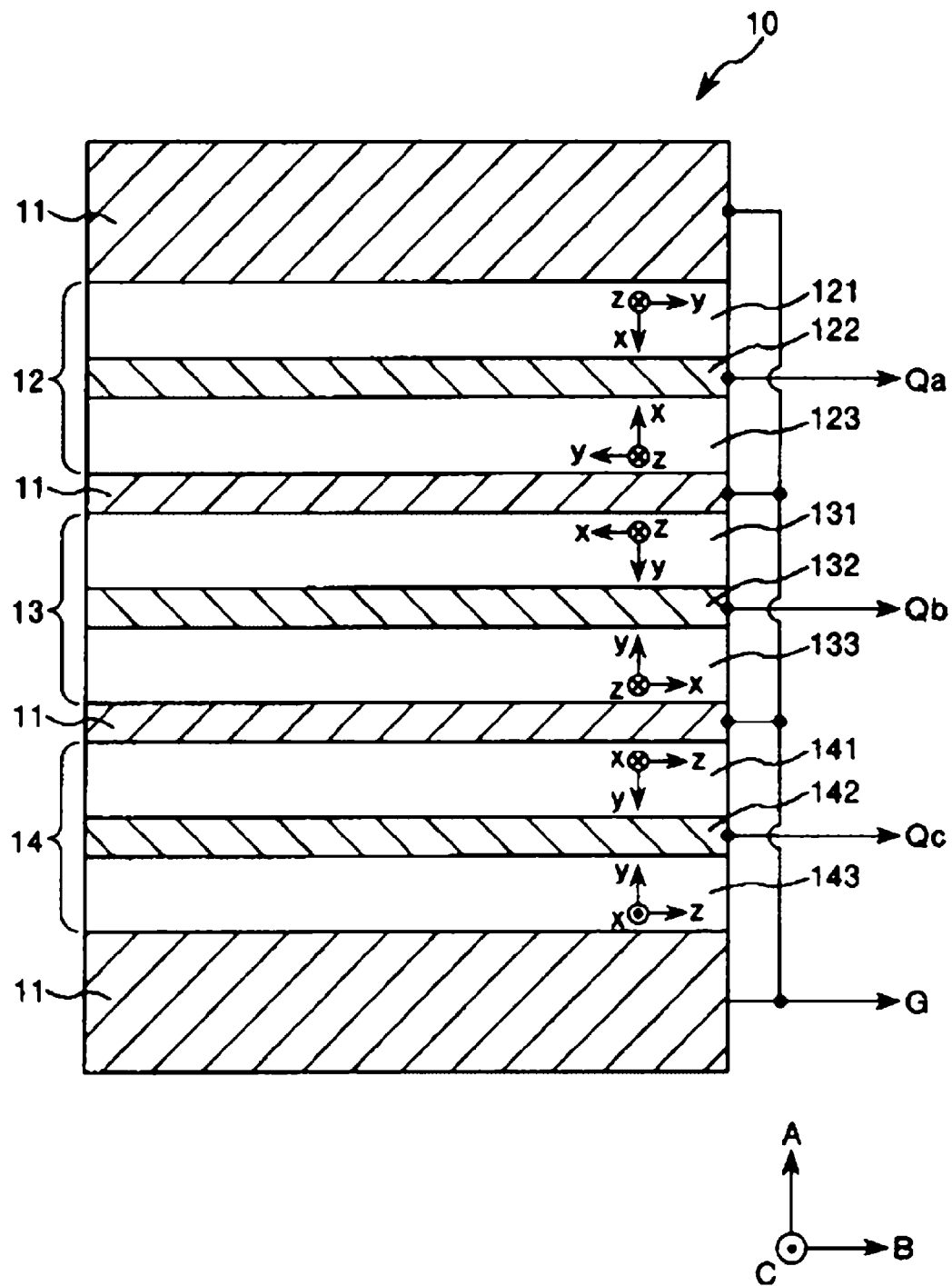
FIG. 4 is a cross-sectional view schematically illustrating a charge output element illustrated in FIG. 1.
Figure 5:
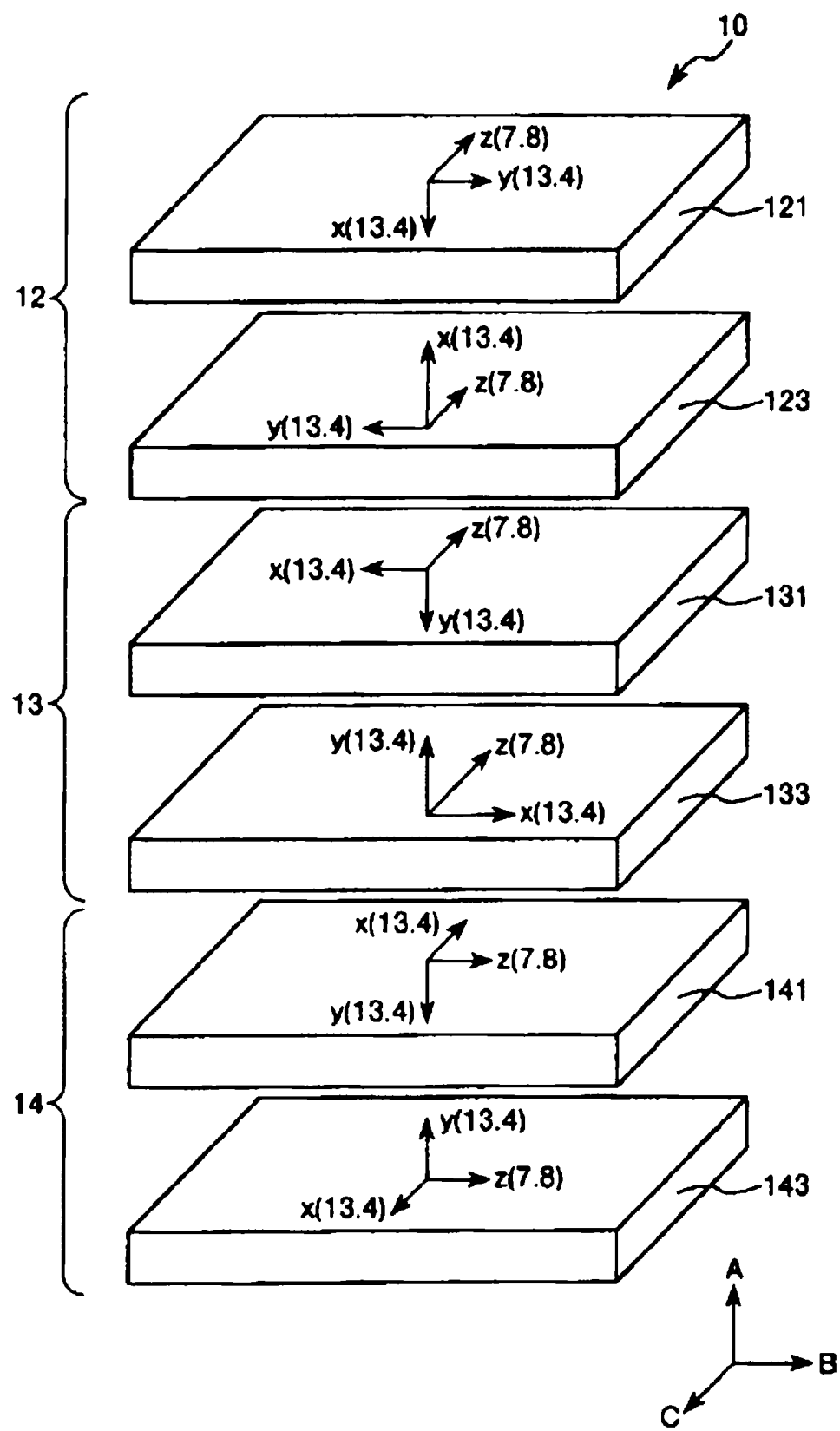
FIG. 5 is an exploded perspective view illustrating a thermal expansion coefficient and a crystal axis of the charge output element illustrated in FIG. 1.
Figure 6A:
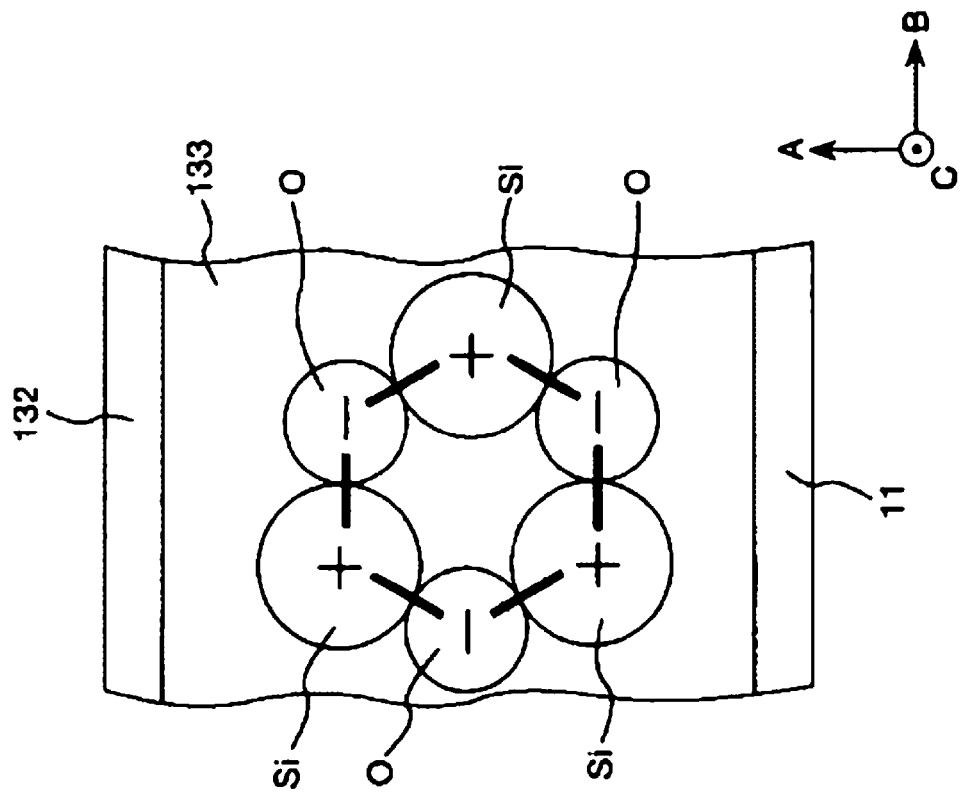
FIGS. 6A and 6B are schematic views schematically illustrating a Y cut quartz crystal plate of the charge output element illustrated in FIG. 1.
Figure 6B:
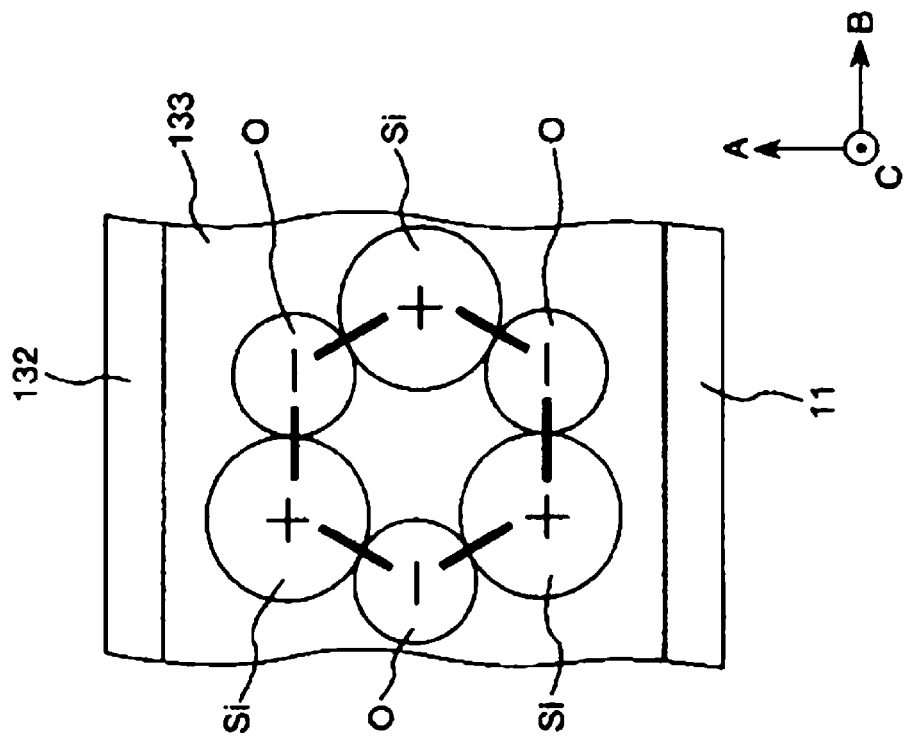

FIG. 1 is a cross-sectional view illustrating a first embodiment of a force detection device (sensor element) according to the invention. FIG. 2 is a plan view of the force detection device (sensor element) illustrated in FIG. 1. FIG. 3 is a circuit diagram schematically illustrating the force detection device illustrated in FIG. 1. FIG. 4 is a cross-sectional view schematically illustrating a charge output element illustrated in FIG. 1. FIG. 5 is an exploded perspective view illustrating a thermal expansion coefficient and a crystal axis of the charge output element illustrated in FIG. 1. FIGS. 6A and 6B are schematic views schematically illustrating a Y cut quartz crystal plate of the charge output element illustrated in FIG. 1, FIG. 6A is a cross-sectional view illustrating a natural state, and FIG. 6B is a cross-sectional view illustrating a state where compressive stress is generated. In FIGS. 1 to 4, an upper side is referred to as "up (upward)", and a lower side is referred to as "down (downward)".

A force detection device 1 includes a sensor device 6 and two pressurizing bolts (fixing members) 71. The sensor device 6 has a first substrate 2, a second substrate 3 which is arranged apart from the first substrate 2 by a predetermined distance, and which opposes the first substrate 2, an analog circuit board (circuit board) 4 which is disposed between the first substrate 2 and the second substrate 3, a digital circuit board 5 which is disposed between the first substrate 2 and the second substrate 3 and is electrically connected to the analog circuit board 4, a charge output element (sensor element) 10 which is mounted on the analog circuit board 4 and outputs a signal in response to an applied external force, and a package 60 which accommodates the charge output element 10.

As illustrated in FIG. 3, the analog circuit board 4 includes a conversion output circuit 90a which converts a charge Qa output from the charge output element 10 of the mounted sensor device 6 into a voltage Va, a conversion output circuit 90b which converts a charge Qb output from the charge output element 10 into a voltage Vb, and a conversion output circuit 90c which converts a charge Qc output from the charge output element 10 into a voltage Vc. In addition, the digital circuit board 5 includes an external force detection circuit 40 which detects the applied external force. The digital circuit board 5 is arranged on the first substrate 2 side of the analog circuit board 4, that is, between the analog circuit board 4 and the first substrate 2.

As illustrated in FIG. 1, the sensor device 6 is arranged on a surface of the second substrate 3 side of the analog circuit board 4, and is interposed between a convex portion (first convex portion, to be described later) 21 disposed in the first substrate 2 and the second substrate 3. That is, the charge output element 10 is pressurized by being interposed between the convex portion 21 and the second substrate 3 via the package 60. Any one of the first substrate 2 and the second substrate 3 may serve as a substrate on a side to which a force is applied. However, in the present embodiment, the second substrate 3 will be described as the substrate on the side to which the force is applied. In addition, the charge output element 10 may be arranged on a surface on the first substrate 2 side of the analog circuit board 4.

Each shape of the first substrate 2, the second substrate 3, the analog circuit board 4, and the digital circuit board 5 is not particularly limited. However, in the embodiment, an outer shape thereof has a circular shape in a plan view of the first substrate 2, the second substrate 3, the analog circuit board 4, and the digital circuit board 5. For example, another outer shape in the plan view of the first substrate 2, the second substrate 3, the analog circuit board 4, and the digital circuit board 5 includes a polygonal shape such as a quadrangular shape and pentagonal shape, or an oval shape. In addition, each configuration material for a portion other than each element and each wire of the first substrate 2, the second substrate 3, and the analog circuit board 4, and a portion other than each element and each wire of the digital circuit board 5 is not particularly limited. For example, as the configuration material, it is possible to use various resin materials and various metal materials.

Sensor Device

The sensor device 6 includes the charge output element 10 and the package 60 which accommodates the charge output element 10.

The package 60 has a base portion (first member) 61 having a concave portion 611, and a lid body (second member) 62 joined to the base portion 61. The charge output element 10 is installed in the concave portion 611 of the base portion 61. The concave portion 611 of the base portion 61 is sealed with the lid body 62. This can protect the charge output element 10, thereby enabling a very reliable force detection device 1 to be provided. An upper surface of the charge output element 10 is in contact with the lid body 62. The lid body 62 of the package 60 is arranged on an upper side, that is, on the second substrate 3 side. The base portion 61 is arranged on a lower side, that is, on the first substrate 2 side. The base portion 61 is fixed to the analog circuit board 4. According to this configuration, the base portion 61 and the lid body 62 are pressurized by being interposed between the convex portion 21 and the second substrate 3. The charge output element 10 is pressurized by being interposed between the base portion 61 and the lid body 62.

A configuration material for the base portion 61 is not particularly limited. For example, it is possible to use an insulating material such as a ceramic. In addition, a configuration material for the lid body 62 is not particularly limited. For example, it is possible to use various metal materials such as stainless steel. The configuration material for the base portion 61 and the configuration material for the lid body 62 may be the same as each other, or may be different from each other.

A shape of the package 60 is not particularly limited. However, for example, the shape is a quadrangular shape in a plan view of the first substrate 2 in the embodiment. For example, another shape in a plan view of the package 60 includes another polygonal shape such as a pentagonal shape, a circular shape, or an oval shape. In addition, for example, when the shape of the package 60 is the polygonal shape, a corner portion thereof may be rounded, or may be cut out obliquely.

In the embodiment, the lid body 62 has a plate shape. A portion between a central portion 625 and an outer peripheral portion 626 thereof is bent, thereby causing the central portion 625 to protrude toward the second substrate 3. A shape of the central portion 625 is not particularly limited. However, in the embodiment, the central portion 625 has a shape which is the same as that of the charge output element 10, that is, a quadrangular shape, in a plan view of the first substrate 2. Any one of an upper surface and a lower surface of the central portion 625 of the lid body 62 is a flat surface.

Multiple terminals 63 which are electrically connected to the charge output element 10 are disposed in an end portion on a lower surface of the base portion 61 of the package 60. The terminals 63 are respectively electrically connected to the analog circuit board 4, thereby electrically connecting the charge output element 10 and the analog circuit board 4 to each other. The number of the terminals 63 is not particularly limited. However, in the embodiment, the number is four, that is, the terminals 63 are respectively disposed at four corner portions of the base portion 61.

The charge output element 10 is accommodated inside the package 60. The charge output element 10 will be described in detail later.

Conversion Output Circuit

Conversion output circuits 90a, 90b, and 90c are connected to the charge output element 10. The conversion output circuit 90a has a function of converting the charge Qa output from the charge output element 10 into the voltage Va. The conversion output circuit 90b has a function of converting the charge Qb output from the charge output element 10 into the voltage Vb. The conversion output circuit 90c has a function of converting the charge Qc output from the charge output element 10 into the voltage Vc. The conversion output circuits 90a, 90b, and 90c are the same as one another. Accordingly, hereinafter, the conversion output circuit 90c will be described as a representative example.

The conversion output circuit 90c has a function of converting the charge Qc output from the charge output element 10 into the voltage Vc and outputting the voltage Vc. The conversion output circuit 90c has an operational amplifier 91, a capacitor 92, and a switching element 93. A first input terminal (negative input) of the operational amplifier 91 is connected to an output electrode layer 122 of the charge output element 10, and a second input terminal (positive input) of the operational amplifier 91 is connected to the ground (reference potential point). In addition, an output terminal of the operational amplifier 91 is connected to an external force detection circuit 40. The capacitor 92 is connected to a portion between the first input terminal and the output terminal of the operational amplifier 91. The switching element 93 is connected to the portion between the first input terminal and the output terminal of the operational amplifier 91, and is connected to the capacitor 92 in parallel. In addition, the switching element 93 is connected to a drive circuit (not illustrated). The switching element 93 performs a switching operation in response to on/off signals output from the drive circuit.

When the switching element 93 is turned off, the charge Qc output from the charge output element 10 is accumulated in the capacitor 92 having a capacitance C1, and is output to the external force detection circuit 40 as the voltage Vc. Then, when the switching element 93 is turned on, both terminals of the capacitor 92 are short-circuited. As a result, the charge Qc accumulated in the capacitor 92 is discharged to become zero coulombs. Accordingly, a voltage V output to the external force detection circuit 40 becomes zero volts. The operation in which the switching element 93 is turned on is referred to as resetting of the conversion output circuit 90c. The voltage Vc output from the ideal conversion output circuit 90c is proportional to an accumulation amount of the charge Qc output from the charge output element 10.

For example, the switching element 93 is a semiconductor switching element such as a metal oxide semiconductor field effect transistor (MOSFET). The semiconductor switching element is smaller and lighter than a mechanical switch. Therefore, the semiconductor switching element is advantageously used in allowing the force detection device 1 to be smaller and lighter. Hereinafter, as a representative example, a case will be described in which the MOSFET is used as the switching element 93.

The switching element 93 has a drain electrode, a source electrode, and a gate electrode. Any one of the drain electrode and the source electrode of the switching element 93 is connected to the first input terminal of the operational amplifier 91, and the other one of the drain electrode and the source electrode is connected to the output terminal of the operational amplifier 91. In addition, the gate electrode of the switching element 93 is connected to a drive circuit (not illustrated).

The same drive circuit may be connected to the switching element 93 of the respective conversion output circuits 90a, 90b, and 90c, or respectively different drive circuits may be connected thereto. All synchronized on/off signals are input from the drive circuit to each switching element 93. In this manner, operations of the switching elements 93 of the respective conversion output circuits 90a, 90b, and 90c are synchronized. That is, on/off timings of the switching elements 93 of the respective conversion output circuits 90a, 90b, and 90c are coincident with one another.

External Force Detection Circuit

The external force detection circuit 40 has a function of detecting an applied external force, based on the voltage Va output from the conversion output circuit 90a, the voltage Vb output from the conversion output circuit 90b, and the voltage Vc output from the conversion output circuit 90c. The external force detection circuit 40 has an AD converter 401 connected to the conversion output circuits 90a, 90b, and 90c, and a calculation unit 402 connected to the AD converter 401.

The AD converter 401 has a function of converting analog signals of the voltages Va, Vc, and Vb into digital signals.

The voltages Va, Vc, and Vb converted into the digital signals by the AD converter 401 are input to the calculation unit 402.

That is, when the external force is applied so that relative positions of the first substrate 2 and the second substrate 3 are displaced from each other in the A-axis direction, the AD converter 401 outputs the voltage Va. Similarly, when the external force is applied so that the relative positions of the first substrate 2 and the second substrate 3 are displaced from each other in the B-axis direction, the AD converter 401 outputs the voltage Vb. In addition, when the external force is applied so that the relative positions of the first substrate 2 and the second substrate 3 are displaced from each other in the C-axis direction, the AD converter 401 outputs the voltage Vc.

The calculation unit 402 performs various processes such as correction for eliminating a difference in sensitivities between the respective conversion output circuits 90a, 90b, and 90c, for example, on the digitally converted voltages Va, Vc, and Vb. Then, the calculation unit 402 outputs three signals which are proportional to the accumulated amount of the charges Qa, Qc, and Qb output from the charge output element 10. The three signals correspond to three axial forces (shearing force, compressive force, and tensile force) applied to the charge output element 10. Accordingly, the force detection device 1 can detect the three axial forces applied to the charge output element 10.

As illustrated in FIGS. 1 and 2, in the force detection device 1, the convex portion (first convex portion) 21 is disposed in the first substrate 2. The convex portion 21 is located inside the first substrate 2 and the second substrate 3. A surface of the first substrate 2 and a surface of the second substrate 3 oppose each other by leaving a distance therebetween. An upper surface (surface opposing the second substrate 3) 211 of the convex portion 21 is a flat surface. The convex portion 21 may be formed integrally with the first substrate 2, or may be formed of a separate member. A configuration material for the convex portion 21 is not particularly limited. For example, it is possible to employ the configuration material which is the same as that of the first substrate 2.

A position of the convex portion 21 is not particularly limited. However, in the embodiment, the convex portion 21 is arranged in the central portion of the first substrate 2.

A shape of the convex portion 21 is not particularly limited. However, in the embodiment, the convex portion 21 has a shape which is the same as that of the charge output element 10 in a plan view of the first substrate 2, that is, a quadrangular shape. Another shape of the convex portion 21 in the plan view includes a polygonal shape such as a quadrangular shape and pentagonal shape, or an oval shape.

A hole 41 into which the convex portion 21 is inserted is formed in a portion where the charge output element 10 of the analog circuit board 4 is arranged, that is, in the central portion. The hole 41 serves as a through-hole for penetrating the analog circuit board 4. A shape of the hole 41 is not particularly limited. However, in the embodiment, the hole 41 has a shape which is the same as that of the convex portion 21 in the plan view of the first substrate 2, that is, a quadrangular shape. The analog circuit board 4 is supported by the convex portion 21.

Similarly, a hole 51 into which the convex portion 21 is inserted is formed in a portion where the charge output element 10 of the digital circuit board 5 is arranged, that is, in the central portion. A shape of the hole 51 is not particularly limited. However, in the embodiment, the hole 51 has a shape which is the same as that of the convex portion 21 in the plan view of the first substrate 2, that is, a quadrangular shape. The digital circuit board 5 is supported by the convex portion 21.

Two holes 42 into which two pressurizing bolts 71 are inserted are formed in the analog circuit board 4. Similarly, two holes 52 into which two pressurizing bolts 71 are inserted are formed in the digital circuit board 5.

The convex portion 21 is inserted into the hole 41 of the analog circuit board 4 and the hole 51 of the digital circuit board 5, and protrudes toward the charge output element 10. Then, the sensor device 6 is interposed between the convex portion 21 and the second substrate 3. In this manner, the charge output element 10 is interposed between the convex portion 21 and the second substrate 3 via the package 60. A lower surface (surface opposing the first substrate 2) 36 of the second substrate 3 is a flat surface. The lower surface 36 comes into contact with the central portion of the lid body 62 of the sensor device 6, and the upper surface 211 of the convex portion 21 comes into contact with the base portion 61.

Dimensions of the convex portion 21 are not particularly limited. However, in the plan view of the first substrate 2, it is preferable that an area of the convex portion 21 be equal to or larger than an area of the charge output element 10, and more preferably larger than the area of the charge output element 10. In the illustrated configuration, the area of the convex portion 21 is larger than the area of the charge output element 10. Then, the charge output element 10 is arranged inside the convex portion 21 in the plan view of the first substrate 2 (when viewed in a direction perpendicular to the first substrate 2). A center line of the charge output element 10 and a center line of the convex portion 21 are coincident with each other. In this case, it is preferable that the charge output element 10 do not protrude from the convex portion 21 in the plan view of the first substrate 2. This can pressurize the entire charge output element 10. In addition, during the force detection, the external force is applied to the entire charge output element 10, thereby enabling more accurate force detection.

The first substrate 2 and the second substrate 3 are fixed by the two pressurizing bolts 71. "Fixing" is performed by the pressurizing bolts 71 while two fixing objects are allowed to mutually have a predetermined movement amount. Specifically, the first substrate 2 and the second substrate 3 are fixed by the two pressurizing bolts 71 while the first substrate 2 and the second substrate 3 are allowed to mutually have a predetermined movement amount in a surface direction of the second substrate 3. This is similarly applied to the other embodiments.

The respective pressurizing bolts 71 are arranged so that heads 715 thereof are respectively located on the second substrate 3 side. The respective pressurizing bolts 71 are inserted from a hole 35 formed in the second substrate 3, and are inserted into the hole 42 of the analog circuit board 4 and the hole 52 of the digital circuit board 5. A male screw 716 thereof is screwed into a female screw 25 formed in the first substrate 2. Then, pressure having a predetermined magnitude in the Z-axis direction (refer to FIG. 4) is applied to the charge output element 10 by the respective pressurizing bolts 71, that is, the charge output element 10 is pressurized. The pressurizing magnitude is not particularly limited, and may be appropriately set.

A position of the respective pressurizing bolts 71 is not particularly limited. However, in the embodiment, the respective pressurizing bolts 71 are arranged at equal angular intervals (intervals of 180°) along a circumferential direction of the first substrate 2, the second substrate 3, the analog circuit board 4, and the digital circuit board 5, that is, so as to oppose each other via the charge output element 10 in a plan view of the second substrate 3. This enables the first substrate 2 and the second substrate 3 to be fixed with good balance. In addition, the respective charge output elements 10 can be pressurized with good balance. The number of the pressurizing bolts 71 is not limited to two. For example, the number may be three or more.

A configuration material for the respective pressurizing bolts 71 is not particularly limited. For example, it is possible to employ various resin materials or various metal materials.

As described above, according to the force detection device 1, the analog circuit board 4 and the digital circuit board 5 are disposed between the first substrate 2 and the second substrate 3, thereby enabling the device to be smaller.

The sensor device 6 can be interposed between the convex portion 21 and the second substrate 3 without using the analog circuit board 4 and the digital circuit board 5, that is, the charge output element 10 is interposed therebetween via the package 60. This can sufficiently pressurize the charge output element 10, and can improve accuracy in force detection.

The central portion 625 of the lid body 62 of the package 60 protrudes toward the second substrate 3. Even if the lower surface 36 of the second substrate 3 is a flat surface, the charge output element 10 can be sufficiently pressurized. In addition, it is possible to prevent a possibility that the external force is unlikely to be applied thereto during the force detection. Then, since the lower surface 36 of the second substrate 3 is a flat surface, it is not necessary to perform alignment between the second substrate 3 and the charge output element 10 during manufacture. Accordingly, it is possible to easily manufacture the force detection device 1.

Charge Output Element

The charge output element 10 has a function of outputting the three charges Qa, Qb, and Qc in response to the respective external forces applied (received) along the three axes (A-axis, B-axis, and C-axis) which are orthogonal to one another.

A shape of the charge output element 10 is not particularly limited. However, in the embodiment, the charge output element 10 has a quadrangular shape in the plan view of the first substrate 2, that is, when viewed in a direction perpendicular to the first substrate 2. For example, another outer shape of the charge output element 10 in the plan view includes another polygonal shape such as a pentagonal shape, a circular shape, or an oval shape.

As illustrated in FIG. 4, the charge output element 10 has four ground electrode layers 11 which are connected to the ground (reference potential point), a first sensor 12 which outputs the charge Qa in response to the external force (compressive force/tensile force) parallel to the A-axis, a second sensor 13 which outputs the charge Qb in response to the external force (shearing force) parallel to the B-axis, and a third sensor 14 which outputs the charge Qc in response to the external force (shearing force) parallel to the C-axis. The ground electrode layers 11 and the respective sensors 12, 13, and 14 are alternately stacked on one another. In FIG. 4, a stacking direction of the ground electrode layers 11 and the respective sensors 12, 13, and 14 is set to be the A-axis direction, and directions orthogonal to the A-axis direction and orthogonal to each other are respectively set to be the B-axis direction and the C-axis direction.

The ground electrode layer 11 is an electrode which is connected to the ground (reference potential point). A configuration material for the ground electrode layer 11 is not particularly limited. However, for example, it is preferable to employ gold, titanium, aluminum, copper, iron, or an alloy containing these materials. Among these materials, it is particularly preferable to employ stainless steel which is an alloy containing iron. The ground electrode layer 11 configured to include stainless steel has excellent durability and corrosion resistance.

The first sensor 12 has a function of outputting the charge Qa in response to the external force (compressive force/tensile force) applied (received) along the A-axis. The first sensor 12 is configured to output a positive charge in response to the compressive force parallel to the A-axis and to output a negative charge in response to the tensile force parallel to the A-axis.

The first sensor 12 has a first piezoelectric layer (first piezoelectric plate) 121, a second piezoelectric layer (first piezoelectric plate) 123 which is disposed to oppose the first piezoelectric layer 121, and an output electrode layer 122 which is disposed between the first piezoelectric layer 121 and the second piezoelectric layer 123 and outputs the charge Qa.

The first piezoelectric layer 121 has an x-axis, a y-axis, and a z-axis which are three crystal axes orthogonal to one another. The x-axis direction represents an axis oriented in a direction in which the charge is generated when a load is applied thereto (hereinafter, the same is applied to the other piezoelectric layers). In the first piezoelectric layer 121, the x-axis direction and the A-axis direction are coincident with each other, the y-axis direction and the B-axis direction are coincident with each other, and the z-axis direction and the C-axis direction are coincident with each other.

If the compressive force parallel to the A-axis is applied to a surface of the first piezoelectric layer 121, the charge is induced inside the first piezoelectric layer 121 by a piezoelectric effect. As a result, the positive charge is gathered near a surface on the output electrode layer 122 side of the first piezoelectric layer 121, and the negative charge is gathered near a surface on the ground electrode layer 11 side of the first piezoelectric layer 121. Similarly, if the tensile force parallel to the A-axis is applied to the surface of the first piezoelectric layer 121, the negative charge is gathered near the surface on the output electrode layer 122 side of the first piezoelectric layer 121, and the positive charge is gathered near the surface on the ground electrode layer 11 side of the first piezoelectric layer 121.

The second piezoelectric layer 123 has the crystal axes which are the same as those of the first piezoelectric layer 121, and is arranged in a state where the first piezoelectric layer 121 is rotated around the C-axis by 180°.

If the compressive force parallel to the A-axis is applied to a surface of the second piezoelectric layer 123, the charge is induced inside the second piezoelectric layer 123 by the piezoelectric effect. As a result, the positive charge is gathered near a surface on the output electrode layer 122 side of the second piezoelectric layer 123, and the negative charge is gathered near a surface on the ground electrode layer 11 side of the second piezoelectric layer 123. Similarly, if the tensile force parallel to the A-axis is applied to the surface of the second piezoelectric layer 123, the negative charge is gathered near the surface on the output electrode layer 122 side of the second piezoelectric layer 123, and the positive charge is gathered near the surface on the ground electrode layer 11 side of the second piezoelectric layer 123.

A configuration material for the first piezoelectric layer 121 and the second piezoelectric layer 123 includes quartz crystal, topaz, barium titanate, lead titanate, lead zirconate titanate (PZT: Pb(Zr, Ti)O3), lithium niobate, lithium tantalate, and the like. Among these materials, it is particularly preferable to employ quartz crystal. The reason for this is that the piezoelectric layer configured to have the quartz crystal has excellent characteristics in a wide dynamic range, strong stiffness, high natural frequency, and high load resistance performance.

The piezoelectric layers such as the first piezoelectric layer 121 and the second piezoelectric layer 123 which generate the charge with respect to the external force (compressive force/tensile force) perpendicular to the surface direction of the layer are configured to have an X cut quartz crystal plate (X plate) in the embodiment.

The output electrode layer 122 has a function of outputting the positive charge or the negative charge generated inside the first piezoelectric layer 121 and inside the second piezoelectric layer 123, as the charge Qb. As described above, if the compressive force parallel to the A-axis is applied to the surface of the first piezoelectric layer 121 or the surface of the second piezoelectric layer 123, the positive charge is gathered near the output electrode layer 122. As a result, the positive charge Qb is output from the output electrode layer 122. In contrast, if the tensile force parallel to the A-axis is applied to the surface of the first piezoelectric layer 121 or the surface of the second piezoelectric layer 123, the negative charge is gathered near the output electrode layer 122. As a result, the negative charge Qb is output from the output electrode layer 122.

The second sensor 13 has a function of outputting the charge Qb in response to the external force (shearing force) applied (received) along the B-axis. The second sensor 13 is configured to output the positive charge in response to the external force applied along a positive direction of the B-axis and to output the negative charge in response to the external force applied along a negative direction of the B-axis.

The second sensor 13 has a third piezoelectric layer (second piezoelectric plate) 131, a fourth piezoelectric layer (second piezoelectric plate) 133 which is disposed to oppose the third piezoelectric layer 131, and an output electrode layer 132 which is disposed between the third piezoelectric layer 131 and the fourth piezoelectric layer 133 and outputs the charge Qb.

The third piezoelectric layer 131 has the x-axis, the y-axis, and the z-axis which are three crystal axes orthogonal to one another. In the third piezoelectric layer 131, the x-axis direction and the B-axis direction are coincident with each other, the y-axis direction and the A-axis direction are coincident with each other, and the z-axis direction and the C-axis direction are coincident with each other.

If the external force along the positive direction of the B-axis is applied to the surface of the third piezoelectric layer 131, the charge is induced inside the third piezoelectric layer 131 by the piezoelectric effect. As a result, the positive charge is gathered near the surface on the output electrode layer 132 side of the third piezoelectric layer 131, and the negative charge is gathered near the surface on the ground electrode layer 11 side of the third piezoelectric layer 131. Similarly, if the external force along the negative direction of the B-axis is applied to the surface of the third piezoelectric layer 131, the negative charge is gathered near the surface on the output electrode layer 132 side of the third piezoelectric layer 131, and the positive charge is gathered near the surface on the ground electrode layer 11 side of the third piezoelectric layer 131.

The fourth piezoelectric layer 133 has the crystal axes which are the same as those of the third piezoelectric layer 131, and is arranged in a state where the third piezoelectric layer 131 is rotated around the C-axis by 180°.

If the external force along the positive direction of the B-axis is applied to the surface of the fourth piezoelectric layer 133, the charge is induced inside the fourth piezoelectric layer 133 by the piezoelectric effect. As a result, the positive charge is gathered near the surface on the output electrode layer 132 side of the fourth piezoelectric layer 133, and the negative charge is gathered near the surface on the ground electrode layer 11 side of the fourth piezoelectric layer 133. Similarly, if the external force along the negative direction of the B-axis is applied to the surface of the fourth piezoelectric layer 133, the negative charge is gathered near the surface on the output electrode layer 132 side of the fourth piezoelectric layer 133, and the positive charge is gathered near the surface on the ground electrode layer 11 side of the fourth piezoelectric layer 133.

As a configuration material for the third piezoelectric layer 131 and the fourth piezoelectric layer 133, it is possible to employ the configuration material which is the same as that of the first piezoelectric layer 121 and the second piezoelectric layer 123. The piezoelectric layers such as the third piezoelectric layer 131 and the fourth piezoelectric layer 133 which generate the charge with respect to the external force (shearing force) along the surface direction of the layer are configured to have a Y cut quartz crystal plate (Y plate) in the embodiment.

The output electrode layer 132 has a function of outputting the positive charge or the negative charge generated inside the third piezoelectric layer 131 and inside the fourth piezoelectric layer 133, as the charge Qa. As described above, if the external force along the positive direction of the B-axis is applied to the surface of the third piezoelectric layer 131 or the surface of the fourth piezoelectric layer 133, the positive charge is gathered near the output electrode layer 132. As a result, the positive charge Qa is output from the output electrode layer 132. In contrast, if the external force along the negative direction of the B-axis is applied to the surface of the third piezoelectric layer 131 or the surface of the fourth piezoelectric layer 133, the negative charge is gathered near the output electrode layer 132. As a result, the negative charge Qa is output from the output electrode layer 132.

The third sensor 14 has a function of outputting the charge Qc in response to the external force (shearing force) applied (received) along the C-axis. The third sensor 14 is configured to output the positive charge in response to the external force applied along the positive direction of the C-axis and to output the negative charge in response to the external force applied along the negative direction of the C-axis.

The third sensor 14 has a fifth piezoelectric layer (third piezoelectric plate) 141, a sixth piezoelectric layer (third piezoelectric plate) 143 which is disposed to oppose the fifth piezoelectric layer 141, and an output electrode layer 142 which is disposed between the fifth piezoelectric layer 141 and the sixth piezoelectric layer 143 and outputs the charge Qc.

The fifth piezoelectric layer 141 has the x-axis, the y-axis, and the z-axis which are three crystal axes orthogonal to one another. In the fifth piezoelectric layer 141, the x-axis direction and the C-axis direction are coincident with each other, the y-axis direction and the A-axis direction are coincident with each other, and the z-axis direction and the B-axis direction are coincident with each other.

If the external force along the positive direction of the C-axis is applied to the surface of the fifth piezoelectric layer 141, the charge is induced inside the fifth piezoelectric layer 141 by the piezoelectric effect. As a result, the positive charge is gathered near the surface on the output electrode layer 142 side of the fifth piezoelectric layer 141, and the negative charge is gathered near the surface on the ground electrode layer 11 side of the fifth piezoelectric layer 141. Similarly, if the external force along the negative direction of the C-axis is applied to the surface of the fifth piezoelectric layer 141, the negative charge is gathered near the surface on the output electrode layer 142 side of the fifth piezoelectric layer 141, and the positive charge is gathered near the surface on the ground electrode layer 11 side of the fifth piezoelectric layer 141.

The sixth piezoelectric layer 143 has the crystal axes which are the same as those of the fifth piezoelectric layer 141, and is arranged in a state where the fifth piezoelectric layer 141 is rotated around the B-axis by 180°.

If the external force along the positive direction of the C-axis is applied to the surface of the sixth piezoelectric layer 143, the charge is induced inside the sixth piezoelectric layer 143 by the piezoelectric effect. As a result, the positive charge is gathered near the surface on the output electrode layer 142 side of the sixth piezoelectric layer 143, and the negative charge is gathered near the surface on the ground electrode layer 11 side of the sixth piezoelectric layer 143. Similarly, if the external force along the negative direction of the C-axis is applied to the surface of the sixth piezoelectric layer 143, the negative charge is gathered near the surface on the output electrode layer 142 side of the sixth piezoelectric layer 143, and the positive charge is gathered near the surface on the ground electrode layer 11 side of the sixth piezoelectric layer 143.

The piezoelectric layers such as the fifth piezoelectric layer 141 and the sixth piezoelectric layer 143 which generate the charge with respect to the external force (shearing force) along the surface direction of the layer are configured to have the Y cut quartz crystal plate in the embodiment. The fifth piezoelectric layer 141 is arranged in a state where the third piezoelectric layer 131 is turned (displaced) around the A-axis by 90°. The sixth piezoelectric layer 143 is arranged in a state where the fourth piezoelectric layer 133 is rotated around the A-axis by 90°.

The output electrode layer 142 has a function of outputting the positive charge or the negative charge generated inside the fifth piezoelectric layer 141 and inside the sixth piezoelectric layer 143, as the charge Qc. As described above, if the external force along the positive direction of the C-axis is applied to the surface of the fifth piezoelectric layer 141 or the surface of the sixth piezoelectric layer 143, the positive charge is gathered near the output electrode layer 142. As a result, the positive charge Qc is output from the output electrode layer 142. In contrast, if the external force along the negative direction of the C-axis is applied to the surface of the fifth piezoelectric layer 141 or the surface of the sixth piezoelectric layer 143, the negative charge is gathered near the output electrode layer 142. As a result, the negative charge Qc is output from the output electrode layer 142.

As described, the first sensor 12, the second sensor 13, and the third sensor 14 are stacked so that force detection directions of the respective sensors are orthogonal to one another. In this manner, the respective sensors can induce the charge in response to force components orthogonal to one another. Therefore, the charge output element 10 can output the three charges Qa, Qb, and Qc in response to the respective external forces (deformations) along three axes (A-axis, B-axis, and C-axis).

In the respective sensors 12, 13, and 14, every two piezoelectric layers are arranged in a state where the piezoelectric layers are mutually rotated around the B-axis or the C-axis by 180°. In this manner, as compared to a case where each sensor is configured to have only one of the two piezoelectric layers and the output electrode layer, it is possible to increase the positive charge or the negative charge which is gathered near the output electrode layer. As a result, it is possible to increase the charge Q output from the output electrode layer.

The respective piezoelectric layers 121, 123, 131, 133, 141, and 143 have different thermal expansion coefficients in the x-axis direction, the y-axis direction, and the z-axis direction. In the respective piezoelectric layers 121, 123, 131, 133, 141, and 143, the thermal expansion coefficient in the x-axis direction is the same as the thermal expansion coefficient in the y-axis direction. The thermal expansion coefficient in the z-axis direction is smaller than the thermal expansion coefficients in the x-axis direction and in the y-axis direction. As illustrated in FIG. 5, in the respective piezoelectric layers 121, 123, 131, 133, 141, and 143, the thermal expansion coefficient in the x-axis direction is 13.4×10-6 (1/K), the thermal expansion coefficient in the y-axis direction is 13.4×10-6 (1/K), and the thermal expansion coefficient in the z-axis direction is 7.8×10-6 (1/K).

Figure 16:
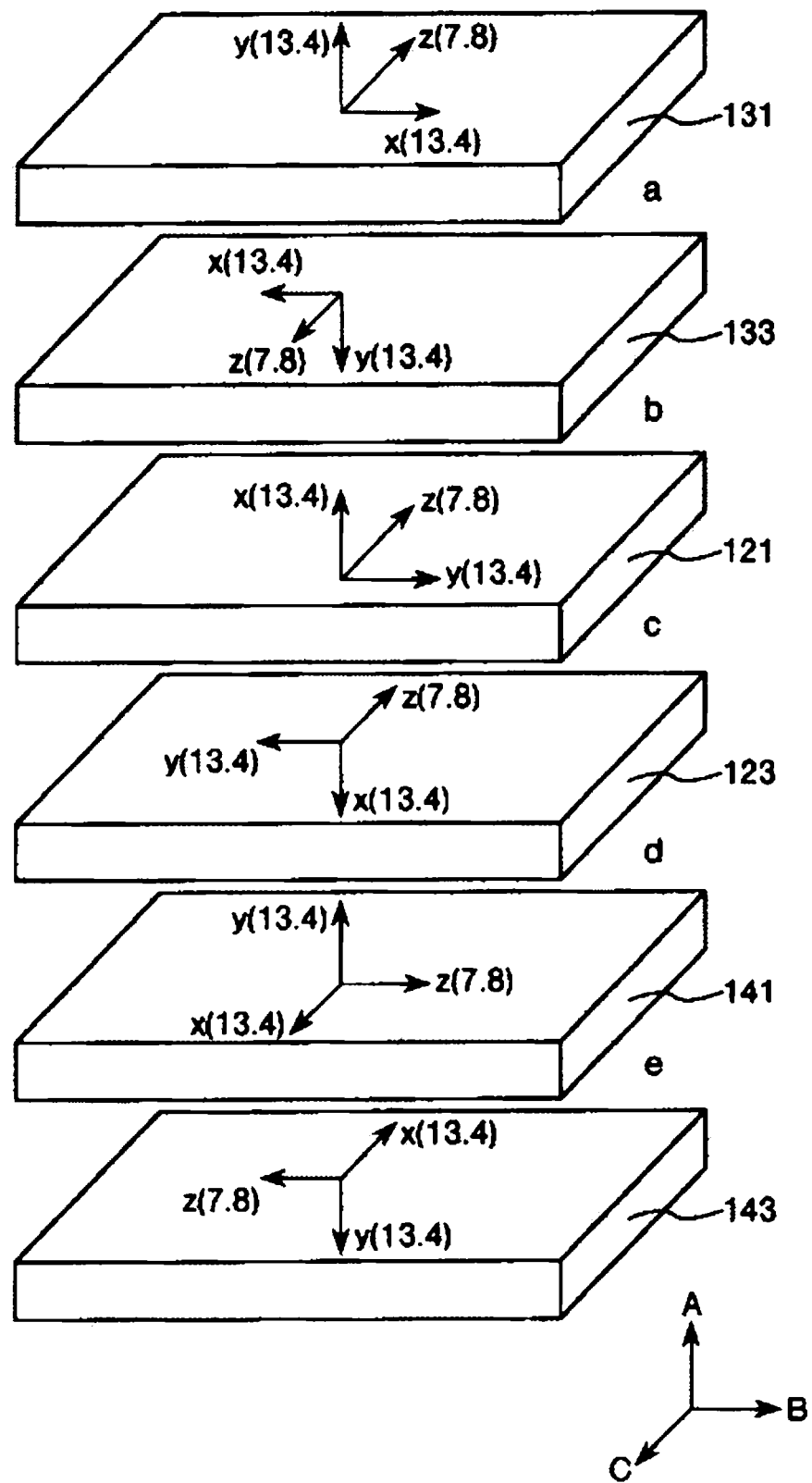
FIG. 16 is an exploded perspective view illustrating a thermal expansion coefficient and a crystal axis of a charge output element in the related art.

For example, as illustrated in FIG. 16, when the sixth piezoelectric layer 143, the fifth piezoelectric layer 141, the second piezoelectric layer 123, the first piezoelectric layer 121, the fourth piezoelectric layer 133, and the third piezoelectric layer 131 are stacked in the A-axis direction sequentially in this order, the y-axis direction of the second piezoelectric layer 123 and the z-axis direction of the fifth piezoelectric layer 141 are arranged along the B-axis direction. The thermal expansion coefficient in the y-axis direction of the second piezoelectric layer 123 is 13.4×10-6 (1/K), and the thermal expansion coefficient in the z-axis direction of the fifth piezoelectric layer 141 is 7.8×10-6 (1/K).

As described above, in the charge output element illustrated in FIG. 16, the second piezoelectric layer 123 and the fifth piezoelectric layer 141 have respectively different thermal expansion coefficients in the B-axis direction. Therefore, for example, when the charge output element illustrated in FIG. 16 thermally expands or thermally contracts due to temperature changes in a surrounding portion thereof, the second piezoelectric layer 123 and the fifth piezoelectric layer 141 have respectively different expansion rates or contraction rates in the B-axis direction.

If the thermal expansion occurs, a force is applied to the second piezoelectric layer 123 in a direction of preventing the thermal expansion by the fifth piezoelectric layer 141. As a result, compressive stress in the B-axis direction is generated in the second piezoelectric layer 123. In contrast, if the thermal contraction occurs, a force is applied to the second piezoelectric layer 123 in a direction of preventing the thermal contraction by the fifth piezoelectric layer 141. As a result, tensile stress in the B-axis direction is generated in the second piezoelectric layer 123.

Here, as described above, the second piezoelectric layer 123 is configured to have the X cut quartz crystal plate. Accordingly, when viewed in the C-axis direction, the second piezoelectric layer 123 has a hexagonal unit crystal structure in which an Si atom and an O atom are alternately arranged in six apexes (refer to FIG. 17A). In the second piezoelectric layer 123, the unit crystal structure is in a state where one diagonal line out of three diagonal lines connecting the Si atoms and the O atoms is substantially parallel to a thickness direction of the second piezoelectric layer 123.

Figure 17B:
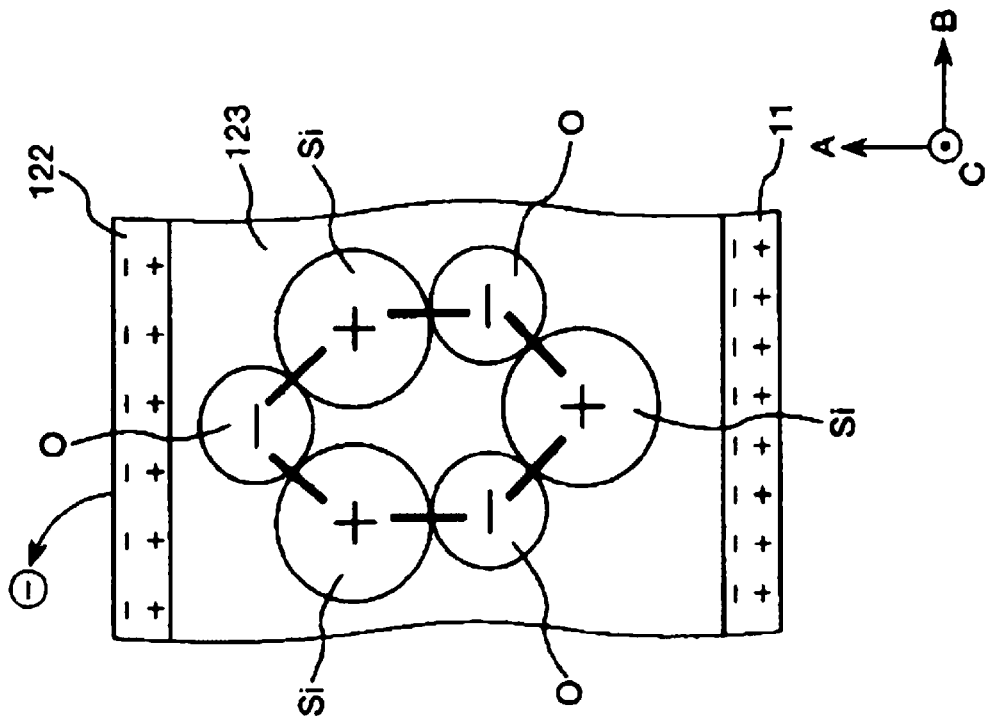
FIGS. 17A and 17B are schematic views schematically illustrating an X cut quartz crystal plate of the charge output element illustrated in FIG. 16.
Figure 17A:
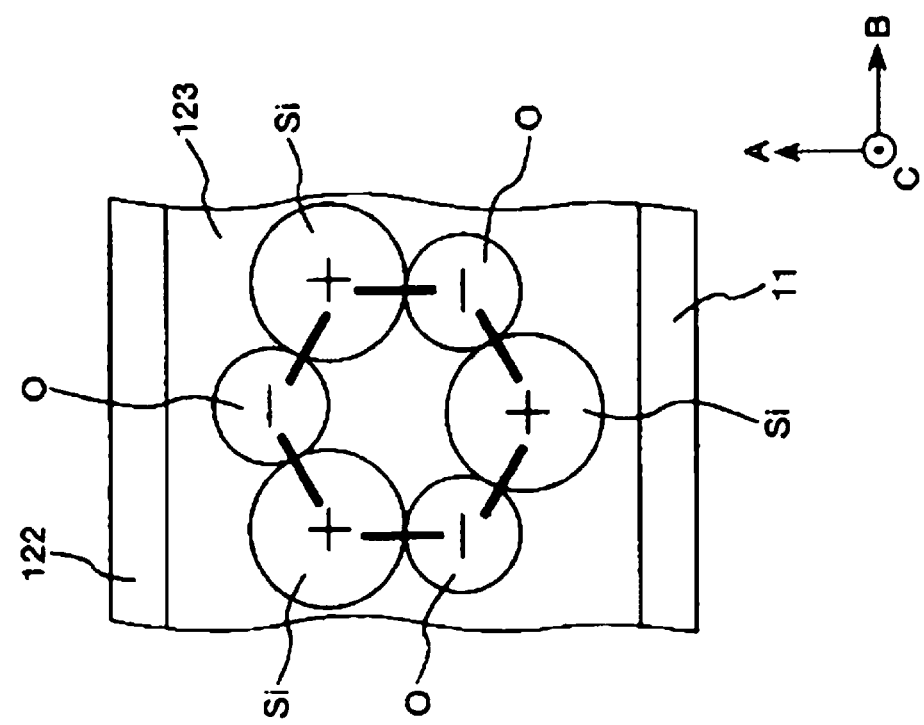

If the above-described compressive stress in the B-axis direction is applied to this second piezoelectric layer 123, the unit crystal structure of the second piezoelectric layer 123 is stretched in the A-axis direction as illustrated in FIG. 17B. Therefore, the O atoms close to the output electrode layer 122 are brought into a state of being closer to the output electrode layer 122 than the Si atoms adjacent thereto. The Si atoms close to the ground electrode layer 11 are brought into a state being closer to the ground electrode layer 11 than the O atoms adjacent thereto. As a result, in the output electrode layer 122, the positive charge is gathered on the second piezoelectric layer 123 side by electrostatic induction, and the negative charge is gathered on a side opposite to the second piezoelectric layer 123 (first piezoelectric layer 121 side). Accordingly, the negative charge is detected in the output electrode layer 122.

In contrast, if the above-described tensile stress in the B-axis direction is applied to the second piezoelectric layer 123, the unit crystal structure is crushed in the A-axis direction (not illustrated). Accordingly, the O atom close to the output electrode layer 122 is brought into a state of being further away from the output electrode layer 122 than the Si atom adjacent thereto. The Si atom close to the ground electrode layer 11 is brought into a state being further away from the ground electrode layer 11 than the O atom adjacent thereto. As a result, in the output electrode layer 122, the negative charge is gathered on the second piezoelectric layer 123 side by the electrostatic induction, and the positive charge is gathered on the side opposite to the second piezoelectric layer 123 (first piezoelectric layer 121 side). Accordingly, the positive charge is detected in the output electrode layer 122.

As described above, in the charge output element illustrated in FIG. 16, there is a possibility that the second piezoelectric layer 123 detects the positive charge or the negative charge due to the temperature changes in the surrounding portion.

In order to solve this problem, as illustrated in FIG. 5, the invention has a configuration in which the sixth piezoelectric layer 143, the fifth piezoelectric layer 141, the fourth piezoelectric layer 133, the third piezoelectric layer 131, the second piezoelectric layer 123, and the first piezoelectric layer 121 are stacked in the A-axis direction sequentially in this order. In this manner, the thermal expansion coefficient in the y-axis direction of the second piezoelectric layer 123 configured to have the X cut quartz crystal plate is coincident with the thermal expansion coefficient in the x-axis direction of the third piezoelectric layer 131 configured to have the Y cut quartz crystal plate in practice. That is, the thermal expansion coefficients in the B-axis direction of the second piezoelectric layer 123 and the third piezoelectric layer 131 are coincident with each other in practice. In this manner, when the charge output element 10 expands or contracts due to the temperature changes in the surrounding portion, the second piezoelectric layer 123 and the third piezoelectric layer 131 respectively have the expansion rates or the contraction rates in the B-axis direction which are coincident with each other in practice. Accordingly, the second piezoelectric layer 123 and the third piezoelectric layer 131 expand or contract as much as each other due to the temperature changes. As a result, it is possible to prevent or suppress the compressive stress or the tensile stress from being generated in the second piezoelectric layer 123 and the third piezoelectric layer 131. Therefore, it is possible to suppress or prevent the charge from being output from the output electrode layer 122 due to the temperature changes.

In the description, the term "coincident in practice" means that a discrepancy between the thermal expansion coefficient in the y-axis direction of the second piezoelectric layer 123 and the thermal expansion coefficient in the x-axis direction of the third piezoelectric layer 131 falls within 0% to 1% of any one thermal expansion coefficient.

As illustrated in FIG. 5, the thermal expansion coefficient in the x-axis direction of the fourth piezoelectric layer 133 is $13.4 \times 10$-6 (1/K), and the thermal expansion coefficient in the z-axis direction of the fifth piezoelectric layer 141 is $7.8 \times 10$-6 (1/K). That is, the fourth piezoelectric layer 133 and the fifth piezoelectric layer 141 respectively have different thermal expansion coefficients in the B-axis direction. Therefore, the compressive stress or the tensile stress in the B-axis direction is generated in the fourth piezoelectric layer 133 and the fifth piezoelectric layer 141 due to the temperature changes.

However, the fourth piezoelectric layer 133 and the fifth piezoelectric layer 141 are configured to have the Y cut quartz crystal plate. For example, the crystal structure of the Y cut quartz crystal plate has a hexagonal unit crystal structure in which the Si atoms and the O atoms are alternately arranged in six apexes, as in the fourth piezoelectric layer 133 illustrated in FIG. 6A. In the fourth piezoelectric layer 133, the unit crystal structure is in a state where one diagonal line out of three diagonal lines connecting the Si atoms and the O atoms is substantially parallel to the B-axis direction of the fourth piezoelectric layer 133. Therefore, in the crystal structure of the fourth piezoelectric layer 133, Si—O cohesion is present along the B-axis direction, and the Si—O cohesion is present in the A-axis direction so as to oppose each other pairwise. In this fourth piezoelectric layer 133, when the compressive stress is generated in the B-axis direction, as illustrated in FIG. 6B, the hexagonal unit crystal structure is crushed in the B-axis direction. At this time, the Si—O cohesion each maintains a posture parallel to the B-axis direction. Therefore, in the fourth piezoelectric layer 133, the piezoelectric effect is not generated, and the charge is not generated from the output electrode layer 132.

In the fourth piezoelectric layer 133, when the tensile stress in the B-axis direction is generated, the Si—O cohesion on the upper side in FIGS. 6A and 6B maintains a posture parallel to the B-axis direction (not illustrated). Therefore, in the fourth piezoelectric layer 133, the piezoelectric effect is not generated, and the charge is not generated from the output electrode layer 132.

The unit crystal structure of the fifth piezoelectric layer 141 is a unit crystal structure in which the Si atoms and the O atoms are wound in a spiral shape in the z-axis (B-axis) (not illustrated). Therefore, when the compressive stress is generated in the B-axis direction, the spiral-shaped unit crystal structure is crushed in the B-axis direction. At this time, whereas the spiral-shaped unit crystal structure is just crushed in the B-axis direction, the Si atoms and the O atoms do not substantially move in the A-axis direction. As a result, in the fifth piezoelectric layer 141, the piezoelectric effect is not generated, and the charge is not generated from the output electrode layer 142.

In the fifth piezoelectric layer 141, when the tensile stress in the B-axis direction is generated, the spiral-shaped unit crystal structure is stretched in the B-axis direction. At this time, whereas the spiral-shaped unit crystal structure is just stretched in the B-axis direction, the Si atoms and the O atoms do not substantially move in the A-axis direction. As a result, in the fifth piezoelectric layer 141, the piezoelectric effect is not generated, and the charge is not generated from the output electrode layer 142.

As described above, according to an aspect of the invention, the charge output element 10 has every two of the first piezoelectric plate which is configured to have the X cut quartz crystal plate, the second piezoelectric plate which is configured to have the Y cut quartz crystal plate and which is stacked in the A-axis direction with the first piezoelectric plate, and the third piezoelectric plate which is configured to have the Y cut quartz crystal plate, which is stacked in the A-axis direction so as to interpose the second piezoelectric plate between the first piezoelectric plate and the third piezoelectric plate, and so as to be arranged to turn around the A-axis. In this manner, the thermal expansion coefficients in the B-axis direction of the first piezoelectric plate and the second piezoelectric plate are coincident with each other in practice. Accordingly, even if the first piezoelectric plate and the second piezoelectric plate thermally expand or thermally contract due to the temperature changes, it is possible to suppress or prevent the charge from being output. As a result, it is possible to obtain a very reliable charge output element.

According to an aspect of the invention, when detecting the external force, the charge output element can suppress or prevent the charge from being output due to the temperature changes by using the same principle. Therefore, it is possible to further improve the detection accuracy of the charge output element.

Second Embodiment

Figure 7:
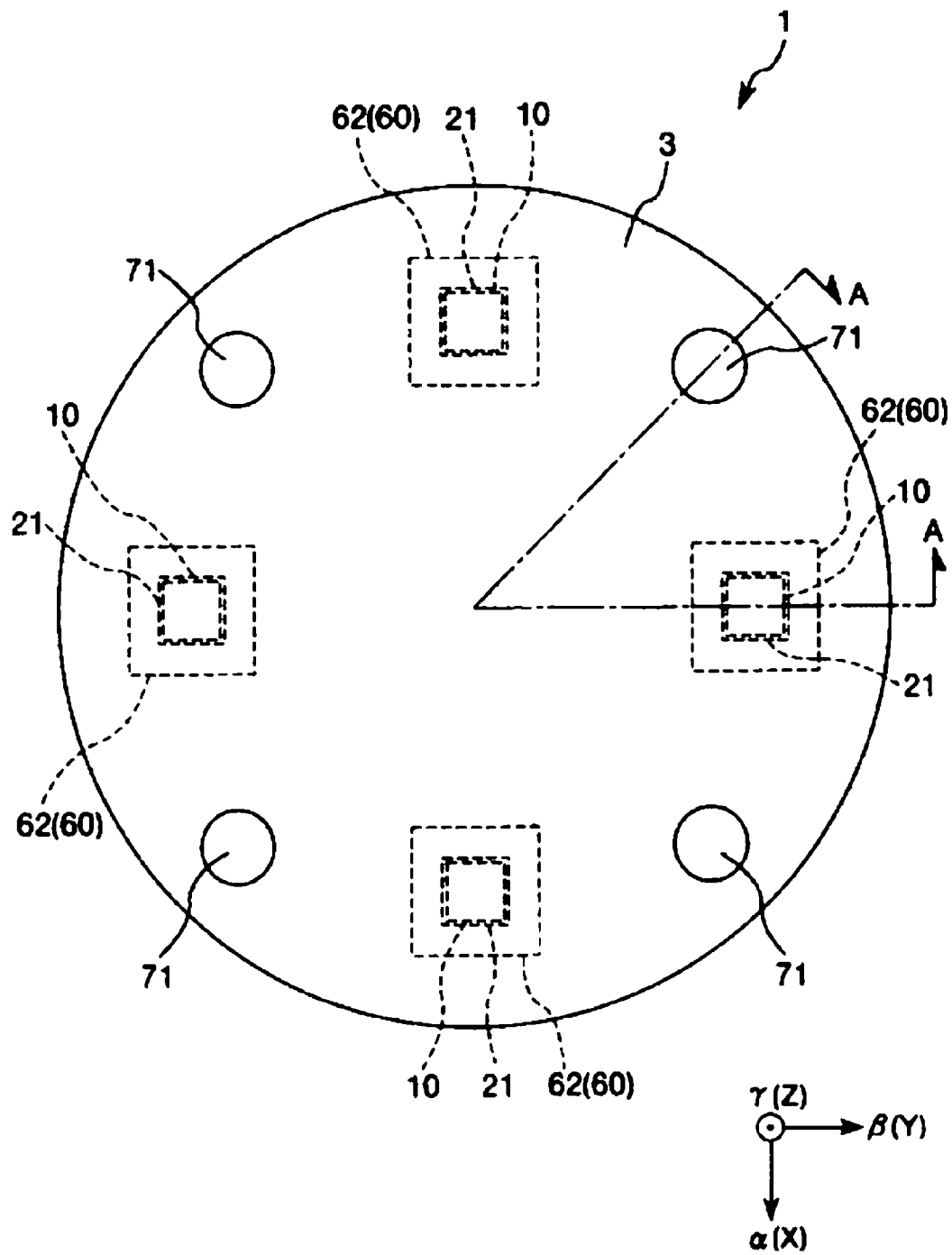
FIG. 7 is a plan view illustrating a second embodiment of a force detection device (sensor element) according to the invention.
Figure 8:
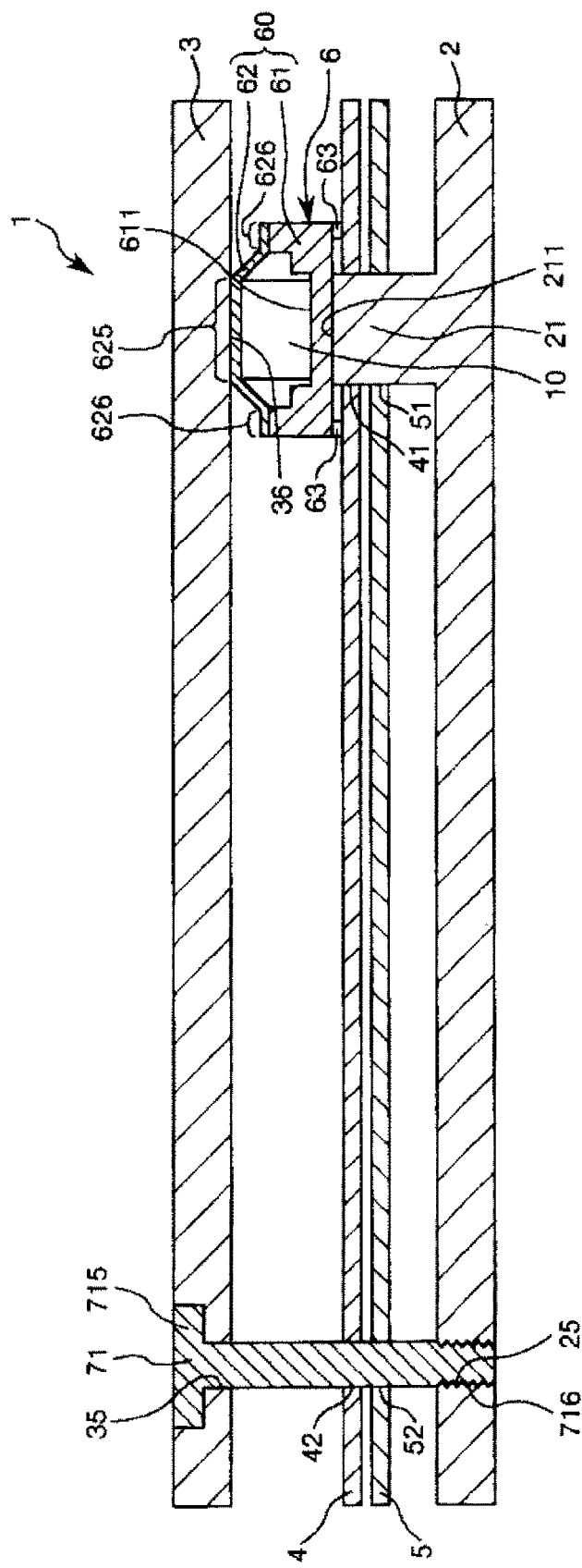
FIG. 8 is a cross-sectional view taken along line A-A illustrated in FIG. 7.
Figure 9:
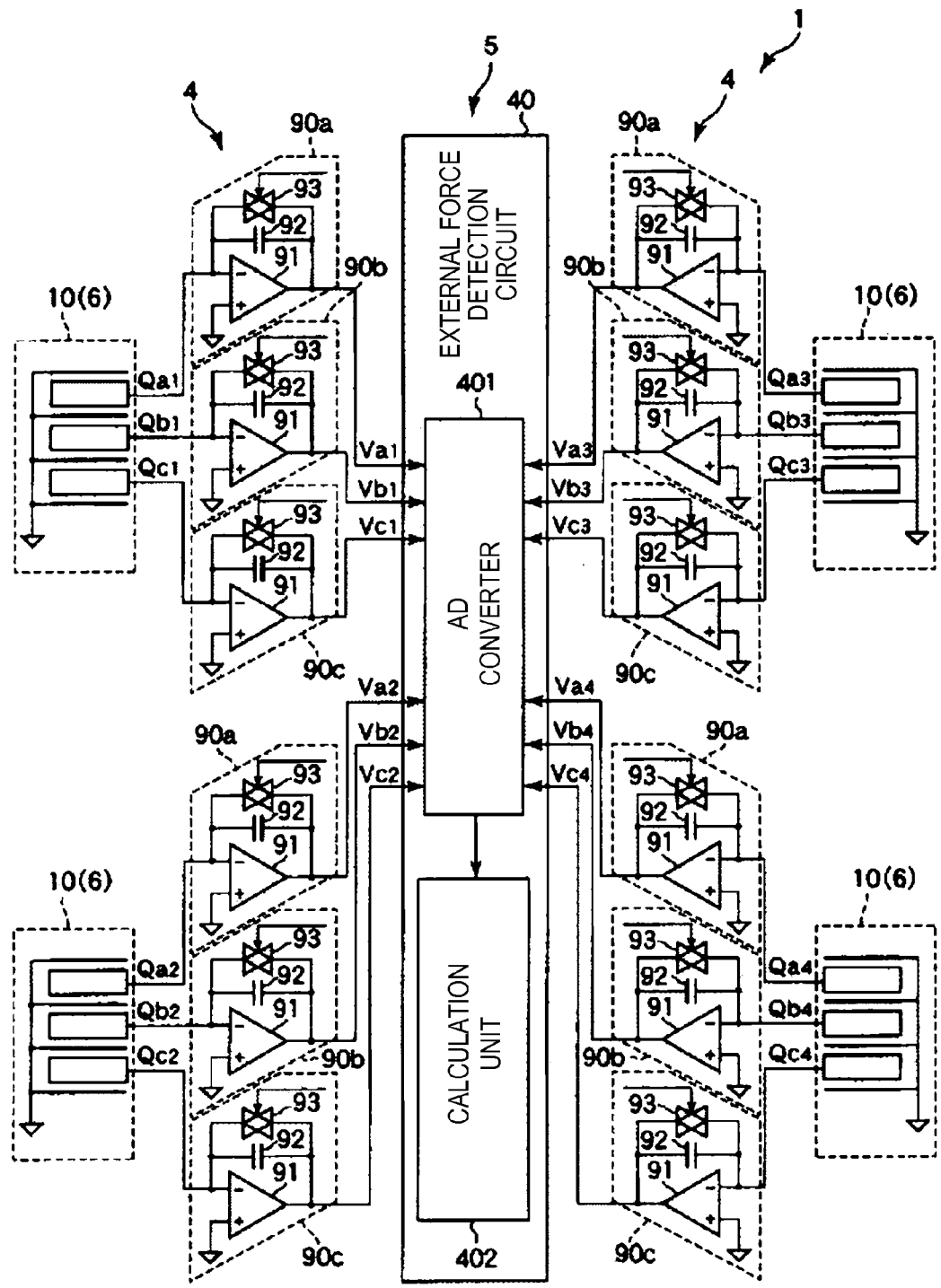
FIG. 9 is a circuit diagram schematically illustrating the force detection device illustrated in FIG. 7.

FIG. 7 is a plan view illustrating a second embodiment of a force detection device (sensor element) according to the invention. FIG. 8 is a cross-sectional view taken along line A-A illustrated in FIG. 7. FIG. 9 is a circuit diagram schematically illustrating the force detection device illustrated in FIG. 7.

Hereinafter, the second embodiment will be described by focusing on points different from those in the above-described first embodiment, and description of the same points will be omitted.

A force detection device 1 according to the second embodiment illustrated in FIGS. 7 and 8 has a function of detecting an external force (including a moment), that is, a function of detecting six axial forces (translational force components (shearing force) in the A-axis, B-axis, and C-axis directions and rotational force components (moment) around the A-axis, B-axis, and C-axis).

As illustrated in FIGS. 7 and 8, the force detection device 1 has four sensor devices 6 and four pressurizing bolts 71. A position of the respective sensor devices 6 is not particularly limited. However, in the embodiment, the respective sensor devices 6, that is, the respective charge output elements 10 are arranged at equal angular intervals (intervals of 90°) along the circumferential direction of the first substrate 2, the second substrate 3, and the analog circuit board 4. This can detect the external force without any bias. Then, the six axial forces can be detected. In the embodiment, the respective charge output elements 10 are all oriented in the same direction, but the configuration is not limited thereto.

Four convex portions 21 are disposed in the first substrate 2 so as to correspond to the respective sensor devices 6. Since the convex portion 21 has been described in the first embodiment, description thereof will be omitted.

The number of the sensor devices 6 is not limited to the above-described four. For example, the number may be two, three, five, or more. However, the number of the sensor devices 6 is preferably two or more, and more preferably three or more. As long as the force detection device 1 has at least three sensor devices 6, the force detection device 1 can detect the six axial forces. If three sensor devices 6 are provided, the number of the sensor devices 6 is sufficiently small, thereby enabling the force detection device 1 to be lighter. In addition, if four sensor devices 6 are provided as illustrated, the six axial forces can be obtained by a very simple calculation method (to be described later). Therefore, it is possible to simplify the calculation unit 402.

Conversion Output Circuit

As illustrated in FIG. 9, the conversion output circuits 90a, 90b, and 90c are respectively connected to the respective charge output elements 10. The conversion output circuits 90a, 90b, and 90c are the same as the conversion output circuit 90 according to the above-described first embodiment, and thus, description thereof will be omitted.

External Force Detection Circuit

The external force detection circuit 40 has a function of detecting an applied external force, based on voltages Va1, Va2, Va3, and Va4 output from the respective conversion output circuits 90a, voltages Vb1, Vb2, Vb3, and Vb4 output from the respective conversion output circuits 90b, and voltages Vc1, Vc2, Vc3, and Vc4 output from the respective conversion output circuits 90c. The external force detection circuit 40 has the AD converter 401 connected to the conversion output circuits 90a, 90b, and 90c, and the calculation unit 402 connected to the AD converter 401.

The AD converter 401 has a function of converting the voltages Va1, Vc1, Vb1, Va2, Vc2, Vb2, Va3, Vc3, Vb3, Va4, Vc4, and Vb4 from an analog signal to a digital signal. The voltages Va1, Vc1, Vb1, Va2, Vc2, Vb2, Va3, Vc3, Vb3, Va4, Vc4, and Vb4 which are digitally converted by the AD converter 401 are input to the calculation unit 402.

That is, when the external force is applied so that the relative positions of the first substrate 2 and the second substrate 3 are displaced from each other in the A-axis direction, the AD converter 401 outputs the voltages Va1, Va2, Va3, and Va4. Similarly, when the external force is applied so that the relative positions of the first substrate 2 and the second substrate 3 are displaced from each other in the C-axis direction, the AD converter 401 outputs the voltages Vc1, Vc2, Vc3, and Vc4. In addition, when the external force is applied so that the relative positions of the first substrate 2 and the second substrate 3 are displaced from each other in the B-axis direction, the AD converter 401 outputs the voltages Vb1, Vb2, Vb3, and Vb4.

The first substrate 2 and the second substrate 3 can perform relative displacement of being mutually rotated around the A-axis, relative displacement of being mutually rotated around the B-axis, and relative displacement of being mutually rotated around the C-axis. The external force generated by each rotation can be transmitted to the charge output element 10.

Based on the digitally converted voltages Va1, Vc1, Vb1, Va2, Vc2, Vb2, Va3, Vc3, Vb3, Va4, Vc4, and Vb4, the calculation unit 402 has a function of calculating a translational force component Fa in the A-axis direction, a translational force component Fc in the C-axis direction, a translational force component Fb in the B-axis direction, a rotational force component Ma around the A-axis, a rotational force component Mc around the C-axis, and a rotational force component Mb around the B-axis. The respective force components can be obtained by the following equations.

$$Fa = Va1 + Va2 + Va3 + Va4$$

$$Fc = Vc1 + Vc2 + Vc3 + Vc4$$

$$Fb = Vb1 + Vb2 + Vb3 + Vb4$$

$$Ma = k \times (Vb4 - Vb2)$$

$$Mc = j \times (Vb3 - Vb1)$$

$$Mb = k \times (Va2 - Va4) + a \times (Vc1 - Vc3)$$

Here, j and k are a constant.

As described above, the force detection device 1 can detect the six axial forces.

For example, the calculation unit 402 may be configured to perform correction for eliminating a difference in sensitivities between the respective conversion output circuits 90a, 90b, and 90c.

As illustrated in FIGS. 7 and 8, the first substrate 2 and the second substrate 3 are fixed by four pressurizing bolts 71. The number of the pressurizing bolts 71 is not limited to four. For example, the number may be two, three, five, or more.

A position of the respective pressurizing bolts 71 is not particularly limited. However, in the embodiment, the respective pressurizing bolts 71 are arranged at equal angular intervals (intervals of 90°) along the circumferential direction of the first substrate 2, the second substrate 3, the analog circuit board 4, and the digital circuit board 5. This enables the first substrate 2 and the second substrate 3 to be fixed with good balance. In addition, the respective charge output elements 10 can be pressurized with good balance.

According to this force detection device 1, it is possible to obtain an advantageous effect which is the same as that of the above-described first embodiment.

Embodiment of Single-Arm Robot

Next, a single-arm robot according to an embodiment of a robot according to the invention will be described with reference to FIG. 10. Hereinafter, the embodiment will be described by focusing on points different from those in the above-described first and second embodiments, and description of the same points will be omitted.

Figure 10:
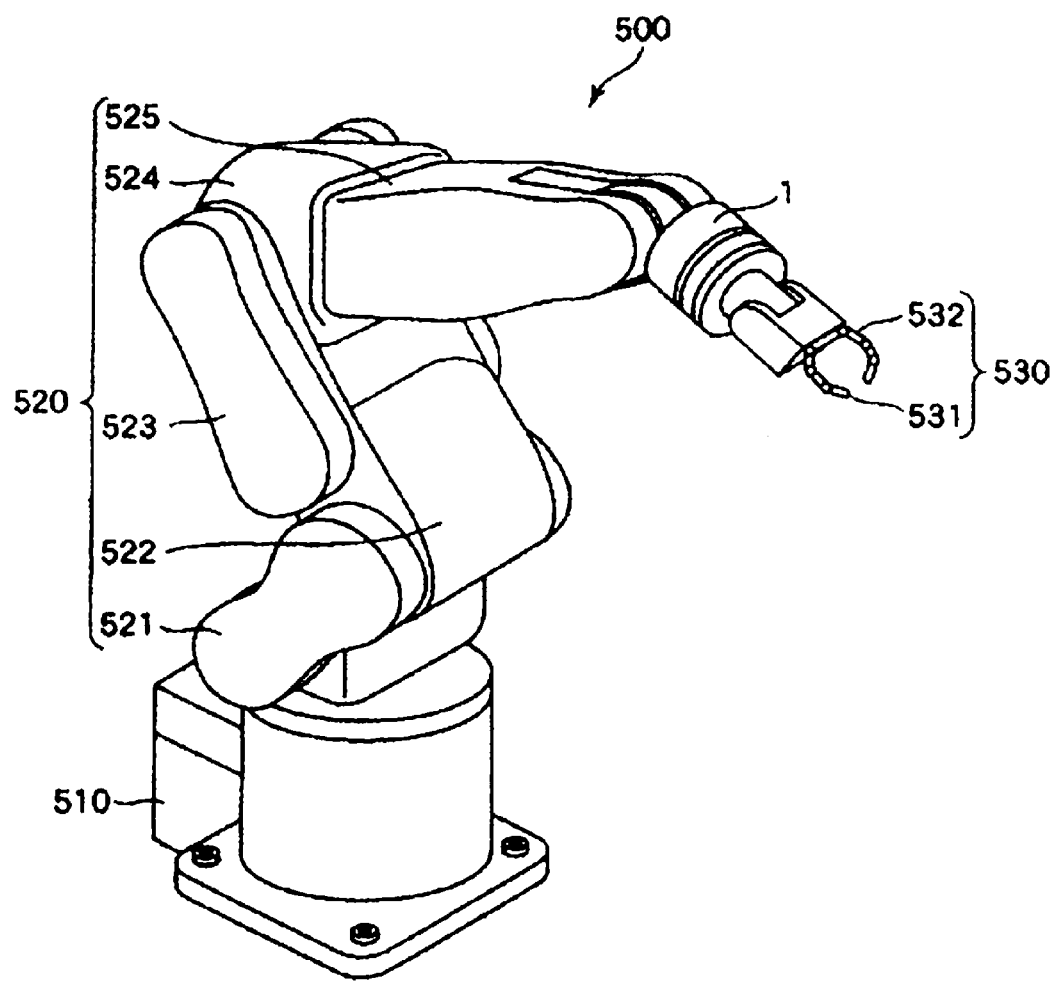
FIG. 10 is a view illustrating an example of a single-arm robot using the force detection device (sensor element) according to the invention.

FIG. 10 is a view for describing an example of the single-arm robot using the force detection device (sensor element) according to the invention. A single-arm robot 500 in FIG. 10 has a base 510, an arm 520, an end effector 530 disposed on a distal end side of the arm 520, and the force detection device 1 disposed between the arm 520 and the end effector 530. As the force detection device 1, the force detection device which is the same as that in the above-described respective embodiments is used.

The base 510 has a function of accommodating an actuator (not illustrated) which generates power for pivotally moving the arm 520 and a control unit (not illustrated) which controls the actuator, and the like. In addition, for example, the base 510 is fixed onto a floor, a wall, a ceiling, or a movable carriage.

The arm 520 has a first arm element 521, a second arm element 522, a third arm element 523, a fourth arm element 524, and a fifth arm element 525, and is configured to pivotally connect the adjacent arm elements to each other. According to the control of the control unit, the arm 520 is driven by being complexly rotated or bent around connection portions between the respective arm elements.

The end effector 530 has a function of gripping an object. The end effector 530 has a first finger 531 and a second finger 532. After the arm 520 is driven so that the end effector 530 reaches a predetermined operation position, the end effector 530 can grip the object by adjusting a distance between the first finger 531 and the second finger 532.

Here, the end effector 530 is a hand. However, the invention is not limited thereto. For example, another example of the end effector includes a component inspecting device, a component transporting device, a component processing device, a component assembling device, and a measuring device. This is similarly applied to an end effector of other embodiments.

The force detection device 1 has a function of detecting the external force applied to the end effector 530. The force detected by the force detection device 1 is fed back to the control unit of the base 510, thereby enabling the single-arm robot 500 to carry out more precise work. In addition, the force detected by the force detection device 1 enables the single-arm robot 500 to detect whether the end effector 530 comes into contact with an obstacle. Therefore, it is possible to easily perform an obstacle avoiding operation and an object damage avoiding operation which are difficult for position control in the related art. Accordingly, the single-arm robot 500 can more safely carry out the work.

In the illustrated configuration, the arm 520 is configured to have five arm elements in total. However, the invention is not limited thereto. The scope of the invention also includes a case where the arm 520 is configured to have one arm element, a case where the arm. 520 is configured to have two to four arm elements, and a case where the arm 520 is configured to have six or more arm elements.

Embodiment of Multi-Arm Robot

Next, a multi-arm robot according to an embodiment of the robot according to the invention will be described with reference to FIG. 11. Hereinafter, the embodiment will be described by focusing on points different from those in the above-described first, second, third, and fourth embodiments, and description of the same points will be omitted.

Figure 11:
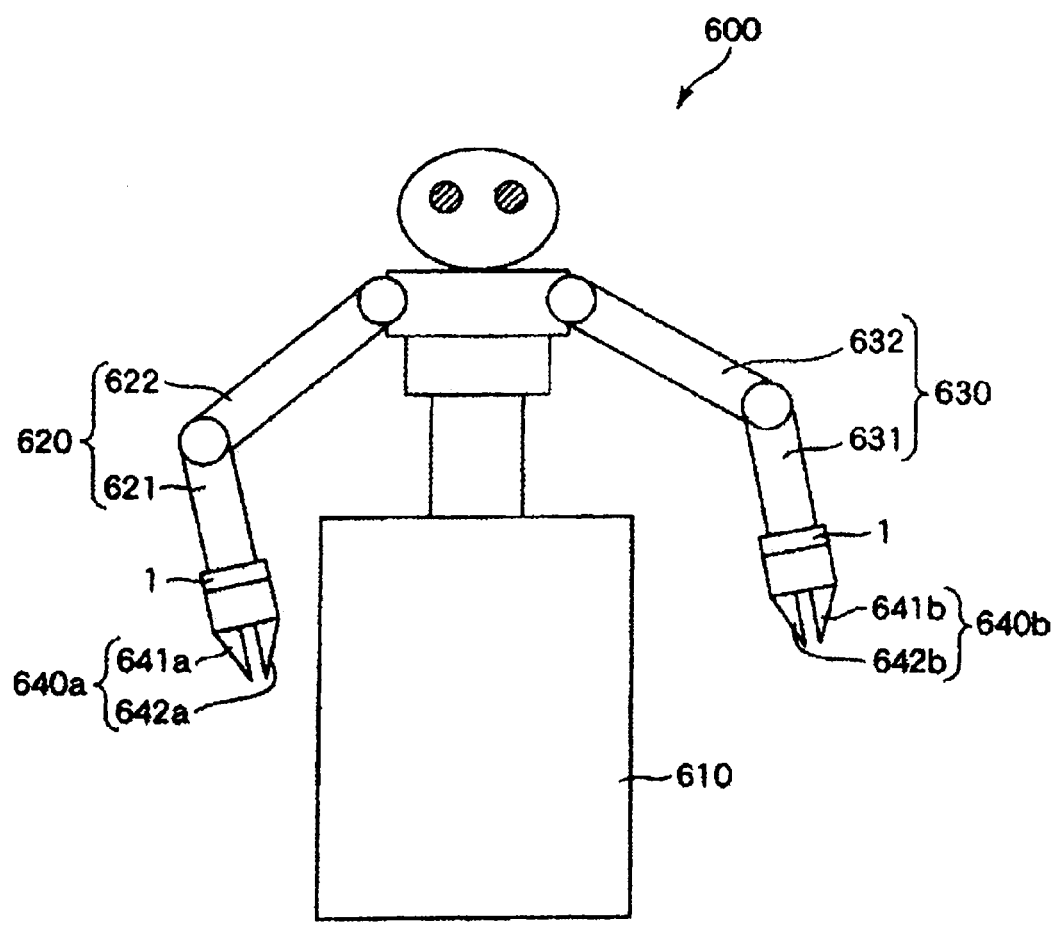
FIG. 11 is a view illustrating an example of a multi-arm robot using the force detection device (sensor element) according to the invention.

FIG. 11 is a view illustrating one example of the multi-arm robot using the force detection device (sensor element) according to the invention. A multi-arm robot 600 in FIG. 11 has a base 610, a first arm 620, a second arm 630, a first end effector 640a disposed on a distal end side of the first arm 620, a second end effector 640b disposed on a distal end side of the second arm. 630, and the force detection devices 1 which are disposed between the first arm 620 and the first end effector 640a, and between the second arm 630 and the second end effector 640b. As the force detection device 1, the same one as in the above-described respective embodiments is used.

The base 610 has a function of accommodating an actuator (not illustrated) which generates power for pivotally moving the first arm 620 and the second arm 630, and a control unit (not illustrated) which controls the actuator, and the like. In addition, for example, the base 610 is fixed onto a floor, a wall, a ceiling, or a movable carriage.

The first arm 620 is configured so that a first arm element 621 and a second arm element 622 are pivotally connected to each other. The second arm 630 is configured so that a first arm element 631 and a second arm element 632 are pivotally connected to each other. According to the control of the control unit, the first arm 620 and the second arm 630 are driven by being complexly rotated or bent around a connection portion between the respective arm elements.

The first and second end effectors 640a and 640b have a function of gripping an object. The first end effector 640a has a first finger 641a and a second finger 642a. The second end effector 640b has a first finger 641b and a second finger 642b. After the first arm 620 is driven so that the first end effector 640a reaches a predetermined operation position, the first end effector 640a can grip the object by adjusting a distance between the first finger 641a and the second finger 642a. Similarly, after the second arm 630 is driven so that the second end effector 640b reaches a predetermined operation position, the second end effector 640b can grip the object by adjusting a distance between the first finger 641b and the second finger 642b.

The force detection device 1 has a function of detecting the external force applied to the first and second end effectors 640a and 640b. The force detected by the force detection device 1 is fed back to the control unit of the base 610, thereby enabling the multi-arm robot 600 to carry out more precise work. In addition, the force detected by the force detection device 1 enables the multi-arm robot 600 to detect whether the first and second end effectors 640a and 640b come into contact with an obstacle. Therefore, it is possible to easily perform the obstacle avoiding operation and the object damage avoiding operation which are difficult for the position control in the related art. Accordingly, the multi-arm robot 600 can more safely carry out the work.

In the illustrated configuration, the number of arms is two in total. However, the invention is not limited thereto. The scope of the invention also includes a case where the multi-arm robot 600 has three or more arms.

Embodiment of Electronic Component Inspection Device and Electronic Component Transport Device Next, an electronic component inspection device and an electronic component transport device according to an embodiment of the invention will be described with reference to FIGS. 12 and 13. Hereinafter, the embodiment will be described by focusing on points different from those in the above-described first and second embodiments, and description of the same points will be omitted.

Figure 12:
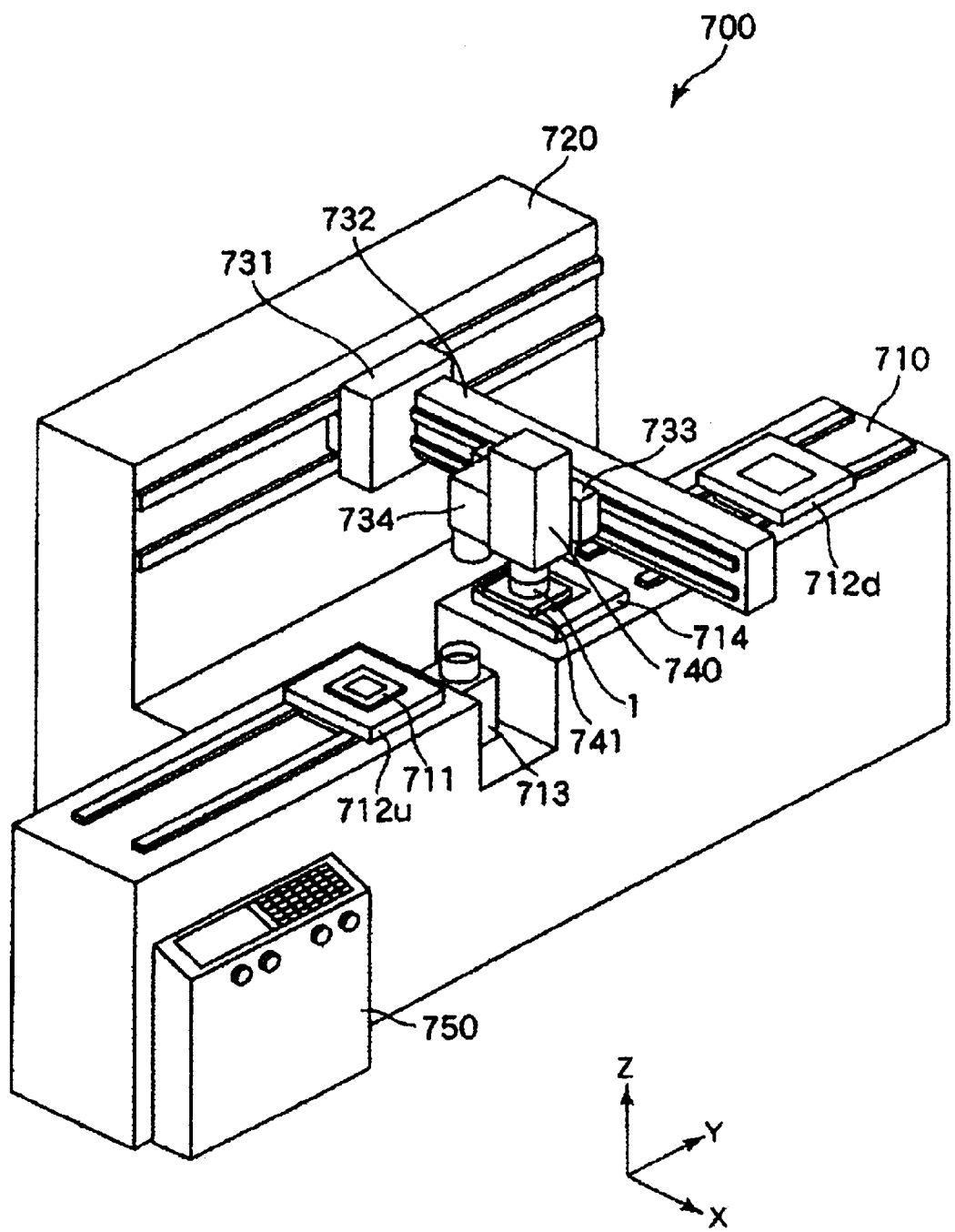
FIG. 12 is a view illustrating an example of an electronic component inspection device and an electronic component transport device which use the force detection device (sensor element) according to the invention.

FIG. 12 is a view illustrating one example of the electronic component inspection device and the electronic component transport device which use the force detection device (sensor element) according to the invention. FIG. 13 is a view illustrating one example of the electronic component transport device using the force detection device (sensor element) according to the invention.

An electronic component inspection device 700 in FIG. 12 has abase 710 and a support base 720 erected on a side surface of the base 710. An upstream side stage 712u on which an electronic component 711 for inspection is placed and transported and a downstream side stage 712d on which the inspected electronic component 711 is placed and transported are disposed on an upper surface of the base 710. In addition, an imaging device 713 for checking a posture of the electronic component 711 and an inspection table 714 on which the electronic component 711 is set in order to inspect electrical characteristics are disposed between the upstream side stage 712u and the downstream side stage 712d. Examples of the electronic component 711 include a semiconductor, a semiconductor wafer, a display device such as a CLD or an OLED, a quartz crystal device, various sensors, an ink jet head, and various MEMS devices.

A Y stage 731 is disposed in the support base 720 so as to be movable in a direction (Y(B) direction) parallel to the upstream side stage 712u and the downstream side stage 712d of the base 710. An arm portion 732 extends from the Y stage 731 in a direction (X(C) direction) toward the base 710. In addition, an X stage 733 is disposed on a side surface of the arm portion 732 so as to be movable in an X direction.

An imaging camera 734 and an electronic component transport device 740 which internally includes a Z stage movable in a vertical direction (Z(A) direction) are disposed in the X stage 733. In addition, a grip portion 741 for gripping the electronic component 711 is disposed on a distal end side of the electronic component transport device 740. In addition, the force detection device 1 is disposed between the distal end of the electronic component transport device 740 and the grip portion 741. Furthermore, a control device 750 for controlling overall operations of the electronic component inspection device 700 is disposed on a front surface side of the base 710. As the force detection device 1, the same one as in the above-described respective embodiments is used.

The electronic component inspection device 700 inspects the electronic component 711 in the following manner. The electronic component 711 for inspection is first placed on the upstream side stage 712u, and is moved close to the inspection table 714. Then, the Y stage 731 and the X stage 733 are operated so that the electronic component transport device 740 is moved to a position just above the electronic component 711 placed on the upstream side stage 712u. At this time, a position of the electronic component 711 can be checked by using the imaging camera 734. Then, the electronic component transport device 740 is lowered by using the Z stage internally included inside the electronic component transport device 740. If the electronic component 711 is gripped by the grip portion 741, the electronic component transport device 740 is moved to a position above the imaging device 713, and the posture of the electronic component 711 is checked by using the imaging device 713. Then, the posture of the electronic component 711 is adjusted by using a fine adjustment mechanism internally included in the electronic component transport device 740. Then, after the electronic component transport device 740 is moved to a position above the inspection table 714, the Z stage internally included in the electronic component transport device 740 is operated so that the electronic component 711 is set on the inspection table 714. Since the posture of the electronic component 711 is adjusted by using the fine adjustment mechanism inside the electronic component transport device 740, the electronic component 711 can be set at a correct position on the inspection table 714. Then, after inspection for the electrical characteristics of the electronic component 711 is completed by using the inspection table 714, the electronic component 711 is now lifted up from the inspection table 714. The Y stage 731 and the X stage 733 are operated so that the electronic component transport device 740 is moved to a position above the downstream side stage 712d and the electronic component 711 is placed on the downstream side stage 712d. Finally, the downstream side stage 712d is operated so that the electronic component 711 for which inspection has been completed is transported to a predetermined position.

Figure 13:
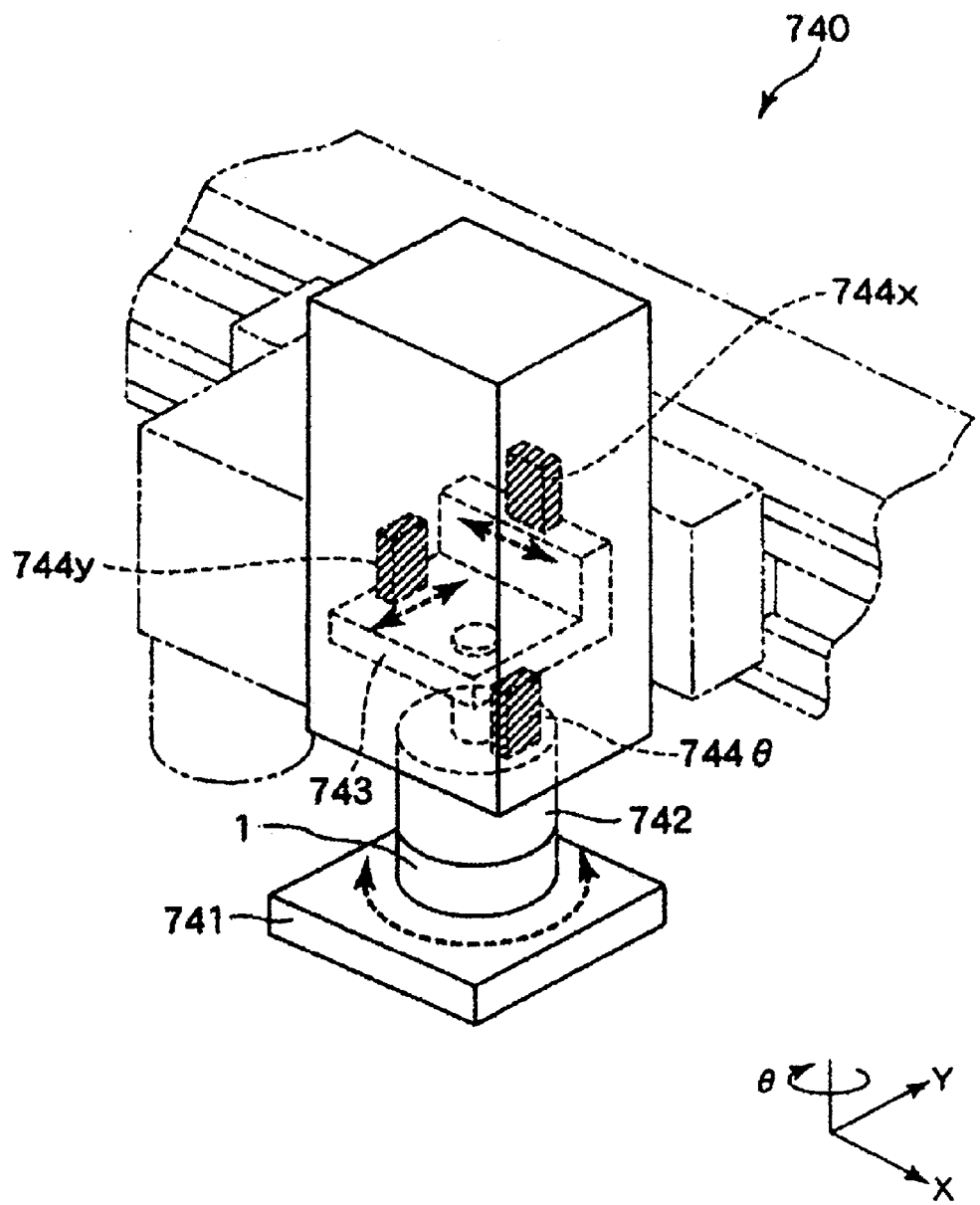
FIG. 13 is a view illustrating an example of the electronic component transport device using the force detection device (sensor element) according to the invention.

FIG. 13 is a view illustrating the electronic component transport device 740 including the force detection device 1. The electronic component transport device 740 has a grip portion 741, the force detection device 1 for detecting six axial forces which is connected to the grip portion 741, a rotary shaft 742 which is connected to the grip portion 741 via the force detection device 1 for detecting the six axial forces, and a fine adjustment plate 743 which is rotatably attached to the rotary shaft 742. In addition, the fine adjustment plate 743 is movable in the X direction and the Y direction while being guided by a guide mechanism (not illustrated).

A piezoelectric motor 744θ for a rotation direction is mounted thereon toward an end surface of the rotary shaft 742. A drive projection (not illustrated) of the piezoelectric motor 744θ is pressed against the end surface of the rotary shaft 742. Therefore, it is possible to rotate the rotary shaft 742 (and the grip portion 741) by any desired angle in a direction of θ by operating the piezoelectric motor 744θ. In addition, a piezoelectric motor 744x for the X direction and a piezoelectric motor 744y for the Y direction are disposed toward the fine adjustment plate 743. Respective drive projections (not illustrated) are pressed against a surface of the fine adjustment plate 743. Therefore, it is possible to move the fine adjustment plate 743 (and the grip portion 741) by any desired distance in the X direction by operating the piezoelectric motor 744x. Similarly, it is possible to move the fine adjustment plate 743 (and the grip portion 741) by any desired distance in the Y direction by operating the piezoelectric motor 744y.

The force detection device 1 has a function of detecting an external force applied to the grip portion 741. The force detected by the force detection device 1 is fed back to the control device 750, thereby enabling the electronic component transport device 740 and the electronic component inspection device 700 to carry out more precise work. In addition, the force detected by the force detection device 1 enables the electronic component transport device 740 and the electronic component inspection device 700 to detect whether the grip portion 741 comes into contact with an obstacle. Therefore, it is possible to easily perform the obstacle avoiding operation and the object damage avoiding operation which are difficult for the position control in the related art. Accordingly, the electronic component transport device 740 and the electronic component inspection device 700 can more safely carry out the work.

Embodiment of Component Processing Device

Next, a component processing device according to an embodiment of the invention will be described with reference to FIG. 14. Hereinafter, the embodiment will be described by focusing on points different from those in the above-described first and second embodiments, and description of the same points will be omitted.

Figure 14:
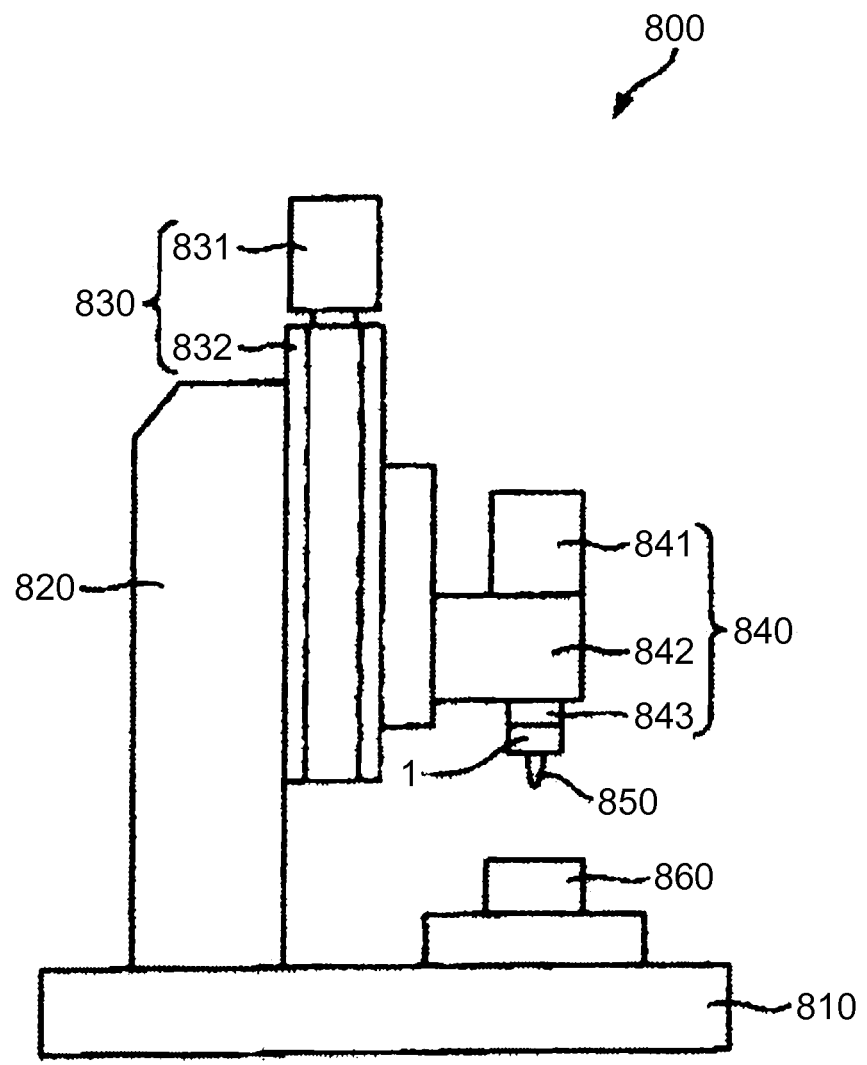
FIG. 14 is a view illustrating an example of a component processing device using the force detection device (sensor element) according to the invention.

FIG. 14 is a view illustrating one example of the component processing device using the force detection device according to the invention. A component processing device 800 in FIG. 14 has a base 810, a strut 820 which is formed to be erected on an upper surface of the base 810, a feed mechanism 830 which is disposed on a side surface of the strut 820, a tool displacement unit 840 which is attached to the feed mechanism 830 so as to be vertically movable, the force detection device 1 which is connected to the tool displacement unit 840, and a tool 850 which is mounted on the tool displacement unit 840 via the force detection device 1. As the force detection device 1, the same one as in the above-described respective embodiments is used.

The base 810 is used in order to place and fix a workpiece 860. The strut 820 is used in order to fix the feed mechanism 830. The feed mechanism 830 has a function of moving the tool displacement unit 840 vertically. The feed mechanism 830 has a feed motor 831 and a guide 832 for moving the tool displacement unit 840 vertically, based on an output from the feed motor 831. The tool displacement unit 840 has a function of providing displacement such as rotation or vibration for the tool 850. The tool displacement unit 840 has a displacement motor 841, a tool attachment portion 843 which is disposed in a distal end of a main shaft (not illustrated) connected to the displacement motor 841, and a holding portion 842 which is attached to the tool displacement unit 840 and holds the main shaft. The tool 850 is attached to the tool attachment portion 843 of the tool displacement unit 840 via the force detection device 1, and is used in order to perform processing on the workpiece 860 in accordance with the displacement provided from the tool displacement unit 840. The tool 850 is not particularly limited. However, for example, the tool 850 includes a wrench, a Phillips screwdriver, a flathead screwdriver, a cutter, a circular saw, a nipper, a screw auger, a drill, and a milling cutter.

The force detection device 1 has a function of detecting the external force applied to the tool 850. The external force detected by the force detection device 1 is fed back to the feed motor 831 and the displacement motor 841, thereby enabling the component processing device 800 to carry out more precise component processing work. In addition, the external force detected by the force detection device 1 enables the component processing device 800 to detect whether the tool 850 comes into contact with an obstacle. Therefore, emergency stop is possible when the obstacle comes into contact with the tool 850. Accordingly, the component processing device 800 can more safely carry out the component processing work.

Embodiment of Mobile Body

Next, an embodiment of a mobile body according to the invention will be described with reference to FIG. 15. Hereinafter, the embodiment will be described by focusing on points different from those in the above-described first, second, and third embodiments, and description of the same points will be omitted.

Figure 15:
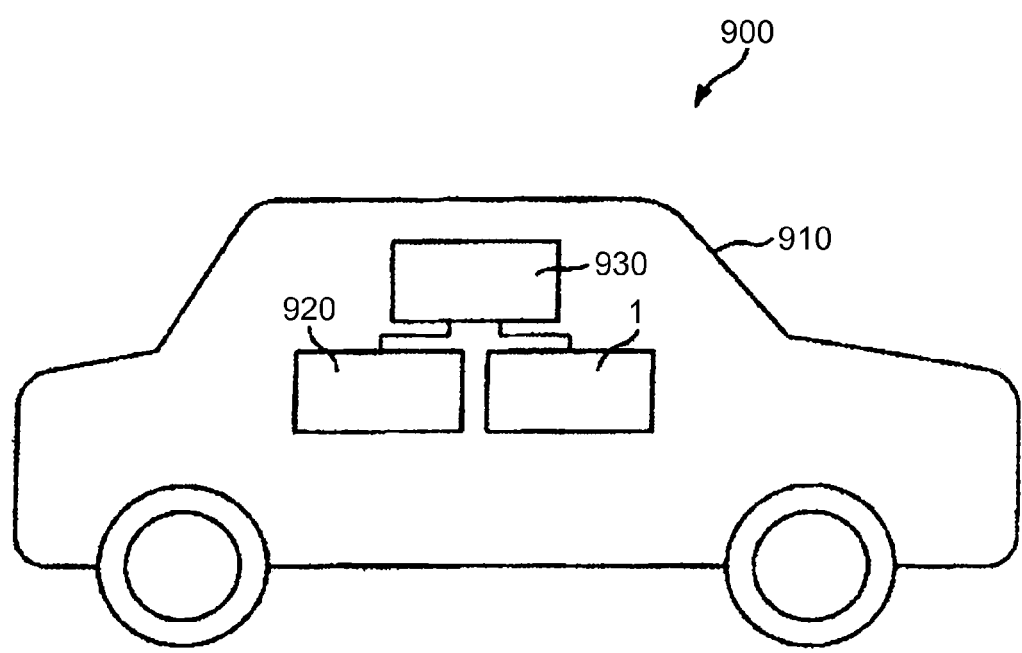
FIG. 15 is a view illustrating an example of a mobile body using the force detection device (sensor element) according to the invention.

FIG. 15 is a view illustrating one example of the mobile body using the force detection device (sensor element) according to the invention. A mobile body 900 in FIG. 15 can move using provided power. The mobile body 900 is not particularly limited. However, for example, the mobile body 900 includes a vehicle such as an automobile, a motorcycle, an airplane, a boat, and a train, and a robot such as a bipedal walking robot and a wheeled mobile robot.

The mobile body 900 has a main body 910 (for example, a housing of the vehicle and a main body of the robot), a power unit 920 which supplies power for moving the main body 910, the force detection device 1 according to the invention which detects the external force generated by the movement of the main body 910, and a control unit 930. As the force detection device 1, the same one as in the above-described respective embodiments is used.

If the power supplied from the power unit 920 moves the main body 910, vibrations or accelerations occur due to the movement. The force detection device 1 detects the external force caused by the vibrations or the accelerations occurring due to the movement. The external force detected by the force detection device 1 is transmitted to the control unit 930. The control unit 930 controls the power unit 920 and the like in response to the external force transmitted from the force detection device 1. In this manner, the control unit 930 can perform control such as posture control, vibration control, and acceleration control.

Hitherto, the sensor element, the force detection device, the robot, the electronic component transport device, the electronic component inspection device, and the component processing device according to the invention have been described with reference to the illustrated embodiments. However, the invention is not limited thereto. The configurations of each unit can be replaced with any desired configuration which has the same function. In addition, any other configuration may be added to the invention.

The invention may be configured so that any two or more configurations (characteristics) within the above-described embodiments are combined with one another.

In the invention, the package may be omitted.

In the invention, the element may protrude from the first convex portion in a plan view of the first substrate.

In the invention, the element may protrude from a second convex portion in the plan view of the first substrate.

In the invention, for example, instead of the pressurizing bolts, those which do not have a function of pressurizing the element may be used. In addition, a fixing method other than the bolts may be employed.

The robot according to the invention is not limited to an arm-type robot (robot arm). As long as the robot has the arm, the robot may be another type of robot such as a scalar robot, and a legged walking (travelling) robot, for example.

Without being limited to the robot, the electronic component transport device, the electronic component inspection device, and the component processing device, the force detection device (sensor element) according to the invention can also be applied to other devices, for example, such as another transport device, another inspection device, measuring devices including a vibrometer, an accelerometer, a gravimeter, a dynamometer, a seismometer, and an inclinometer, or an input device.

Third Embodiment

Hereinafter, a third embodiment will be described. The same reference numerals are given to configuration elements which are the same as those in the first embodiment and the second embodiment, and description thereof will be omitted.

Figure 18:
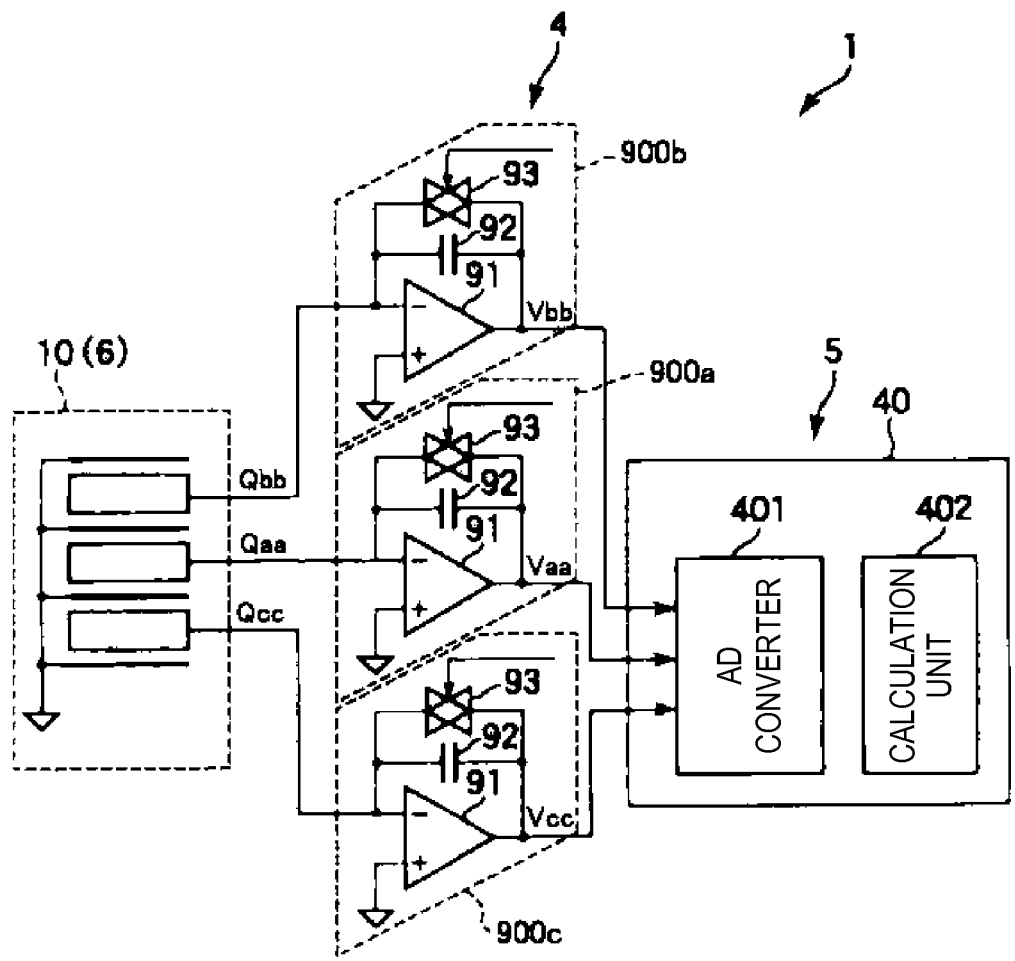
FIG. 18 is a circuit diagram schematically illustrating the force detection device illustrated in FIG. 1.
Figure 19:
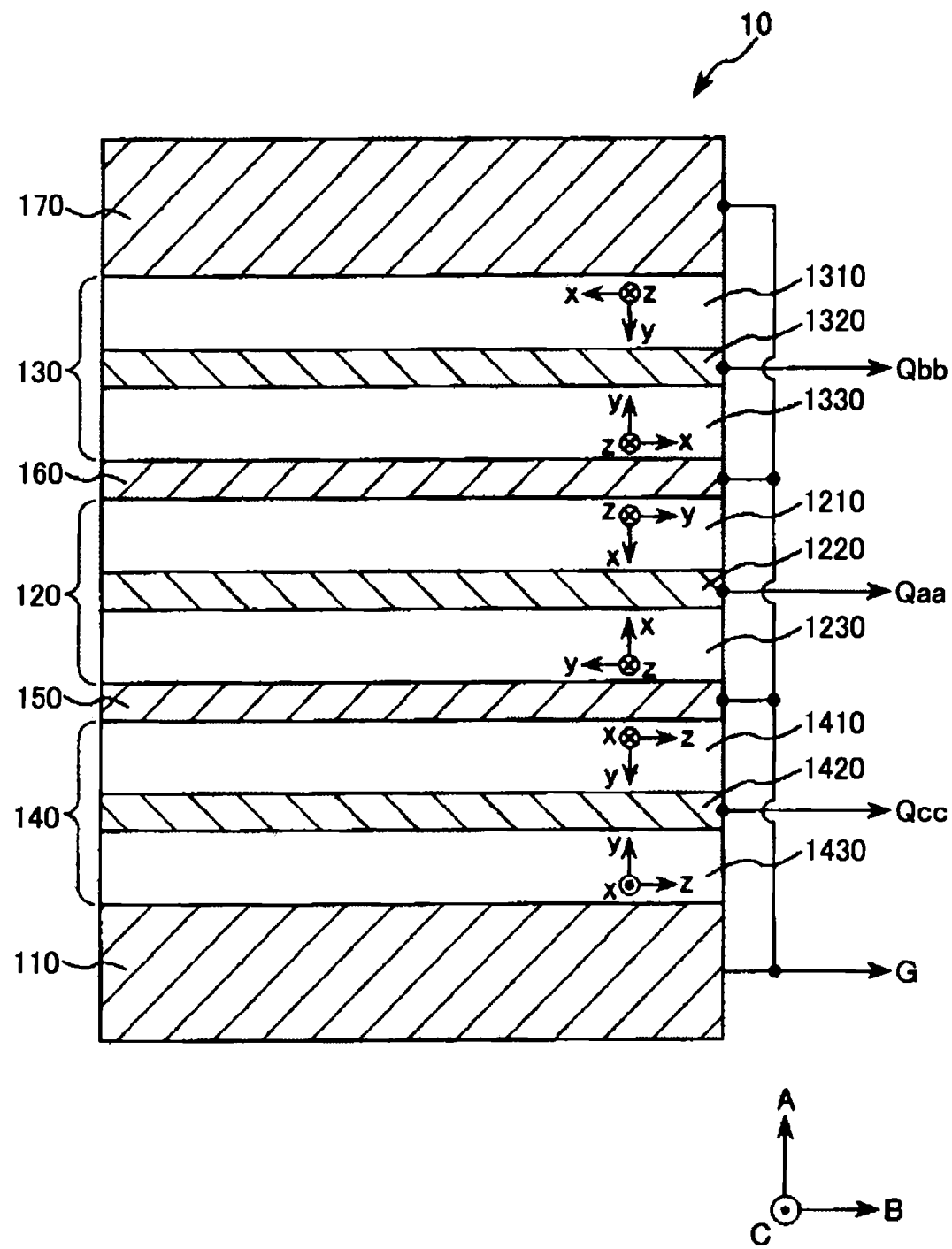
FIG. 19 is a cross-sectional view schematically illustrating the charge output element illustrated in FIG. 1.
Figure 20:
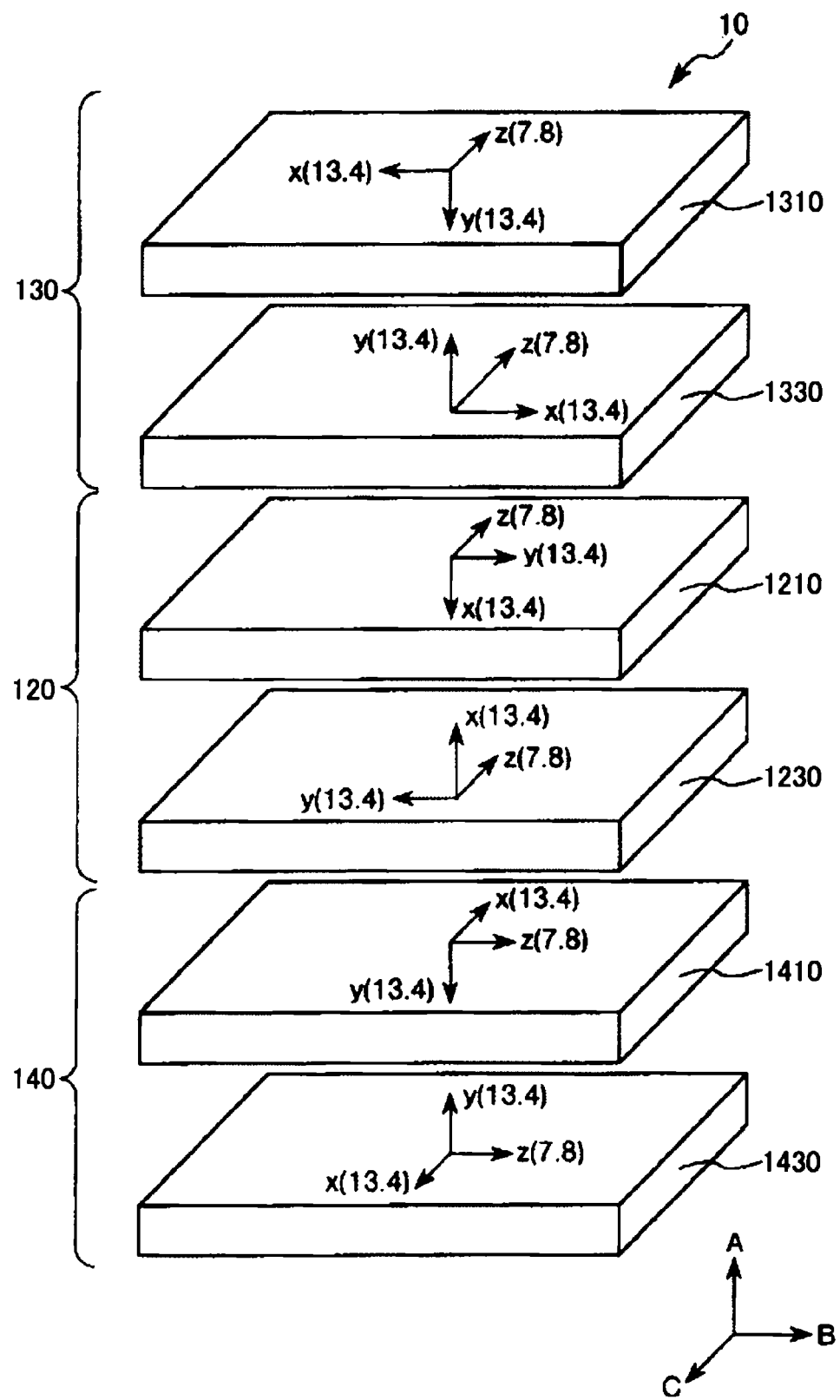
FIG. 20 is an exploded perspective view illustrating a thermal expansion coefficient and a crystal axis of the charge output element illustrated in FIG. 1.
Figure 21:
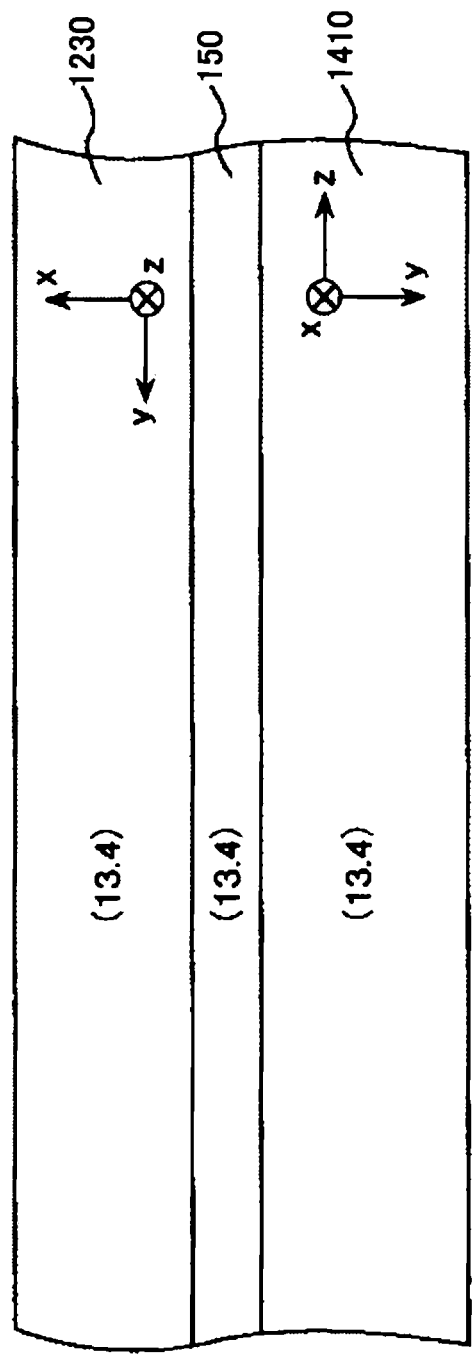
FIG. 21 is an enlarged cross-sectional view illustrating the thermal expansion coefficient and the crystal axis of the charge output element illustrated in FIG. 1.
Figure 22B:
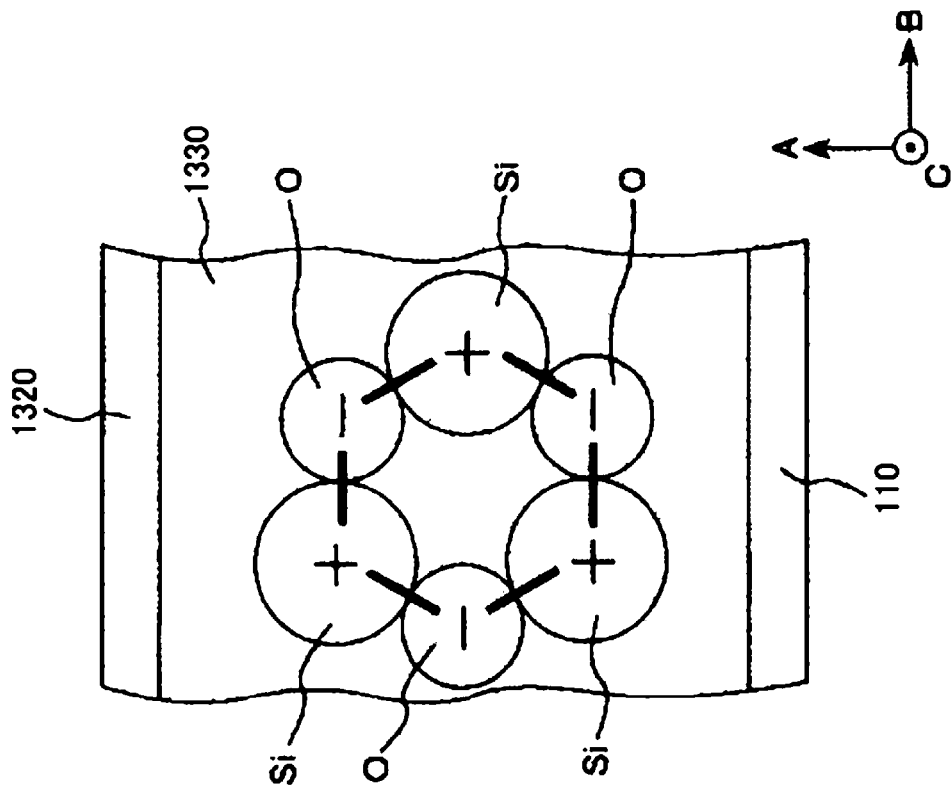
FIGS. 22A and 22B are schematic views schematically illustrating a Y cut quartz crystal plate of the charge output element illustrated in FIG. 1.
Figure 22A:
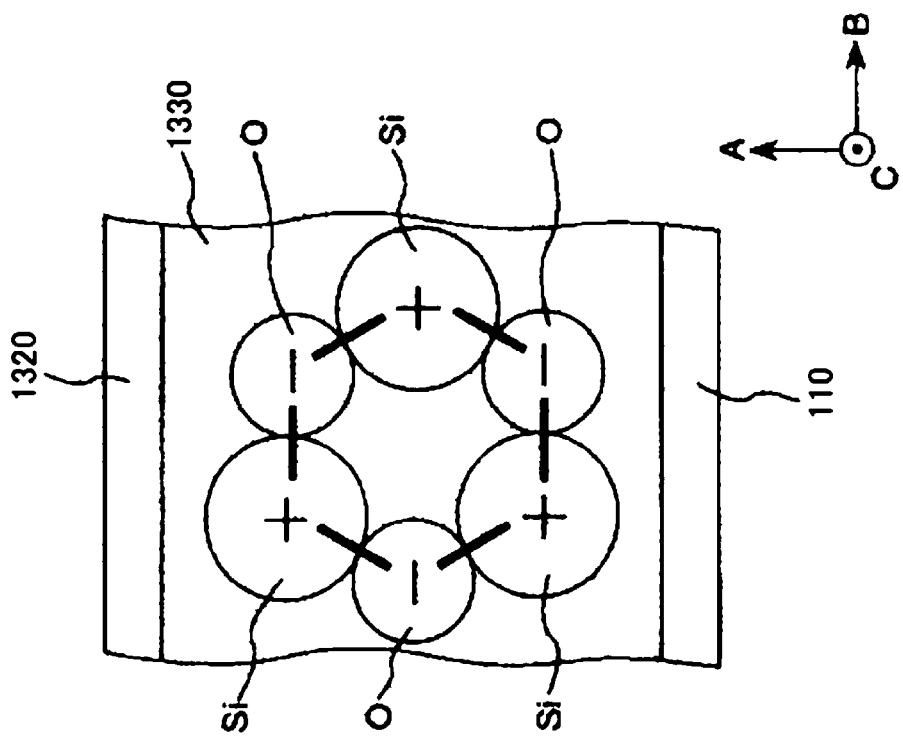

FIG. 18 is a circuit diagram schematically illustrating the force detection device illustrated in FIG. 1. FIG. 19 is a cross-sectional view schematically illustrating the charge output element illustrated in FIG. 1. FIG. 20 is an exploded perspective view illustrating a thermal expansion coefficient and a crystal axis of the charge output element illustrated in FIG. 1. FIG. 21 is an enlarged cross-sectional view illustrating the thermal expansion coefficient and the crystal axis of the charge output element illustrated in FIG. 1. FIGS. 22A and 22B are schematic views schematically illustrating the Y cut quartz crystal plate of the charge output element illustrated in FIG. 1, FIG. 22A is a cross-sectional view illustrating a natural state, and FIG. 22B is a cross-sectional view illustrating a state where compressive stress is generated. In FIGS. 18 and 19, an upper side is referred to as "up (upward)", and a lower side is referred to as "down (downward)".

As illustrated in FIG. 18, the analog circuit board 4 includes a conversion output circuit 900a which converts a charge Qaa output from the charge output element 10 of the mounted sensor device 6 into a voltage Vaa, a conversion output circuit 900b which converts a charge Qbb output from the charge output element 10 into a voltage Vbb, and a conversion output circuit 900c which converts a charge Qcc output from the charge output element 10 into a voltage Vcc. In addition, the digital circuit board 5 includes the external force detection circuit 40 which detects the applied external force. The digital circuit board 5 is arranged on the first substrate 2 side of the analog circuit board 4, that is, between the analog circuit board 4 and the first substrate 2.

Conversion Output Circuit

The conversion output circuits 900a, 900b, and 900c are connected to the charge output element 10. The conversion output circuit 900a has a function of converting the charge Qaa output from the charge output element 10 into the voltage Vaa. The conversion output circuit 900b has a function of converting the charge Qbb output from the charge output element 10 into the voltage Vbb. The conversion output circuit 900c has a function of converting the charge Qcc output from the charge output element 10 into the voltage Vcc. The conversion output circuits 900a, 900b, and 900c are the same as one another. Accordingly, hereinafter, the conversion output circuit 900c will be described as a representative example.

The conversion output circuit 900c has a function of converting the charge Qcc output from the charge output element 10 into the voltage Vcc and outputting the voltage Vcc. The conversion output circuit 900c has the operational amplifier 91, the capacitor 92, and the switching element 93. A first input terminal (negative input) of the operational amplifier 91 is connected to the output electrode layer 122 of the charge output element 10, and a second input terminal (positive input) of the operational amplifier 91 is connected to the ground (reference potential point). In addition, an output terminal of the operational amplifier 91 is connected to the external force detection circuit 40. The capacitor 92 is connected to a portion between the first input terminal and the output terminal of the operational amplifier 91. The switching element 93 is connected to the portion between the first input terminal and the output terminal of the operational amplifier 91, and is connected to the capacitor 92 in parallel. In addition, the switching element 93 is connected to a drive circuit (not illustrated). The switching element 93 performs a switching operation in response to on/off signals output from the drive circuit.

When the switching element 93 is turned off, the charge Qcc output from the charge output element 10 is accumulated in the capacitor 92 having the capacitance C1, and is output to the external force detection circuit 40 as the voltage Vcc. Then, when the switching element 93 is turned on, both terminals of the capacitor 92 are short-circuited. As a result, the charge Qcc accumulated in the capacitor 92 is discharged to become zero coulombs. Accordingly, the voltage V output to the external force detection circuit 40 becomes zero volts. The operation in which the switching element 93 is turned on is referred to as resetting of the conversion output circuit 900c. The voltage Vcc output from the ideal conversion output circuit 900c is proportional to an accumulation amount of the charge Qcc output from the charge output element 10.

For example, the switching element 93 is a semiconductor switching element such as a metal oxide semiconductor field effect transistor (MOSFET). The semiconductor switching element is smaller and lighter than a mechanical switch. Therefore, the semiconductor switching element is advantageously used in allowing the force detection device 1 to be smaller and lighter. Hereinafter, as a representative example, a case will be described in which the MOSFET is used as the switching element 93.

The switching element 93 has a drain electrode, a source electrode, and a gate electrode. Any one of the drain electrode and the source electrode of the switching element 93 is connected to the first input terminal of the operational amplifier 91, and the other one of the drain electrode and the source electrode is connected to the output terminal of the operational amplifier 91. In addition, the gate electrode of the switching element 93 is connected to a drive circuit (not illustrated).

The same drive circuit may be connected to the switching element 93 of the respective conversion output circuits 900a, 900b, and 900c, or respectively different drive circuits may be connected thereto. All synchronized on/off signals are input from the drive circuit to each switching element 93. In this manner, operations of the switching elements 93 of the respective conversion output circuits 900a, 900b, and 900c are synchronized. That is, on/off timings of the switching elements 93 of the respective conversion output circuits 900a, 900b, and 900c are coincident with one another.

External Force Detection Circuit

The external force detection circuit 40 has a function of detecting an applied external force, based on the voltage Vaa output from the conversion output circuit 900a, the voltage Vbb output from the conversion output circuit 900b, and the voltage Vcc output from the conversion output circuit 900c. The external force detection circuit 40 has the AD converter 401 connected to the conversion output circuits 900a, 900b, and 900c, and the calculation unit 402 connected to the AD converter 401.

The AD converter 401 has a function of converting analog signals of the voltages Vaa, Vcc, and Vbb into digital signals. The voltages Vaa, Vcc, and Vbb converted into the digital signals by the AD converter 401 are input to the calculation unit 402.

That is, when the external force is applied so that relative positions of the first substrate 2 and the second substrate 3 are displaced from each other in the A-axis direction, the AD converter 401 outputs the voltage Vaa. Similarly, when the external force is applied so that the relative positions of the first substrate 2 and the second substrate 3 are displaced from each other in the C-axis direction, the AD converter 401 outputs the voltage Vcc. In addition, when the external force is applied so that the relative positions of the first substrate 2 and the second substrate 3 are displaced from each other in the B-axis direction, the AD converter 401 outputs the voltage Vbb.

The calculation unit 402 performs various processes such as correction for eliminating a difference in sensitivities between the respective conversion output circuits 900a, 900b, and 900c, for example, on the digitally converted voltages Vaa, Vcc, and Vbb. Then, the calculation unit 402 outputs three signals which are proportional to the accumulated amount of the charges Qaa, Qcc, and Qbb output from the charge output element 10. The three signals correspond to three axial forces (shearing force, compressive force, and tensile force) applied to the charge output element 10. Accordingly, the force detection device 1 can detect the three axial forces applied to the charge output element 10.

Next, the charge output element 10 will be described.

The charge output element 10 has a function of outputting the three charges Qaa, Qbb, and Qcc in response to the respective external forces applied (received) along the three axes (A-axis, B-axis, and C-axis) which are orthogonal to one another.

A shape of the charge output element 10 is not particularly limited. However, in the embodiment, the charge output element 10 has a quadrangular shape in a plan view of the first substrate 2, that is, when viewed in a direction perpendicular to the first substrate 2. For example, another outer shape of the charge output element 10 in the plan view includes another polygonal shape such as a pentagonal shape, a circular shape, or an oval shape.

As illustrated in FIG. 19, the charge output element 10 has four ground electrode layers 110, 150, 160, and 170 which are connected to the ground (reference potential point), a first sensor 120 which outputs the charge Qaa in response to the external force (compressive force/tensile force) parallel to the A-axis, a second sensor 130 which outputs the charge Qbb in response to the external force (shearing force) parallel to the B-axis, and a third sensor 140 which outputs the charge Qcc in response to the external force (shearing force) parallel to the C-axis. In addition, in the charge output element 10, the ground electrode layer 110, the third sensor 140, the ground electrode layer (second electrode layer) 150, the first sensor 120, the ground electrode layer (first electrode layer) 160, the second sensor 130, and the ground electrode layer 170 are stacked sequentially in this order from the negative side in the A-axis direction. In FIG. 19, a stacking direction of sensors 120, 130, and 140 is set to be the A-axis direction, and directions orthogonal to the A-axis direction and orthogonal to each other are respectively set to be the B-axis direction and the C-axis direction.

The first sensor 120 has a function of outputting the charge Qaa in response to the external force (compressive force/tensile force) applied (received) along the A-axis. The first sensor 120 is configured to output a positive charge in response to the compressive force parallel to the A-axis and to output a negative charge in response to the tensile force parallel to the A-axis.

The first sensor 120 has a first piezoelectric layer (first piezoelectric plate) 1210, a second piezoelectric layer (first piezoelectric plate) 1230 which is disposed to oppose the first piezoelectric layer 1210, and an output electrode layer 1220 which is disposed between the first piezoelectric layer 1210 and the second piezoelectric layer 1230 and outputs the charge Qaa.

The first piezoelectric layer 1210 has an x-axis, a y-axis, and a z-axis which are three crystal axes orthogonal to one another. The x-axis represents an axis oriented in a direction in which the charge is generated when a load is applied thereto (hereinafter, the same is applied to the other piezoelectric layers). In the first piezoelectric layer 1210, the x-axis direction and the A-axis direction are coincident with each other, the y-axis direction and the B-axis direction are coincident with each other, and the z-axis direction and the C-axis direction are coincident with each other.

If the compressive force parallel to the A-axis is applied to a surface of the first piezoelectric layer 1210, the charge is induced inside the first piezoelectric layer 1210 by the piezoelectric effect. As a result, the positive charge is gathered near a surface on the output electrode layer 1220 side of the first piezoelectric layer 1210, and the negative charge is gathered near a surface on the ground electrode layer 160 side of the first piezoelectric layer 1210. Similarly, if the tensile force parallel to the A-axis is applied to the surface of the first piezoelectric layer 1210, the negative charge is gathered near the surface on the output electrode layer 1220 side of the first piezoelectric layer 1210, and the positive charge is gathered near the surface on the ground electrode layer 160 side of the first piezoelectric layer 1210.

The second piezoelectric layer 1230 has the crystal axes which are the same as those of the first piezoelectric layer 1210, and is arranged in a state where the first piezoelectric layer 1210 is rotated around the C-axis by 180°.

If the compressive force parallel to the A-axis is applied to a surface of the second piezoelectric layer 1230, the charge is induced inside the second piezoelectric layer 1230 by the piezoelectric effect. As a result, the positive charge is gathered near a surface on the output electrode layer 1220 side of the second piezoelectric layer 1230, and the negative charge is gathered near a surface on the ground electrode layer 150 side of the second piezoelectric layer 1230. Similarly, if the tensile force parallel to the A-axis is applied to the surface of the second piezoelectric layer 1230, the negative charge is gathered near the surface on the output electrode layer 1220 side of the second piezoelectric layer 1230, and the positive charge is gathered near the surface on the ground electrode layer 150 side of the second piezoelectric layer 1230.

The first piezoelectric layer 1210 and the second piezoelectric layer 1230 are configured to have quartz crystal in a viewpoint of excellent characteristics in a wide dynamic range, strong stiffness, high natural frequency, and high load resistance performance.

The piezoelectric layers such as the first piezoelectric layer 1210 and the second piezoelectric layer 1230 which generate the charge with respect to the external force (compressive force/tensile force) perpendicular to the surface direction of the layer are configured to have an X cut quartz crystal plate (X plate) in the embodiment.

The first piezoelectric layer 1210 and the second piezoelectric layer 1230 may be configured to include topaz, barium titanate, lead titanate, lead zirconate titanate (PZT: $Pb(Zr,Ti)O_3$), lithium niobate, lithium tantalate, and the like.

The output electrode layer 1220 has a function of outputting the positive charge or the negative charge generated inside the first piezoelectric layer 1210 and inside the second piezoelectric layer 1230, as the charge Qbb. As described above, if the compressive force parallel to the A-axis is applied to the surface of the first piezoelectric layer 1210 or the surface of the second piezoelectric layer 1230, the positive charge is gathered near the output electrode layer 1220. As a result, the positive charge Qbb is output from the output electrode layer 1220. In contrast, if the tensile force parallel to the A-axis is applied to the surface of the first piezoelectric layer 1210 or the surface of the second piezoelectric layer 1230, the negative charge is gathered near the output electrode layer 1220. As a result, the negative charge Qbb is output from the output electrode layer 1220.

The second sensor 130 has a function of outputting the charge Qbb in response to the external force (shearing force) applied (received) along the B-axis. The second sensor 130 is configured to output the positive charge in response to the external force applied along a positive direction of the B-axis and to output the negative charge in response to the external force applied along a negative direction of the B-axis.

The second sensor 130 is arranged on a positive side of the A-axis of the first sensor 120 so as to oppose the first sensor 120. The second sensor 130 has a third piezoelectric layer (second piezoelectric plate) 1310, a fourth piezoelectric layer (second piezoelectric plate) 1330 which is disposed to oppose the third piezoelectric layer 1310, and an output electrode layer 1320 which is disposed between the third piezoelectric layer 1310 and the fourth piezoelectric layer 1330 and outputs the charge Qbb.

The third piezoelectric layer 1310 has the x-axis, the y-axis, and the z-axis which are three crystal axes orthogonal to one another. In the third piezoelectric layer 1310, the x-axis direction and the B-axis direction are coincident with each other, the y-axis direction and the A-axis direction are coincident with each other, and the z-axis direction and the C-axis direction are coincident with each other.

If the external force along the positive direction of the B-axis is applied to the surface of the third piezoelectric layer 1310, the charge is induced inside the third piezoelectric layer 1310 by the piezoelectric effect. As a result, the positive charge is gathered near the surface on the output electrode layer 1320 side of the third piezoelectric layer 1310, and the negative charge is gathered near the surface on the ground electrode layer 170 side of the third piezoelectric layer 1310. Similarly, if the external force along the negative direction of the B-axis is applied to the surface of the third piezoelectric layer 1310, the negative charge is gathered near the surface on the output electrode layer 1320 side of the third piezoelectric layer 1310, and the positive charge is gathered near the surface on the ground electrode layer 170 side of the third piezoelectric layer 1310.

The fourth piezoelectric layer 1330 has the crystal axes which are the same as those of the third piezoelectric layer 1310, and is arranged in a state where the third piezoelectric layer 1310 is rotated around the C-axis by 180°.

If the external force along the positive direction of the B-axis is applied to the surface of the fourth piezoelectric layer 1330, the charge is induced inside the fourth piezoelectric layer 1330 by the piezoelectric effect. As a result, the positive charge is gathered near the surface on the output electrode layer 1320 side of the fourth piezoelectric layer 1330, and the negative charge is gathered near the surface on the ground electrode layer 160 side of the fourth piezoelectric layer 1330. Similarly, if the external force along the negative direction of the B-axis is applied to the surface of the fourth piezoelectric layer 1330, the negative charge is gathered near the surface on the output electrode layer 1320 side of the fourth piezoelectric layer 1330, and the positive charge is gathered near the surface on the ground electrode layer 160 side of the fourth piezoelectric layer 1330.

As a configuration material for the third piezoelectric layer 1310 and the fourth piezoelectric layer 1330, it is possible to employ the configuration material which is the same as that of the first piezoelectric layer 1210 and the second piezoelectric layer 1230. The piezoelectric layers such as the third piezoelectric layer 1310 and the fourth piezoelectric layer 1330 which generate the charge with respect to the external force (shearing force) along the surface direction of the layer are configured to have a Y cut quartz crystal plate (Y plate) in the embodiment.

The output electrode layer 1320 has a function of outputting the positive charge or the negative charge generated inside the third piezoelectric layer 1310 and inside the fourth piezoelectric layer 1330, as the charge Qaa. As described above, if the external force along the positive direction of the B-axis is applied to the surface of the third piezoelectric layer 1310 or the surface of the fourth piezoelectric layer 1330, the positive charge is gathered near the output electrode layer 1320. As a result, the positive charge Qaa is output from the output electrode layer 1320. In contrast, if the external force along the negative direction of the B-axis is applied to the surface of the third piezoelectric layer 1310 or the surface of the fourth piezoelectric layer 1330, the negative charge is gathered near the output electrode layer 1320. As a result, the negative charge Qaa is output from the output electrode layer 1320.

The third sensor 140 has a function of outputting the charge Qcc in response to the external force (shearing force) applied (received) along the C-axis. The third sensor 140 is configured to output the positive charge in response to the external force applied along the positive direction of the C-axis and to output the negative charge in response to the external force applied along the negative direction of the C-axis.

The third sensor 140 opposes the first sensor 120, and is disposed on a side opposite to the second sensor 130 of the first sensor 120, that is, on a negative side of the A-axis. The third sensor 140 has a fifth piezoelectric layer (third piezoelectric plate) 1410, a sixth piezoelectric layer (third piezoelectric plate) 1430 which is disposed to oppose the fifth piezoelectric layer 1410, and an output electrode layer 1420 which is disposed between the fifth piezoelectric layer 1410 and the sixth piezoelectric layer 1430 and outputs the charge Qcc.

The fifth piezoelectric layer 1410 has the x-axis, the y-axis, and the z-axis which are three crystal axes orthogonal to one another. In the fifth piezoelectric layer 1410, the x-axis direction and the C-axis direction are coincident with each other, the y-axis direction and the A-axis direction are coincident with each other, and the z-axis direction and the B-axis direction are coincident with each other.

If the external force along the positive direction of the c-axis is applied to the surface of the fifth piezoelectric layer 1410, the charge is induced inside the fifth piezoelectric layer 1410 by the piezoelectric effect. As a result, the positive charge is gathered near the surface on the output electrode layer 1420 side of the fifth piezoelectric layer 1410, and the negative charge is gathered near the surface on the ground electrode layer 150 side of the fifth piezoelectric layer 1410. Similarly, if the external force along the negative direction of the C-axis is applied to the surface of the fifth piezoelectric layer 1410, the negative charge is gathered near the surface on the output electrode layer 1420 side of the fifth piezoelectric layer 1410, and the positive charge is gathered near the surface on the ground electrode layer 150 side of the fifth piezoelectric layer 1410.

The sixth piezoelectric layer 1430 has the crystal axes which are the same as those of the fifth piezoelectric layer 1410, and is arranged in a state where the fifth piezoelectric layer 1410 is rotated around the B-axis by 180°.

If the external force along the positive direction of the C-axis is applied to the surface of the sixth piezoelectric layer 1430, the charge is induced inside the sixth piezoelectric layer 1430 by the piezoelectric effect. As a result, the positive charge is gathered near the surface on the output electrode layer 1420 side of the sixth piezoelectric layer 1430, and the negative charge is gathered near the surface on the ground electrode layer 110 side of the sixth piezoelectric layer 1430. Similarly, if the external force along the negative direction of the C-axis is applied to the surface of the sixth piezoelectric layer 1430, the negative charge is gathered near the surface on the output electrode layer 1420 side of the sixth piezoelectric layer 1430, and the positive charge is gathered near the surface on the ground electrode layer 110 side of the sixth piezoelectric layer 1430.

The piezoelectric layers such as the fifth piezoelectric layer 1410 and the sixth piezoelectric layer 1430 which generate the charge with respect to the external force (shearing force) along the surface direction of the layer are configured to have the Y cut quartz crystal plate in the embodiment. The fifth piezoelectric layer 1410 is arranged in a state where the third piezoelectric layer 1310 is rotated (turned) around the A-axis by 90°. The sixth piezoelectric layer 1430 is arranged in a state where the fourth piezoelectric layer 1330 is rotated (turned) around the A-axis by 90°.

The fifth piezoelectric layer 1410 is arranged in a state where the third piezoelectric layer 1310 is rotated (displaced) around the A-axis by 90°. The sixth piezoelectric layer 1430 is arranged in a state where the fourth piezoelectric layer 1330 is rotated (turned) around the A-axis by 90°.

The output electrode layer 1420 has a function of outputting the positive charge or the negative charge generated inside the fifth piezoelectric layer 1410 and inside the sixth piezoelectric layer 1430, as the charge Qcc. As described above, if the external force along the positive direction of the C-axis is applied to the surface of the fifth piezoelectric layer 1410 or the surface of the sixth piezoelectric layer 1430, the positive charge is gathered near the output electrode layer 1420. As a result, the positive charge Qcc is output from the output electrode layer 1420. In contrast, if the external force along the negative direction of the C-axis is applied to the surface of the fifth piezoelectric layer 1410 or the surface of the sixth piezoelectric layer 1430, the negative charge is gathered near the output electrode layer 1420. As a result, the negative charge Qcc is output from the output electrode layer 1420.

As described, the third sensor 140, the second sensor 130, and the first sensor 120 are stacked so that force detection directions of the respective sensors are orthogonal to one another. In this manner, the respective sensors can induce the charge in response to force components orthogonal to one another. Therefore, the charge output element 10 can output the three charges Qaa, Qbb, and Qcc in response to the respective forces (deformations) along three axes (A-axis, B-axis, and C-axis).

In the respective sensors 120, 130, and 140, every two piezoelectric layers are arranged in a state where the piezoelectric layers are mutually rotated around the B-axis or the C-axis by 180°. In this manner, as compared to a case where each sensor is configured to have only one of the two piezoelectric layers and the output electrode layer, it is possible to increase the positive charge or the negative charge which is gathered near the output electrode layer. As a result, it is possible to increase the charge Q output from the output electrode layer.

The respective piezoelectric layers 1210, 1230, 1310, 1330, 1410, and 1430 have different thermal expansion coefficients in the x-axis direction, the y-axis direction, and the z-axis direction. In the respective piezoelectric layers 1210, 1230, 1310, 1330, 1410, and 1430, the thermal expansion coefficient in the x-axis direction is the same as the thermal expansion coefficient in the y-axis direction. The thermal expansion coefficient in the z-axis direction is smaller than the thermal expansion coefficients in the x-axis direction and in the y-axis direction. As illustrated in FIG. 20, in the respective piezoelectric layers 1210, 1230, 1310, 1330, 1410, and 1430, the thermal expansion coefficient in the x-axis direction is $13.4 \times 10^{-6}$ (1/K), the thermal expansion coefficient in the y-axis direction is $13.4 \times 10^{-6}$ (1/K), and the thermal expansion coefficient in the z-axis direction is $7.8 \times 10^{-6}$ (1/K).

Here, in many cases, as an electrode, a general electronic device employs a metal film having a three layer configuration in which an Au layer is interposed between a pair of Cr layers. When the metal film is employed as the electrode layers 1220, 1320, 1420, and the respective ground electrode layers 110, 150, 160, and 170, there may be a problem in that the charge output element detects unnecessary stress. According to the study of the inventors, the following reason is considered to cause the problem.

In the Cr layer, the thermal expansion coefficients in the A-axis direction, the B-axis direction, and the C-axis direction are the same as one another. The thermal expansion coefficient is $4.9 \times 10^{-6}$ (1/K). In addition, in the Au layer, the thermal expansion coefficients in the A-axis direction, the B-axis direction, and the C-axis direction are the same as one another. The thermal expansion coefficient is $14.2 \times 10^{-6}$ (1/K).

Figure 24:
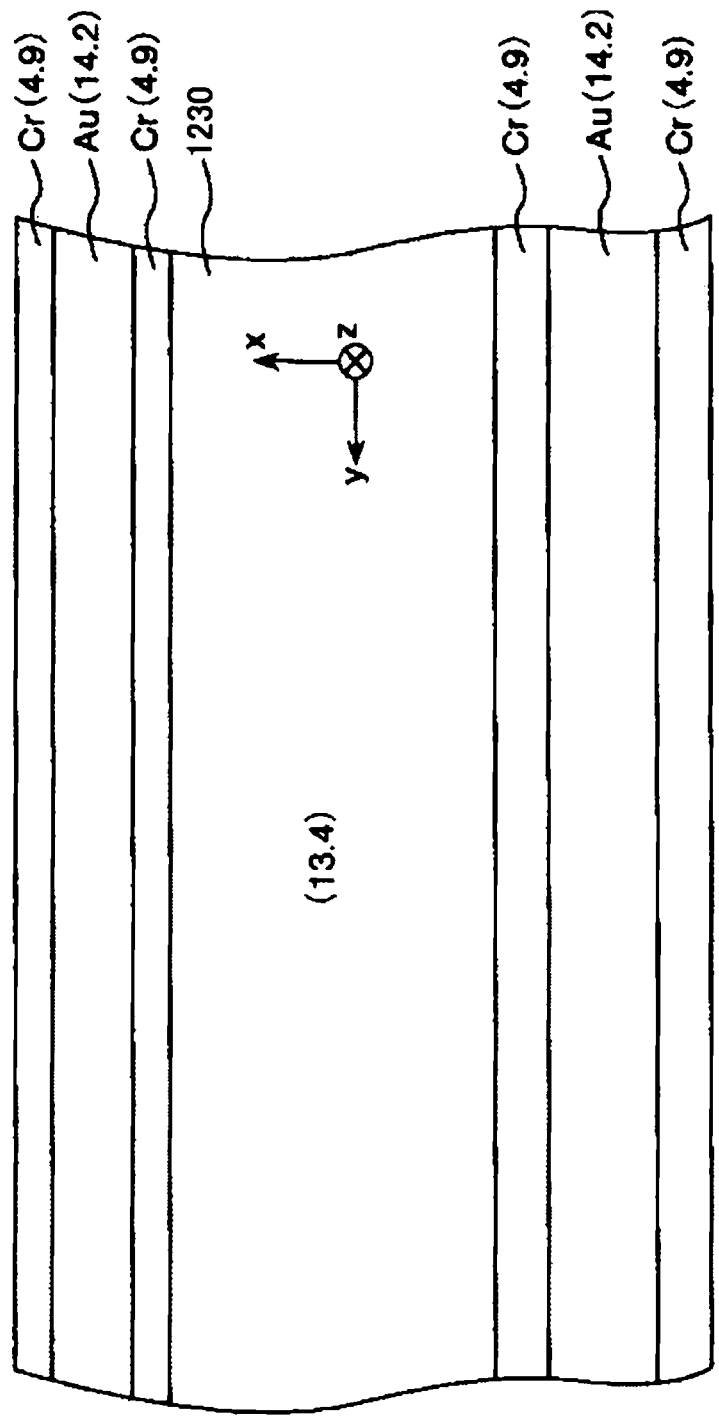
FIG. 24 is an enlarged cross-sectional view illustrating a thermal expansion coefficient and a crystal axis of a charge output element in the related art.

Therefore, as illustrated in FIG. 24, in the second piezoelectric layer 1230, the ground electrode layer (particularly, the Cr layer) adjacent to the second piezoelectric layer 1230, and the output electrode layer (particularly, the Cr layer), the thermal expansion coefficients in the B-axis direction are greatly different. For this reason, for example, the temperature changes in the external environment cause greater thermal expansion or greater thermal contraction in the second piezoelectric layer 1230 as compared to the ground electrode layer 150 and the output electrode layer 1220. That is, the expansion rate or the contraction rate of the ground electrode layer 150 and the output electrode layer 1220 due to the temperature changes in the external environment is smaller than that of the second piezoelectric layer 1230.

If the thermal expansion occurs, a force is applied to the second piezoelectric layer 1230 in a direction of preventing the thermal expansion by the Cr layer adjacent to the second piezoelectric layer 1230. As a result, compressive stress in the B-axis direction is generated in the second piezoelectric layer 1230. In contrast, if the thermal contraction occurs, a force is applied to the second piezoelectric layer 1230 in a direction of preventing the thermal contraction by the Cr layer adjacent to the second piezoelectric layer 1230. As a result, tensile stress in the B-axis direction is generated in the second piezoelectric layer 1230.

As described above, the second piezoelectric layer 1230 is configured to have the X cut quartz crystal plate. Accordingly, when viewed in the C-axis direction, the second piezoelectric layer 1230 has a hexagonal unit crystal structure in which the Si atoms and the O atoms are alternately arranged in six apexes (refer to FIG. 25A). In the second piezoelectric layer 1230, the unit crystal structure is in a state where one diagonal line out of three diagonal lines connecting the Si atoms and the O atoms is substantially parallel to the thickness direction of the second piezoelectric layer 1230.

Figure 25B:
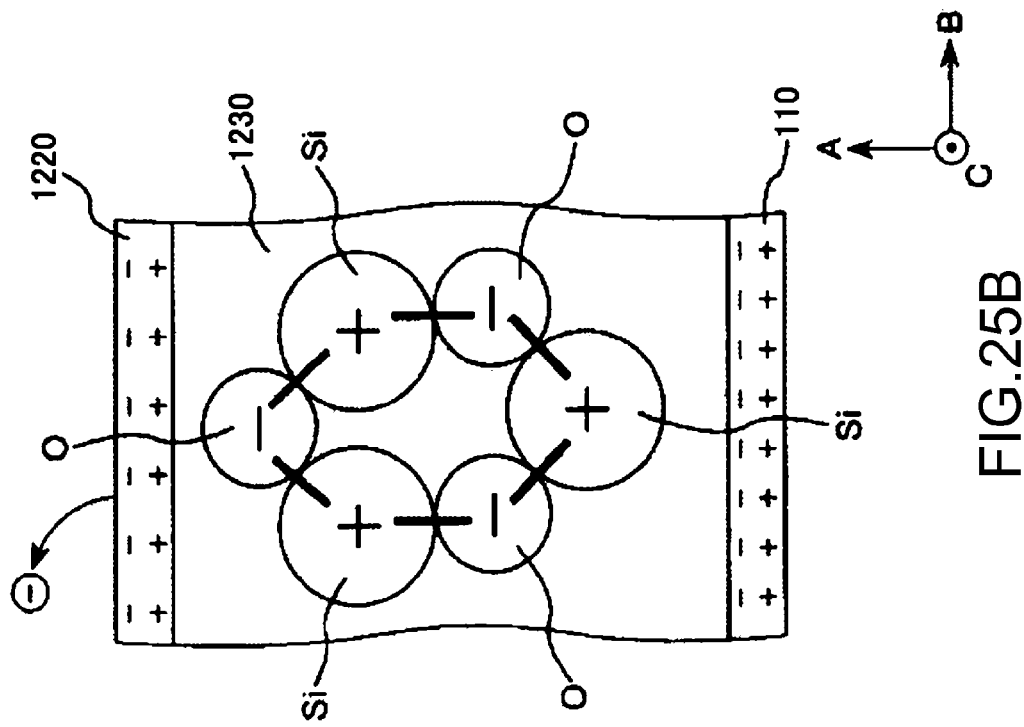
FIGS. 25A and 25B are schematic views schematically illustrating an X cut quartz crystal plate of the charge output element illustrated in FIG. 24.
Figure 25A:
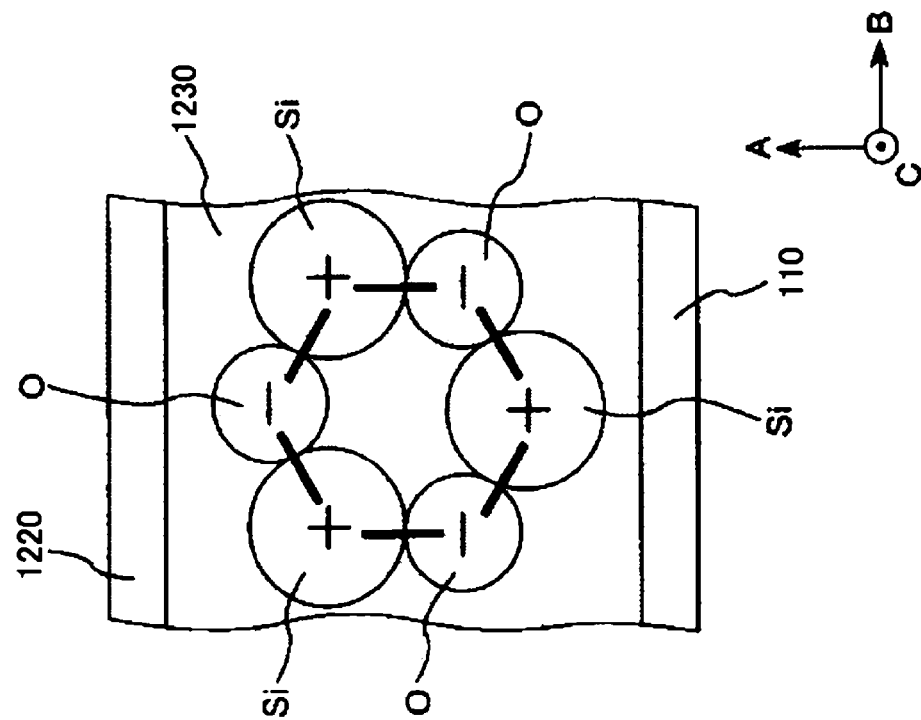

If the above-described compressive stress in the B-axis direction is applied to this second piezoelectric layer 1230, the unit crystal structure of the second piezoelectric layer 1230 is stretched in the A-axis direction as illustrated in FIG. 25B. Therefore, the O atoms close to the output electrode layer 1220 are brought into a state of being closer to the output electrode layer 1220 than the Si atoms adjacent thereto. The Si atoms close to the ground electrode layer 150 are brought into a state being closer to the ground electrode layer 150 than the O atoms adjacent thereto. As a result, in the output electrode layer 1220, the positive charge is gathered on the second piezoelectric layer 1230 side by electrostatic induction, and the negative charge is gathered on a side opposite to the second piezoelectric layer 1230 (first piezoelectric layer 1210 side). Accordingly, the negative charge is detected in the output electrode layer 1220.

In contrast, if the above-described tensile stress in the B-axis direction is applied to the second piezoelectric layer 1230, the unit crystal structure is crushed in the A-axis direction (not illustrated). Accordingly, the O atoms close to the output electrode layer 1220 are brought into a state of being further away from the output electrode layer 1220 than the Si atoms adjacent thereto. The Si atoms close to the ground electrode layer 150 are brought into a state being further away from the ground electrode layer 110 than the O atoms adjacent thereto. As a result, in the output electrode layer 1220, the negative charge is gathered on the second piezoelectric layer 1230 side by the electrostatic induction, and the positive charge is gathered on the side opposite to the second piezoelectric layer 1230 (first piezoelectric layer 1210 side). Accordingly, the positive charge is detected in the output electrode layer 1220.

As described above, when the metal film having a three layer configuration in which the Au layer is interposed between a pair of the Cr layers is employed as the electrode layers 1220, 1320, 1420, and the respective ground electrode layers 110, 150, 160, and 170, since the thermal expansion coefficients of the ground electrode layer 1210, the output electrode layer 1220, and the second piezoelectric layer 1230 are different, the temperature changes in the external environment may cause a possibility that the positive charge or the negative charge is unintentionally detected in the output electrode layer 1220.

In order to solve this problem, an effective method is that the thermal expansion coefficient of each piezoelectric layer is caused to be as close as possible to the thermal expansion coefficient of each electrode. Therefore, the invention is configured so that a difference in the thermal expansion coefficients between each piezoelectric layer (particularly, the second piezoelectric layer 1230) and each electrode (particularly, the ground electrode layer 150 adjacent to the second piezoelectric layer 1230) is set to be equal to or smaller than 10% of the thermal expansion coefficient of each piezoelectric layer (particularly, the second piezoelectric layer 1230). In this manner, even when the temperature in the external environment is changed, the second piezoelectric layer 1230 and the ground electrode layer 150 expand or contract by a substantially equal expansion rate or contraction rate. Accordingly, in the charge output element 10, it is possible to suppress or prevent unnecessary stress detection caused by the temperature changes in the external environment.

The difference in the thermal expansion coefficients may be equal to or smaller than 10% of the thermal expansion coefficient of the piezoelectric layer. However, the difference is preferably equal to or smaller than 8%, and more preferably equal to or smaller than 5%. In this manner, in the charge output element 10, it is possible to more reliably suppress or prevent the unnecessary stress detection caused by the temperature changes in the external environment.

For example, a configuration material which can satisfy the above-described condition in the output electrode layers 1220, 1320, 1420, and the respective ground electrode layers 110, 150, 160, and 170 includes Ni, Co, and Bi. These materials can be used alone or in combination of two or more materials. It is preferable that these materials have the thermal expansion coefficient close to the thermal expansion coefficient of the above-described piezoelectric material (particularly, $SiO_2$). Specifically, Ni, Co, and Bi respectively have the same thermal expansion coefficients in the A-axis direction, the B-axis direction, and the C-axis direction. The thermal expansion coefficient of Ni is $13.4 \times 10^{-6}$ (1/K), the thermal expansion coefficient of Co is $13.0 \times 10^{-6}$ (1/K), and the thermal expansion coefficient of Bi is $13.3 \times 10^{-6}$ (1/K).

Among these materials, it is more preferable that the output electrode layers 1220, 1320, 1420, and the respective ground electrode layers 110, 150, 160, and 170 be configured to include Ni. In this manner, the thermal expansion coefficient in the y-axis direction of the second piezoelectric layer 1230 and the thermal expansion coefficient of the ground electrode layer 150 are coincident with each other. That is, the thermal expansion coefficients in the B-axis direction of the second piezoelectric layer 1230 and the ground electrode layer 150 are coincident with each other in practice. Accordingly, when the charge output element 10 expands or contracts due to the temperature changes, the second piezoelectric layer 1230 and the ground electrode layer 150 respectively have the expansion rates or the contraction rates in the B-axis direction which are coincident with each other in practice. Accordingly, the second piezoelectric layer 1230 and the ground electrode layer 150 expand or contract as much as each other due to the temperature changes. As a result, it is possible to prevent or suppress the compressive stress or the tensile stress from being generated in the second piezoelectric layer 1230. Therefore, it is possible to suppress or prevent the charge Qaa from being output from the output electrode layer 1220 due to the temperature changes.

In the description, the term "coincident in practice" means that a difference between the thermal expansion coefficient in the y-axis direction of the second piezoelectric layer 1230 and the thermal expansion coefficient of the ground electrode layer 150 is equal to or smaller than 1% of the thermal expansion coefficient of the second piezoelectric layer 1230. In addition, hereinafter, a case will be described where the electrode layers 1220, 1320, 1420, and the respective ground electrode layers 110, 150, 160, and 170 are configured to include Ni.

As illustrated in FIG. 20, the thermal expansion coefficient of the ground electrode layer 150 is $13.4 \times 10^{-6}$ (1/K), and the thermal expansion coefficient in the z-axis direction of the fifth piezoelectric layer 1410 is $7.8 \times 10^{-6}$ (1/K). That is, the ground electrode layer 150 adjacent to the second piezoelectric layer 1230 and the fifth piezoelectric layer 1410 respectively have different thermal expansion coefficients in the B-axis direction. Therefore, the compressive stress or the tensile stress in the B-axis direction is generated in the ground electrode layer 150 and the fifth piezoelectric layer 1410 due to the temperature changes.

However, the fifth piezoelectric layer 1410 is configured to have the Y cut quartz crystal plate. The unit crystal structure of the fifth piezoelectric layer 1410 is a unit crystal structure in which the Si atoms and the O atoms are wound in a spiral shape in the z-axis (B-axis) (not illustrated). Therefore, when the compressive stress is generated in the B-axis direction, the spiral-shaped unit crystal structure is crushed in the B-axis direction. At this time, whereas the spiral-shaped unit crystal structure is just crushed in the B-axis direction, the Si atoms and the O atoms do not substantially move in the A-axis direction. As a result, in the fifth piezoelectric layer 1410, the piezoelectric effect is not generated, and the charge is not generated from the output electrode layer 1420.

In the fifth piezoelectric layer 1410, when the tensile stress in the B-axis direction is generated, the spiral-shaped unit crystal structure is stretched in the B-axis direction. At this time, whereas the spiral-shaped unit crystal structure is just stretched in the B-axis direction, the Si atoms and the O atoms do not substantially move in the A-axis direction. As a result, in the fifth piezoelectric layer 1410, the piezoelectric effect is not generated, and the charge is not generated from the output electrode layer 1420.

As described above, according to an aspect of the invention, the sensor element has the first piezoelectric plate which is configured to have the X cut quartz crystal plate, the second piezoelectric plate which is configured to have the Y cut quartz crystal plate and which is stacked in the A-axis direction with the first piezoelectric plate, and which outputs a charge in response to an external force in the B-axis direction, and the third piezoelectric plate which is configured to have the Y cut quartz crystal plate, which is stacked in the A-axis direction so as to interpose the second piezoelectric plate between the third piezoelectric plate and the first piezoelectric plate and so as to be arranged to turn around the A-axis. In addition, a difference between the thermal expansion coefficient in the B-axis direction of the first piezoelectric plate and the thermal expansion coefficient in the B-axis direction of the second electrode layer is equal to or smaller than 10% of the thermal expansion coefficient of the first piezoelectric plate in the B-axis direction. According to these configurations, even if the first piezoelectric plate and the second electrode layer thermally expand or thermally contract due to the temperature changes, it is possible to suppress or prevent the charge from being output. As a result, it is possible to obtain a very reliable charge output element.

According to an aspect of the invention, when detecting the external force, the charge output element can suppress or prevent the charge from being output due to the temperature changes by using the same principle. Therefore, it is possible to further improve the detection accuracy of the charge output element.

The output electrode layers 1220, 1320, 1420, and the ground electrode layers 110, 150, 160, and 170 are configured to include the same material. Therefore, during a manufacturing process of the charge output element 10, it is possible to save time and labor for preparing different materials. Accordingly, it is possible to relatively easily form the charge output element 10.

Among the output electrode layers 1220, 1320, 1420, and the ground electrode layers 110, 150, 160, and 170, at least the ground electrode layer 150 and the output electrode layer 1220 may be configured to include a material which mainly contains at least one type of metal selected from a group consisting of Ni, Co, and Bi, or an alloy containing these metals.

Fourth Embodiment

Hereinafter, a fourth embodiment will be described. The same reference numerals are given to configuration elements which are the same as those in the first to third embodiments, and description thereof will be omitted.

Conversion Output Circuit

Figure 23:
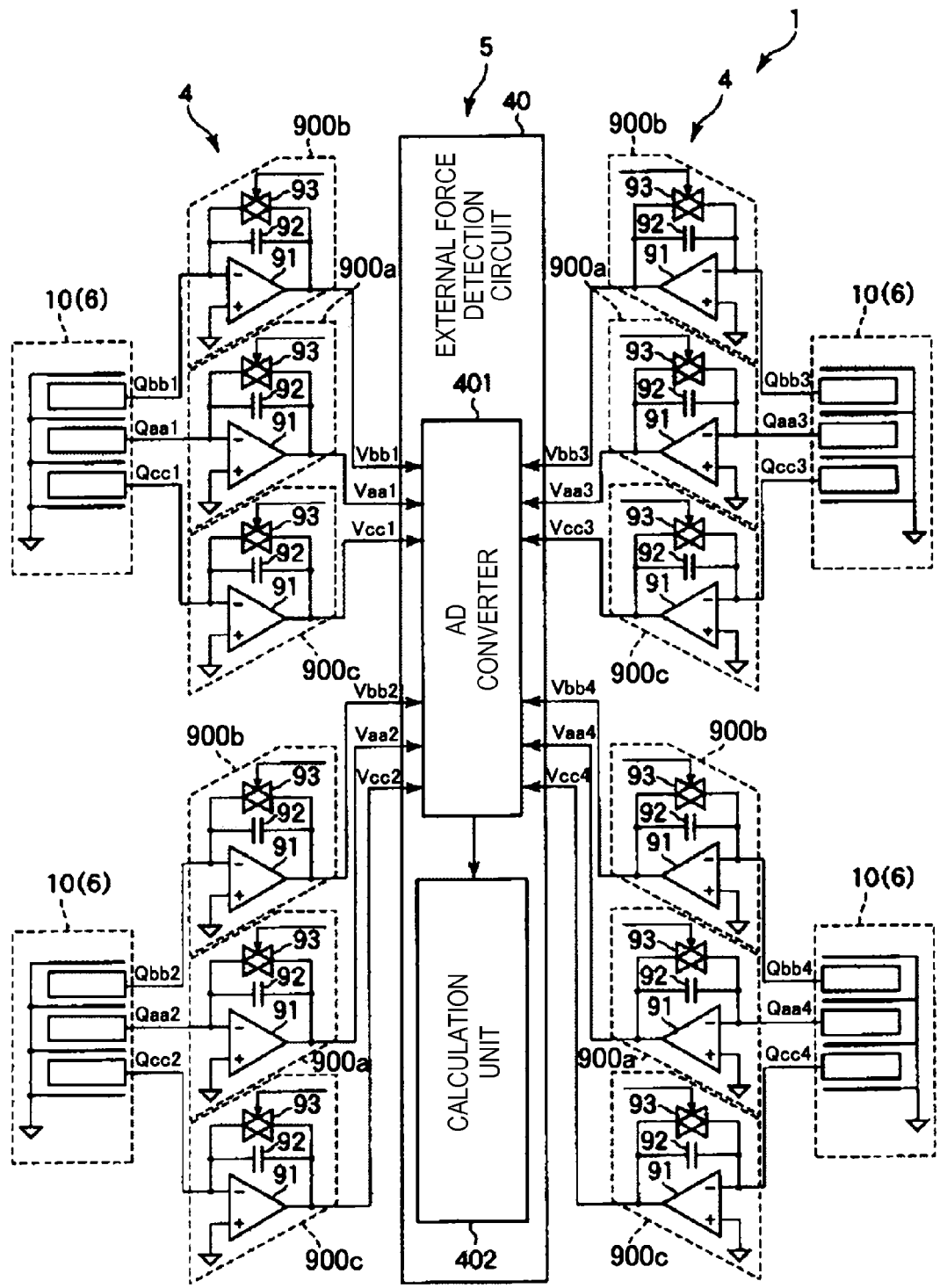
FIG. 23 is a circuit diagram schematically illustrating the force detection device illustrated in FIG. 7.

As illustrated in FIG. 23, conversion output circuits 900a, 900b, and 900c are respectively connected to the respective charge output elements 10. The conversion output circuits 900a, 900b, and 900c are the same as the conversion output circuit 90 according to the above-described third embodiment, and thus, description thereof will be omitted.

External Force Detection Circuit

The external force detection circuit 40 has a function of detecting an applied external force, based on voltages Vaa1, Vaa2, Vaa3, and Vaa4 output from the respective conversion output circuits 900a, voltages Vbb1, Vbb2, Vbb3, and Vbb4 output from the respective conversion output circuits 900b, and voltages Vcc1, Vcc2, Vcc3, and Vcc4 output from the respective conversion output circuits 900c. The external force detection circuit 40 has the AD converter 401 connected to the conversion output circuits 900a, 900b, and 900c, and the calculation unit 402 connected to the AD converter 401.

The AD converter 401 has a function of converting analog signals of the voltages Vaa1, Vcc1, Vbb1, Vaa2, Vcc2, Vbb2, Vaa3, Vcc3, Vbb3, Vaa4, Vcc4, and Vbb4 into digital signals. The voltages Vaa1, Vcc1, Vbb1, Vaa2, Vcc2, Vbb2, Vaa3, Vcc3, Vbb3, Vaa4, Vcc4, and Vbb4 converted into the digital signals by the AD converter 401 are input to the calculation unit 402.

That is, when the external force is applied so that relative positions of the first substrate 2 and the second substrate 3 are displaced from each other in the A-axis direction, the AD converter 401 outputs the voltages Vaa1, Vaa2, Vaa3, and Vaa4. Similarly, when the external force is applied so that the relative positions of the first substrate 2 and the second substrate 3 are displaced from each other in the C-axis direction, the AD converter 401 outputs the voltages Vcc1, Vcc2, Vcc3, and Vcc4. In addition, when the external force is applied so that the relative positions of the first substrate 2 and the second substrate 3 are displaced from each other in the B-axis direction, the AD converter 401 outputs the voltages Vbb1, Vbb2, Vbb3, and Vbb4.

The first substrate 2 and the second substrate 3 can perform relative displacement of being mutually rotated around the A-axis, relative displacement of being mutually rotated around the B-axis, and relative displacement of being mutually rotated around the C-axis. The external force generated by each rotation can be transmitted to the charge output element 10.

Based on the digitally converted voltages Vaa1, Vcc1, Vbb1, Vaa2, Vcc2, Vbb2, Vaa3, Vcc3, Vbb3, Vaa4, Vcc4, and Vbb4, the calculation unit 402 has a function of calculating a translational force component Faa in the A-axis direction, a translational force component Fcc in the C-axis direction, a translational force component Fbb in the B-axis direction, a rotational force component Maa around the A-axis, a rotational force component Mcc around the C-axis, and a rotational force component Mbb around the B-axis. The respective force components can be obtained by the following equations.

$$Faa = Vaa1 + Vaa2 + Vaa3 + Vaa4$$

$$Fcc = Vcc1 + Vcc2 + Vcc3 + Vcc4$$

$$Fbb = Vbb1 + Vbb2 + Vbb3 + Vbb4$$

$$Maa = k \times (Vbb4 - Vbb2)$$

$$Mcc = j \times (Vbb3 - Vbb1)$$

$$Mbb = k \times (Vaa2 - Vaa4) + a \times (Vcc1 - Vcc3)$$

Here, j and k are a constant.

As described above, the force detection device 1 can detect the six axial forces.

For example, the calculation unit 402 may be configured to perform correction for eliminating a difference in sensitivities between the respective conversion output circuits 900a, 900b, and 900c.

Hitherto, the sensor element, the force detection device, the robot, the electronic component transport device, the electronic component inspection device, and the component processing device according to the invention have been described with reference to the illustrated embodiments. However, the invention is not limited thereto. The configurations of each unit can be replaced with any desired configuration which has the same function. In addition, any other configuration may be added to the invention.

The invention may be configured so that any two or more configurations (characteristics) within the above-described embodiments are combined with one another.

In the invention, the package may be omitted.

In the invention, the element may protrude from the first convex portion in a plan view of the first substrate.

In the invention, the element may protrude from the second convex portion in the plan view of the first substrate.

In the invention, for example, instead of the pressurizing bolts, those which do not have a function of pressurizing the element may be used. In addition, a fixing method other than the bolts may be employed.

The robot according to the invention is not limited to an arm-type robot (robot arm). As long as the robot has the arm, the robot may be another type of robot such as a scalar robot, and a legged walking (travelling) robot, for example.

Without being limited to the robot, the electronic component transport device, the electronic component inspection device, and the component processing device, the force detection device (sensor element) according to the invention can also be applied to other devices, for example, such as another transport device, another inspection device, measuring devices including a vibrometer, an accelerometer, a gravimeter, a dynamometer, a seismometer, and an inclinometer, or an input device.

Fifth Embodiment

Hereinafter, a fifth embodiment will be described. The same reference numerals are given to configuration elements which are the same as those in the first to fourth embodiments, and description thereof will be omitted.

Figure 26:
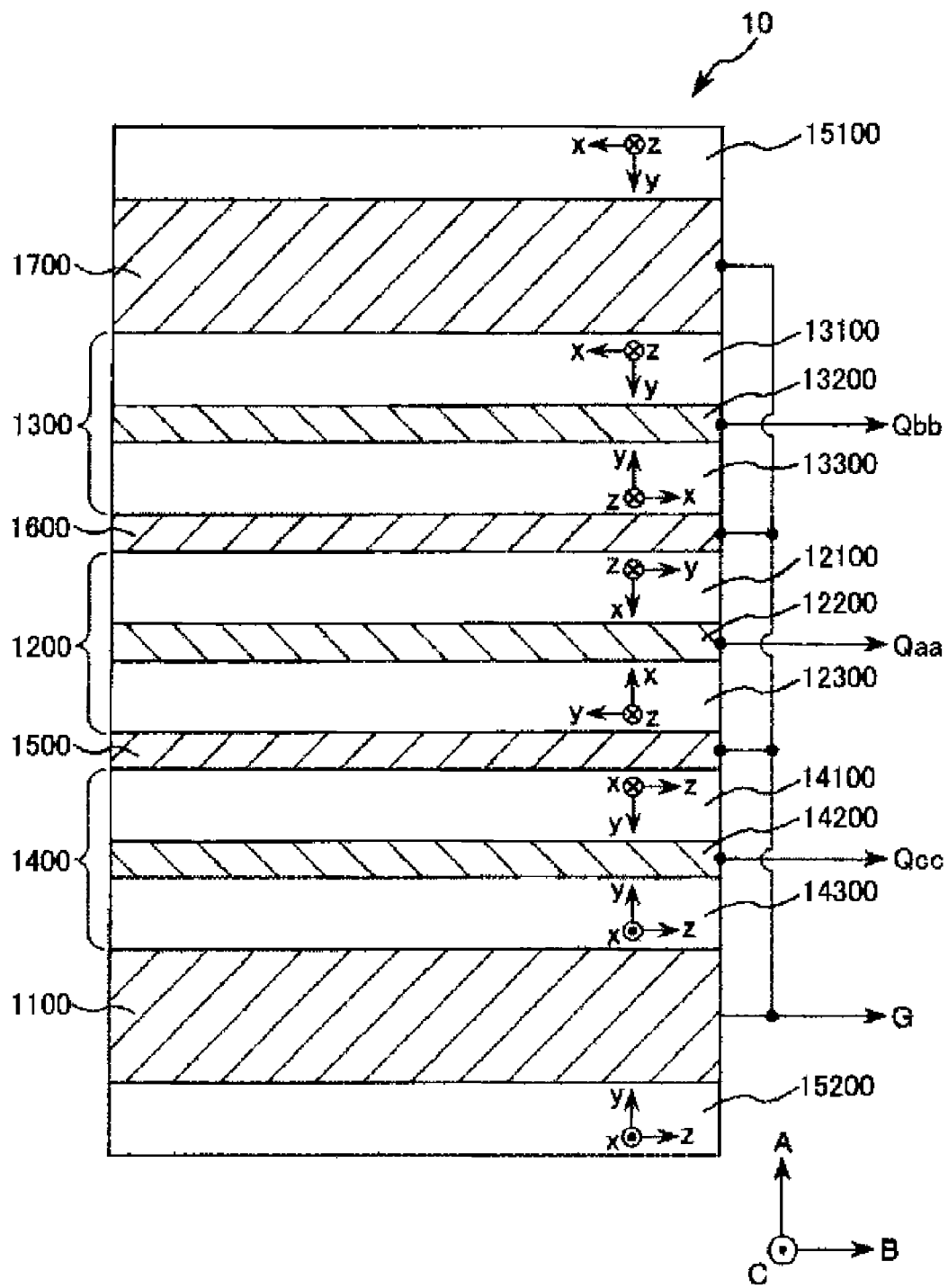
FIG. 26 is a cross-sectional view schematically illustrating the charge output element illustrated in FIG. 1.

As illustrated in FIG. 26, the charge output element 10 has four ground electrode layers 1100, 1500, 1600, and 1700 which are connected to the ground (reference potential point), a first sensor 1200 which outputs the charge Qaa in response to the external force (compressive force/tensile force) parallel to the A-axis, a second sensor 1300 which outputs the charge Qbb in response to the external force (shearing force) parallel to the B-axis, and a third sensor 1400 which outputs the charge Qcc in response to the external force (shearing force) parallel to the C-axis. In addition, in the charge output element 10, the ground electrode layer 1100, the third sensor 1400, the ground electrode layer (second electrode layer) 1500, the first sensor 1200, the ground electrode (first electrode layer) 1600, the second sensor 1300, and the ground electrode layer 1700 are stacked from the negative side in the A-axis direction sequentially in this order. In FIG. 26, a stacking direction of sensors 1200, 1300, and 1400 is set to be the A-axis direction, and directions orthogonal to the A-axis direction and orthogonal to each other are respectively set to be the B-axis direction and the C-axis direction.

The first sensor 1200 has a function of outputting the charge Qaa in response to the external force (compressive force/tensile force) applied (received) along the A-axis. The first sensor 1200 is configured to output a positive charge in response to the compressive force parallel to the A-axis and to output a negative charge in response to the tensile force parallel to the A-axis.

The first sensor 1200 has a first piezoelectric layer (first piezoelectric plate) 12100, a second piezoelectric layer (first piezoelectric plate) 12300 which is disposed to oppose the first piezoelectric layer 12100, and an output electrode layer 12200 which is disposed between the first piezoelectric layer 12100 and the second piezoelectric layer 12300 and outputs the charge Qaa.

The first piezoelectric layer 12100 has an x-axis, a y-axis, and a z-axis which are three crystal axes orthogonal to one another. The x-axis direction represents an axis oriented in a direction in which the charge is generated when a load is applied thereto (hereinafter, the same is applied to the other piezoelectric layers). In the first piezoelectric layer 12100, the x-axis direction and the A-axis direction are coincident with each other, the y-axis direction and the B-axis direction are coincident with each other, and the z-axis direction and the C-axis direction are coincident with each other.

If the compressive force parallel to the A-axis is applied to a surface of the first piezoelectric layer 12100, the charge is induced inside the first piezoelectric layer 12100 by the piezoelectric effect. As a result, the positive charge is gathered near a surface on the output electrode layer 12200 side of the first piezoelectric layer 12100, and the negative charge is gathered near a surface on the ground electrode layer 1600 side of the first piezoelectric layer 12100. Similarly, if the tensile force parallel to the A-axis is applied to the surface of the first piezoelectric layer 12100, the negative charge is gathered near the surface on the output electrode layer 12200 side of the first piezoelectric layer 12100, and the positive charge is gathered near the surface on the ground electrode layer 1600 side of the first piezoelectric layer 12100.

The second piezoelectric layer 12300 has the crystal axes which are the same as those of the first piezoelectric layer 12100, and is arranged in a state where the first piezoelectric layer 12100 is rotated around the C-axis by 180°.

If the compressive force parallel to the A-axis is applied to a surface of the second piezoelectric layer 12300, the charge is induced inside the second piezoelectric layer 12300 by the piezoelectric effect. As a result, the positive charge is gathered near a surface on the output electrode layer 12200 side of the second piezoelectric layer 12300, and the negative charge is gathered near a surface on the ground electrode layer 1500 side of the second piezoelectric layer 12300. Similarly, if the tensile force parallel to the A-axis is applied to the surface of the second piezoelectric layer 12300, the negative charge is gathered near the surface on the output electrode layer 12200 side of the second piezoelectric layer 12300, and the positive charge is gathered near the surface on the ground electrode layer 1500 side of the second piezoelectric layer 12300.

The first piezoelectric layer 12100 and the second piezoelectric layer 12300 are configured to have quartz crystal in a viewpoint of excellent characteristics in a wide dynamic range, strong stiffness, high natural frequency, and high load resistance performance.

The piezoelectric layers such as the first piezoelectric layer 12100 and the second piezoelectric layer 12300 which generate the charge with respect to the external force (compressive force/tensile force) perpendicular to the surface direction of the layer are configured to have an X cut quartz crystal plate in the embodiment.

The first piezoelectric layer 12100 and the second piezoelectric layer 12300 may be configured to include topaz, barium titanate, lead titanate, lead zirconate titanate (PZT: Pb(Zr,Ti)O3), lithium niobate, lithium tantalate, and the like.

The output electrode layer 12200 has a function of outputting the positive charge or the negative charge generated inside the first piezoelectric layer 12100 and inside the second piezoelectric layer 12300, as the charge Qbb. As described above, if the compressive force parallel to the A-axis is applied to the surface of the first piezoelectric layer 12100 or the surface of the second piezoelectric layer 12300, the positive charge is gathered near the output electrode layer 12200. As a result, the positive charge Qbb is output from the output electrode layer 12200. In contrast, if the tensile force parallel to the A-axis is applied to the surface of the first piezoelectric layer 12100 or the surface of the second piezoelectric layer 12300, the negative charge is gathered near the output electrode layer 12200. As a result, the negative charge Qbb is output from the output electrode layer 12200.

The second sensor 1300 has a function of outputting the charge Qbb in response to the external force (shearing force) applied (received) along the B-axis. The second sensor 1300 is configured to output the positive charge in response to the external force applied along the positive direction of the B-axis and to output the negative charge in response to the external force applied along the negative direction of the B-axis.

The second sensor 1300 is arranged on a positive side of the A-axis of the first sensor 1200 so as to oppose the first sensor 1200. The second sensor 1300 has a third piezoelectric layer (second piezoelectric plate) 13100, a fourth piezoelectric layer (second piezoelectric plate) 13300 which is disposed to oppose the third piezoelectric layer 13100, and an output electrode layer 13200 which is disposed between the third piezoelectric layer 13100 and the fourth piezoelectric layer 13300 and outputs the charge Qbb.

The third piezoelectric layer 13100 has the x-axis, the y-axis, and the z-axis which are three crystal axes orthogonal to one another. In the third piezoelectric layer 13100, the x-axis direction and the B-axis direction are coincident with each other, the y-axis direction and the A-axis direction are coincident with each other, and the z-axis direction and the C-axis direction are coincident with each other.

If the external force along the positive direction of the B-axis is applied to the surface of the third piezoelectric layer 13100, the charge is induced inside the third piezoelectric layer 13100 by the piezoelectric effect. As a result, the positive charge is gathered near the surface on the output electrode layer 13200 side of the third piezoelectric layer 13100, and the negative charge is gathered near the surface on the ground electrode layer 1700 side of the third piezoelectric layer 13100. Similarly, if the external force along the negative direction of the B-axis is applied to the surface of the third piezoelectric layer 13100, the negative charge is gathered near the surface on the output electrode layer 13200 side of the third piezoelectric layer 13100, and the positive charge is gathered near the surface on the ground electrode layer 1700 side of the third piezoelectric layer 13100.

The fourth piezoelectric layer 13300 has the crystal axes which are the same as those of the third piezoelectric layer 13100, and is arranged in a state where the third piezoelectric layer 13100 is rotated around the C-axis by 180°.

If the external force along the positive direction of the B-axis is applied to the surface of the fourth piezoelectric layer 13300, the charge is induced inside the fourth piezoelectric layer 13300 by the piezoelectric effect. As a result, the positive charge is gathered near the surface on the output electrode layer 13200 side of the fourth piezoelectric layer 13300, and the negative charge is gathered near the surface on the ground electrode layer 1600 side of the fourth piezoelectric layer 13300. Similarly, if the external force along the negative direction of the B-axis is applied to the surface of the fourth piezoelectric layer 13300, the negative charge is gathered near the surface on the output electrode layer 13200 side of the fourth piezoelectric layer 13300, and the positive charge is gathered near the surface on the ground electrode layer 1600 side of the fourth piezoelectric layer 13300.

As a configuration material for the third piezoelectric layer 13100 and the fourth piezoelectric layer 13300, it is possible to employ the configuration material which is the same as that of the first piezoelectric layer 12100 and the second piezoelectric layer 12300. The piezoelectric layers such as the third piezoelectric layer 13100 and the fourth piezoelectric layer 13300 which generate the charge with respect to the external force (shearing force) along the surface direction of the layer are configured to have a Y cut quartz crystal plate (Y plate) in the embodiment.

The output electrode layer 13200 has a function of outputting the positive charge or the negative charge generated inside the third piezoelectric layer 13100 and inside the fourth piezoelectric layer 13300, as the charge Qaa. As described above, if the external force along the positive direction of the B-axis is applied to the surface of the third piezoelectric layer 13100 or the surface of the fourth piezoelectric layer 13300, the positive charge is gathered near the output electrode layer 13200. As a result, the positive charge Qaa is output from the output electrode layer 13200. In contrast, if the external force along the negative direction of the B-axis is applied to the surface of the third piezoelectric layer 13100 or the surface of the fourth piezoelectric layer 13300, the negative charge is gathered near the output electrode layer 13200. As a result, the negative charge Qaa is output from the output electrode layer 13200.

The third sensor 1400 has a function of outputting the charge Qcc in response to the external force (shearing force) applied (received) along the C-axis. The third sensor 1400 is configured to output the positive charge in response to the external force applied along the positive direction of the C-axis and to output the negative charge in response to the external force applied along the negative direction of the C-axis.

The third sensor 1400 opposes the first sensor 1200, and is disposed on a side opposite to the second sensor 1300 of the first sensor 1200, that is, on a negative side of the A-axis. The third sensor 1400 has a fifth piezoelectric layer (third piezoelectric plate) 14100, a sixth piezoelectric layer (third piezoelectric plate) 14300 which is disposed to oppose the fifth piezoelectric layer 14100, and an output electrode layer 14200 which is disposed between the fifth piezoelectric layer 14100 and the sixth piezoelectric layer 14300 and outputs the charge Q.

The fifth piezoelectric layer 14100 has the x-axis, the y-axis, and the z-axis which are three crystal axes orthogonal to one another. In the fifth piezoelectric layer 14100, the x-axis direction and the C-axis direction are coincident with each other, the y-axis direction and the A-axis direction are coincident with each other, and the z-axis direction and the B-axis direction are coincident with each other.

If the external force along the positive direction of the c-axis is applied to the surface of the fifth piezoelectric layer 14100, the charge is induced inside the fifth piezoelectric layer 14100 by the piezoelectric effect. As a result, the positive charge is gathered near the surface on the output electrode layer 14200 side of the fifth piezoelectric layer 14100, and the negative charge is gathered near the surface on the ground electrode layer 1500 side of the fifth piezoelectric layer 14100. Similarly, if the external force along the negative direction of the C-axis is applied to the surface of the fifth piezoelectric layer 14100, the negative charge is gathered near the surface on the output electrode layer 14200 side of the fifth piezoelectric layer 14100, and the positive charge is gathered near the surface on the ground electrode layer 1500 side of the fifth piezoelectric layer 14100.

The sixth piezoelectric layer 14300 has the crystal axes which are the same as those of the fifth piezoelectric layer 14100, and is arranged in a state where the fifth piezoelectric layer 14100 is rotated around the B-axis by 180°.

If the external force along the positive direction of the C-axis is applied to the surface of the sixth piezoelectric layer 14300, the charge is induced inside the sixth piezoelectric layer 14300 by the piezoelectric effect. As a result, the positive charge is gathered near the surface on the output electrode layer 14200 side of the sixth piezoelectric layer 14300, and the negative charge is gathered near the surface on the ground electrode layer 1100 side of the sixth piezoelectric layer 14300. Similarly, if the external force along the negative direction of the C-axis is applied to the surface of the sixth piezoelectric layer 14300, the negative charge is gathered near the surface on the output electrode layer 14200 side of the sixth piezoelectric layer 14300, and the positive charge is gathered near the surface on the ground electrode layer 1100 side of the sixth piezoelectric layer 14300.

The piezoelectric layers such as the fifth piezoelectric layer 14100 and the sixth piezoelectric layer 14300 which generate the charge with respect to the external force (shearing force) along the surface direction of the layer are configured to have the Y cut quartz crystal plate in the embodiment. The fifth piezoelectric layer 14100 is arranged in a state where the third piezoelectric layer 13100 is rotated (displaced) around the A-axis by 90°. The sixth piezoelectric layer 14300 is arranged in a state where the fourth piezoelectric layer 13300 is rotated (displaced) around the A-axis by 90°.

The output electrode layer 14200 has a function of outputting the positive charge or the negative charge generated inside the fifth piezoelectric layer 14100 and inside the sixth piezoelectric layer 14300, as the charge Qcc. As described above, if the external force along the positive direction of the C-axis is applied to the surface of the fifth piezoelectric layer 14100 or the surface of the sixth piezoelectric layer 14300, the positive charge is gathered near the output electrode layer 14200. As a result, the positive charge Qcc is output from the output electrode layer 14200. In contrast, if the external force along the negative direction of the C-axis is applied to the surface of the fifth piezoelectric layer 14100 or the surface of the sixth piezoelectric layer 14300, the negative charge is gathered near the output electrode layer 14200. As a result, the negative charge Qcc is output from the output electrode layer 14200.

As described, the third sensor 1400, the second sensor 1300, and the first sensor 1200 are stacked so that force detection directions of the respective sensors are orthogonal to one another. In this manner, the respective sensors can induce the charge in response to force components orthogonal to one another. Therefore, the charge output element 10 can output the three charges Qaa, Qbb, and Qcc in response to the respective external forces (deformations) along three axes (A-axis, B-axis, and C-axis).

In the respective sensors 1200, 1300, and 1400, every two piezoelectric layers are arranged in a state where the piezoelectric layers are mutually rotated around the B-axis or the C-axis by 180°. In this manner, as compared to a case where each sensor is configured to have only one of the two piezoelectric layers and the output electrode layer, it is possible to increase the positive charge or the negative charge which is gathered near the output electrode layer. As a result, it is possible to increase the charge Q output from the output electrode layer.

Figure 27:
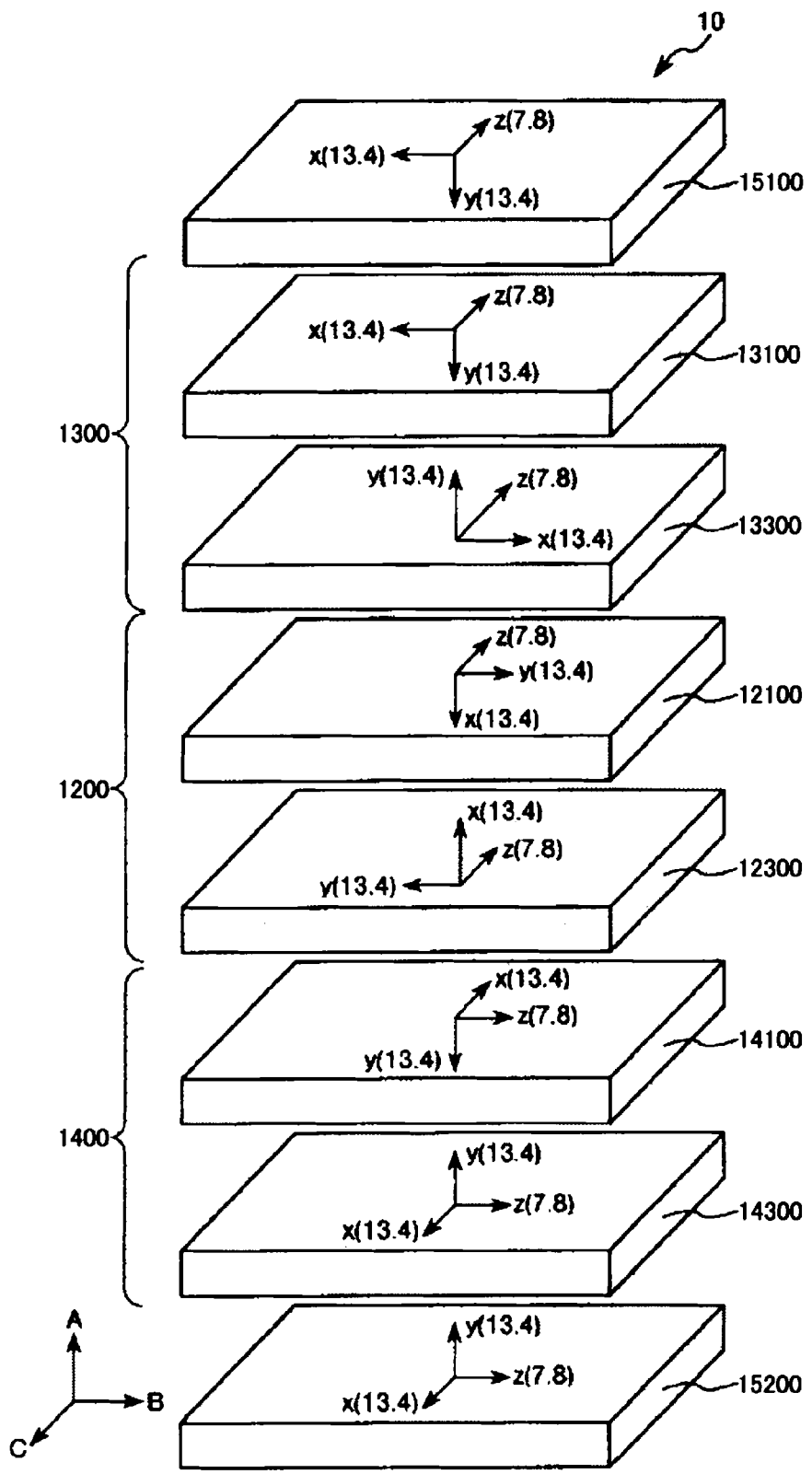
FIG. 27 is an exploded perspective view illustrating the thermal expansion coefficient and the crystal axis of the charge output element illustrated in FIG. 1.

The respective piezoelectric layers 12100, 12300, 13100, 13300, 14100, and 14300 have different thermal expansion coefficients in the x-axis direction, the y-axis direction, and the z-axis direction. In the respective piezoelectric layers 12100, 12300, 13100, 13300, 14100, and 14300, the thermal expansion coefficient in the x-axis direction is the same as the thermal expansion coefficient in the y-axis direction. The thermal expansion coefficient in the z-axis direction is smaller than the thermal expansion coefficients in the x-axis direction and in the y-axis direction. As illustrated in FIG. 27, in the respective piezoelectric layers 12100, 12300, 13100, 13300, 14100, and 14300, the thermal expansion coefficient in the x-axis direction is $13.4 \times 10$-6 (1/K), the thermal expansion coefficient in the y-axis direction is $13.4 \times 10$-6 (1/K), and the thermal expansion coefficient in the z-axis direction is $7.8 \times 10$-6 (1/K).

In the charge output element 10, a base material (first base material) 15100 and a base material (second base material) 15200 are disposed so as to interpose a stacked body in which the respective piezoelectric layers 12100, 12300, 13100, 13300, 14100, and 14300 are stacked therebetween, in the A-axis direction. That is, in the charge output element 10, the base material 15200, the sixth piezoelectric layer 14300, the fifth piezoelectric layer 14100, the second piezoelectric layer 12300, the first piezoelectric layer 12100, the fourth piezoelectric layer 13300, the third piezoelectric layer 13100, and the base material 15100 are stacked from the negative side in the A-axis direction sequentially in this order. The base materials 15100 and 15200 are configured to include an insulating material, and have a function of insulating the package 60 and the stacked body from a terminal electrode (not illustrated) disposed on side surfaces (surface whose normal axis is the B-axis direction and surface whose normal axis is the C-axis direction) of the ground electrode layers 1100, 1700, and the stacked body.

For example, when the base material 15100 is configured to include a glass plate whose thermal expansion coefficient in the B-axis direction is $3.3 \times 10$-6 (1/K), the base material 15100 has the thermal expansion coefficient which is different from the thermal expansion coefficient in the B-axis direction of the piezoelectric layer (in the embodiment, the third piezoelectric layer 13100) adjacent to the base material 15100. Therefore, for example, when the charge output element thermally expands or thermally contracts due to the temperature changes in the surrounding portion, the third piezoelectric layer 13100 and the glass plate have respectively different expansion rates or contraction rates in the B-axis direction.

If the thermal expansion occurs, a force is applied to the third piezoelectric layer 13100 in a direction of preventing the thermal expansion by the glass plate. As a result, the compressive stress in the B-axis direction is generated in the third piezoelectric layer 13100. In contrast, if the thermal contraction occurs, a force is applied to the third piezoelectric layer 13100 in a direction of preventing the thermal contraction by the glass plate. As a result, the tensile stress in the B-axis direction is generated in the third piezoelectric layer 13100.

The compressive stress and the tensile stress generated in the third piezoelectric layer 13100 are transmitted to the first piezoelectric layer 12100 and the second piezoelectric layer 12300 which are configured to have the X cut quartz crystal plate, via the output electrode layer 13200, the fourth piezoelectric layer 13300, and the ground electrode layer 1600.

In contrast, for example, when the base material 15200 is configured to include the glass plate whose thermal expansion coefficient in the B-axis direction is $3.3 \times 10$-6 (1/K), the base material 15200 similarly has the thermal expansion coefficient which is different from the thermal expansion coefficient in the B-axis direction of the piezoelectric layer (in the embodiment, the sixth piezoelectric layer 14300) adjacent to the base material 15200. Therefore, for example, when the charge output element thermally expands or thermally contracts due to the temperature changes in the surrounding portion, the sixth piezoelectric layer 14300 and the glass plate have respectively different expansion rates or contraction rates in the B-axis direction.

If the thermal expansion occurs, a force is applied to the sixth piezoelectric layer 14300 in the direction of preventing the thermal expansion by the glass plate. As a result, the compressive stress in the B-axis direction is generated in the sixth piezoelectric layer 14300. In contrast, if the thermal contraction occurs, a force is applied to the sixth piezoelectric layer 14300 in the direction of preventing the thermal contraction by the glass plate. As a result, the tensile stress in the B-axis direction is generated in the sixth piezoelectric layer 14300.

The compressive stress and the tensile stress generated in the sixth piezoelectric layer 14300 are transmitted to the first piezoelectric layer 12100 and the second piezoelectric layer 12300 which are configured to have the X cut quartz crystal plate, via the output electrode layer 14200, the fifth piezoelectric layer 14100, and the ground electrode layer 1500.

If the compressive stress or the tensile stress is generated in the first piezoelectric layer 12100 and the second piezoelectric layer 12300 in this way, the following problem occurs. Hereinafter, the problem will be described. However, since the first piezoelectric layer 12100 and the second piezoelectric layer 12300 have substantially the same configuration, the second piezoelectric layer 12300 will be described representatively.

As described above, the second piezoelectric layer 12300 is configured to have the X cut quartz crystal plate. Accordingly, when viewed in the C-axis direction, the second piezoelectric layer 12300 has a hexagonal unit crystal structure in which the Si atoms and the O atoms are alternately arranged in six apexes (refer to FIG. 29A). In the second piezoelectric layer 12300, the unit crystal structure is in a state where one diagonal line out of three diagonal lines connecting the Si atoms and the O atoms is substantially parallel to the thickness direction of the second piezoelectric layer 12300.

If the above-described compressive stress in the B-axis direction is applied to this second piezoelectric layer 12300, the unit crystal structure of the second piezoelectric layer 12300 is stretched in the A-axis direction as illustrated in FIG. 29B. Therefore, the O atoms close to the output electrode layer 12200 are brought into a state of being closer to the output electrode layer 12200 than the Si atoms adjacent thereto. The Si atoms close to the ground electrode layer 1100 are brought into a state being closer to the ground electrode layer 1100 than the O atoms adjacent thereto. As a result, in the output electrode layer 12200, the positive charge is gathered on the second piezoelectric layer 12300 side by electrostatic induction, and the negative charge is gathered on a side opposite to the second piezoelectric layer 12300 (first piezoelectric layer 12100 side). Accordingly, the negative charge is detected in the output electrode layer 12200.

In contrast, if the above-described tensile stress in the B-axis direction is applied to the second piezoelectric layer 12300, the unit crystal structure is crushed in the A-axis direction (not illustrated). Accordingly, the O atoms close to the output electrode layer 12200 are brought into a state of being further away from the output electrode layer 12200 than the Si atoms adjacent thereto. The Si atoms close to the ground electrode layer 1100 are brought into a state being further away from the ground electrode layer 1100 than the 0 atoms adjacent thereto. As a result, in the output electrode layer 12200, the negative charge is gathered on the second piezoelectric layer 12300 side by the electrostatic induction, and the positive charge is gathered on the side opposite to the second piezoelectric layer 12300 (first piezoelectric layer 12100 side). Accordingly, the positive charge is detected in the output electrode layer 12200.

As described above, when the base material 15100 and the base material 15200 are configured to include the glass plate, the charge output element may have a possibility of the problem in that the first piezoelectric layer 12100 and the second piezoelectric layer 12300 unintentionally detect the positive charge or the negative charge due to the influence of the temperature changes in the surrounding portion.

According to an aspect of the invention, in order to solve this problem, the base material 15100 and the base material 15200 are configured to have the Y cut quartz crystal plate. As illustrated in FIG. 27, the x-axis direction of the base material 15100 is coincident with the B-axis direction, the y-axis direction is coincident with the A-axis direction, and the z-axis direction is coincident with the C-axis direction. As described above, in the Y cut quartz crystal plate, the thermal expansion coefficient in the x-axis direction is $13.4 \times 10{-}6$ (1/K), the thermal expansion coefficient in the y-axis direction is $13.4 \times 10{-}6$ (1/K), and the thermal expansion coefficient in the z-axis direction is $7.8 \times 10{-}6$ (1/K). Therefore, both the thermal expansion coefficient in the B-axis direction (x-axis direction) of the third piezoelectric layer 13100 and the thermal expansion coefficient in the B-axis direction (x-axis direction) of the base material 15100 are $13.4 \times 10{-}6$ (1/K). That is, the thermal expansion coefficient in the B-axis direction (x-axis direction) of the third piezoelectric layer 13100 and the thermal expansion coefficient in the B-axis direction (x-axis direction) of the base material 15100 are coincident with each other in practice. In this manner, in the charge output element 10, when the third piezoelectric layer 13100 and the base material 15100 expand or contract due to the temperature changes, the third piezoelectric layer 13100 and the base material 15100 have the expansion rates and contraction rates in the B-axis direction which are coincident with each other in practice. The third piezoelectric layer 13100 and the base material 15100 expand or contract as much as each other due to the temperature changes. Accordingly, it is possible to prevent or suppress the compressive stress or the tensile stress from being generated in the third piezoelectric layer 13100. As a result, it is possible to suppress or prevent the compressive stress or the tensile stress from being transmitted to the first piezoelectric layer 12100 and the second piezoelectric layer 12300 via the output electrode layer 13200, the fourth piezoelectric layer 13300, and the ground electrode layer 1600. Therefore, it is possible to suppress or prevent the charge Qaa from being output from the output electrode layer 12200 due to the temperature changes.

In the description, the term "coincident in practice" means that a difference between the thermal expansion coefficient in the B-axis direction of the third piezoelectric layer 13100, and the thermal expansion coefficient in the B-axis direction of the base material 15100 and the thermal expansion coefficient in the B-axis direction of the base material 15200 is equal to or smaller than 1% of the thermal expansion coefficient of the third piezoelectric layer 13100 in the B-axis direction.

As illustrated in FIG. 27, the x-axis direction of the base material 15200 is coincident with the C-axis direction, the y-axis direction is coincident with the A-axis direction, and the z-axis direction is coincident with the B-axis direction. Therefore, both the thermal expansion coefficient in the B-axis direction (x-axis direction) of the sixth piezoelectric layer 14300 and the thermal expansion coefficient in the B-axis direction (x-axis direction) of the base material 15200 are $7.8 \times 10{-}6$ (1/K). That is, the thermal expansion coefficient in the B-axis direction (x-axis direction) of the sixth piezoelectric layer 14300 and the thermal expansion coefficient in the B-axis direction (x-axis direction) of the base material 15200 are coincident with each other in practice. In this manner, in the charge output element 10, when the sixth piezoelectric layer 14300 and the base material 15200 expand or contract due to the temperature changes, the sixth piezoelectric layer 14300 and the base material 15200 have the expansion rates and contraction rates in the B-axis direction which are coincident with each other in practice. The sixth piezoelectric layer 14300 and the base material 15200 expand or contract as much as each other due to the temperature changes. Accordingly, it is possible to prevent or suppress the compressive stress or the tensile stress from being generated in the sixth piezoelectric layer 14300. As a result, it is possible to suppress or prevent the compressive stress or the tensile stress from being transmitted to the first piezoelectric layer 12100 and the second piezoelectric layer 12300 via the output electrode layer 14200, the fifth piezoelectric layer 14100, and the ground electrode layer 1500. Therefore, it is possible to suppress or prevent the charge Qaa from being output from the output electrode layer 12200 due to the temperature changes.

As described above, in the charge output element 10, the first base material has the thermal expansion coefficient in the B-axis direction which is coincident in practice with the thermal expansion coefficient of the piezoelectric plate adjacent to the first base material among the first piezoelectric plate, the second piezoelectric plate, and the third piezoelectric plate. The second base material has the thermal expansion coefficient in the B-axis direction which is coincident in practice with the thermal expansion coefficient of the piezoelectric plate adjacent to the second base material among the first piezoelectric plate, the second piezoelectric plate, and the third piezoelectric plate. Therefore, when the first base material and the second base material expand or contract due to the temperature changes, the first base material and the second base material expand or contract as much as the piezoelectric plates adjacent to the first base material and the second base material. As a result, it is possible to suppress or prevent the compressive stress or the tensile stress from being generated in the piezoelectric plates adjacent to the first base material and the second base material due to the thermal expansion. Therefore, the first piezoelectric plate configured to have the X cut quartz crystal plate can suppress or prevent the charge from being output due to the temperature changes.

According to an aspect of the invention, when detecting the external force, the charge output element can suppress or prevent the charge from being output due to the temperature changes by using the same principle. Therefore, it is possible to further improve the detection accuracy of the charge output element.

Sixth Embodiment

Figure 28:
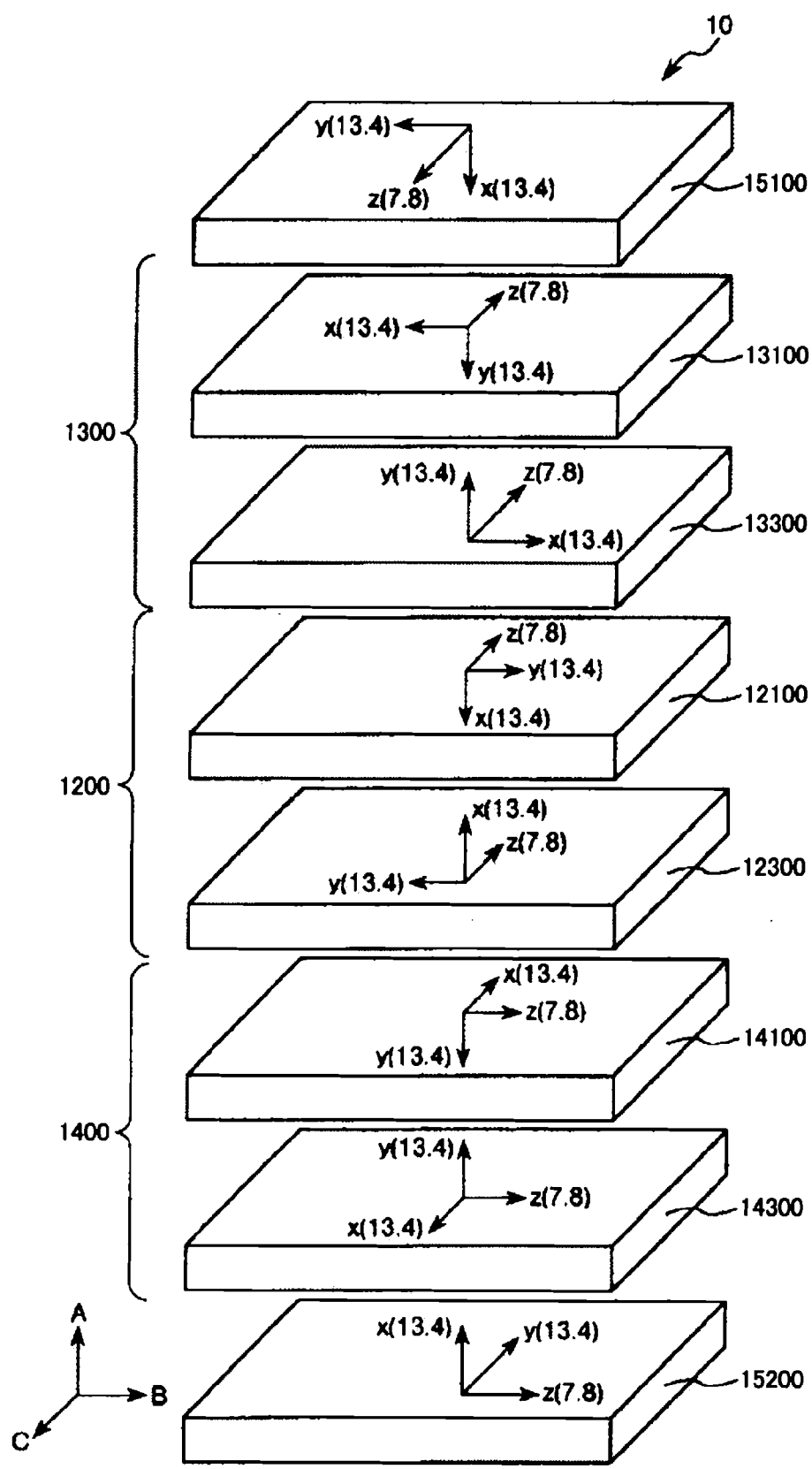
FIG. 28 is an exploded perspective view illustrating the second embodiment of the force detection device (sensor element) according to the invention.

FIG. 28 is an exploded perspective view illustrating a sixth embodiment of the force detection device (sensor element) of the invention.

Hereinafter, the sixth embodiment will be described by focusing on points different from those in the above-described fifth embodiment, and description of the same points will be omitted.

The base material 15100 and the base material 15200 according to the embodiment are configured to have the X cut quartz crystal plate. As illustrated in FIG. 28, the x-axis direction of the base material 15100 is coincident with the A-axis direction, the y-axis direction is coincident with the B-axis direction, and the z-axis direction is coincident with the C-axis direction. As described above, in the X cut quartz crystal plate, the thermal expansion coefficient in the x-axis direction is $13.4 \times 10^{-6}$ (1/K), the thermal expansion coefficient in the y-axis direction is $13.4 \times 10^{-6}$ (1/K), and the thermal expansion coefficient in the z-axis direction is $7.8 \times 10^{-6}$ (1/K). Therefore, both the thermal expansion coefficient in the B-axis direction (x-axis direction) of the third piezoelectric layer 13100 and the thermal expansion coefficient in the B-axis direction (y-axis direction) of the base material 15100 are $13.4 \times 10^{-6}$ (1/K). That is, the thermal expansion coefficient in the B-axis direction (x-axis direction) of the third piezoelectric layer 13100 and the thermal expansion coefficient in the B-axis direction (y-axis direction) of the base material 15100 are coincident with each other in practice. In this manner, in the charge output element 10, when the third piezoelectric layer 13100 and the base material 15100 expand or contract due to the temperature changes, the third piezoelectric layer 13100 and the base material 15100 have the expansion rates and contraction rates in the B-axis direction which are coincident with each other in practice. The third piezoelectric layer 13100 and the base material 15100 expand or contract as much as each other due to the temperature changes. Accordingly, it is possible to prevent or suppress the compressive stress or the tensile stress from being generated in the third piezoelectric layer 13100. As a result, it is possible to suppress or prevent the compressive stress or the tensile stress from being transmitted to the first piezoelectric layer 12100 and the second piezoelectric layer 12300 via the output electrode layer 13200, the fourth piezoelectric layer 13300, and the ground electrode layer 1600. Therefore, it is possible to suppress or prevent the charge Qaa from being output from the output electrode layer 12200 due to the temperature changes.

As illustrated in FIG. 28, the x-axis direction of the base material 15200 is coincident with the A-axis direction, the y-axis direction is coincident with the C-axis direction, and the z-axis direction is coincident with the B-axis direction. Therefore, both the thermal expansion coefficient in the B-axis direction (z-axis direction) of the sixth piezoelectric layer 14300 and the thermal expansion coefficient in the B-axis direction (z-axis direction) of the base material 15200 are $7.8 \times 10^{-6}$ (1/K). That is, the thermal expansion coefficient in the B-axis direction (z-axis direction) of the sixth piezoelectric layer 14300 and the thermal expansion coefficient in the B-axis direction (z-axis direction) of the base material 15200 are coincident with each other in practice. In this manner, in the charge output element 10, when the sixth piezoelectric layer 14300 and the base material 15200 expand or contract due to the temperature changes, the sixth piezoelectric layer 14300 and the base material 15200 have the expansion rates and contraction rates in the B-axis direction which are coincident with each other in practice. The sixth piezoelectric layer 14300 and the base material 15200 expand or contract as much as each other due to the temperature changes. Accordingly, it is possible to prevent or suppress the compressive stress or the tensile stress from being generated in the sixth piezoelectric layer 14300. As a result, it is possible to suppress or prevent the compressive stress or the tensile stress from being transmitted to the first piezoelectric layer 12100 and the second piezoelectric layer 12300 via the output electrode layer 14200, the fifth piezoelectric layer 14100, and the ground electrode layer 1500. Therefore, it is possible to suppress or prevent the charge Qaa from being output from the output electrode layer 12200 due to the temperature changes.

Hitherto, the sensor element, the force detection device, the robot, the electronic component transport device, the electronic component inspection device, and the component processing device according to the invention have been described with reference to the illustrated embodiments. However, the invention is not limited thereto. The configurations of each unit can be replaced with any desired configuration which has the same function. In addition, any other configuration may be added to the invention.

The invention may be configured so that any two or more configurations (characteristics) within the above-described embodiments are combined with one another.

In the invention, the package may be omitted.

In the invention, the element may protrude from the first convex portion in a plan view of the first substrate.

In the invention, the element may protrude from the second convex portion in the plan view of the first substrate.

In the invention, for example, instead of the pressurizing bolts, those which do not have a function of pressurizing the element may be used. In addition, a fixing method other than the bolts may be employed.

The robot according to the invention is not limited to an arm-type robot (robot arm). As long as the robot has the arm, the robot may be another type of robot such as a scalar robot, and a legged walking (travelling) robot, for example.

Without being limited to the robot, the electronic component transport device, the electronic component inspection device, and the component processing device, the force detection device (sensor element) according to the invention can also be applied to other devices, for example, such as another transport device, another inspection device, measuring devices including a vibrometer, an accelerometer, a gravimeter, a dynamometer, a seismometer, and an inclinometer, or an input device.

What is claimed is:

1. A sensor element comprising:
when three axes orthogonal to one another are set to be an A-axis, a B-axis, and a C-axis,
at least one first piezoelectric plate that is configured to have an X cut quartz crystal plate and outputs a charge in response to an external force along the A-axis direction;
at least one second piezoelectric plate that is configured to have a Y cut quartz crystal plate, that is stacked in the A-axis direction with the first piezoelectric plate, and that outputs a charge in response to the external force in the B-axis direction; and
at least one third piezoelectric plate that is configured to have a Y cut quartz crystal plate, that is stacked in the A-axis direction so as to interpose the second piezoelectric plate between the first piezoelectric plate and the third piezoelectric plate, and so as to be arranged to turn around the A-axis, and that outputs a charge in response to the external force in the C-axis direction.

2. The sensor element according to claim 1,
wherein the first piezoelectric plate and the second piezoelectric plate have respective thermal expansion coefficients in the B-axis direction which are coincident with each other in practice.

3. The sensor element according to claim 1,
wherein the first piezoelectric plate, the second piezoelectric plate, and the third piezoelectric plate respectively have a z-axis which is a crystal axis, an x-axis which is orthogonal to the z-axis, and which is oriented in a direction where the charge is generated when a load is applied, and a y-axis which is orthogonal to the z-axis and the x-axis, and
wherein the y-axis direction of the first piezoelectric plate is coincident with the B-axis direction.

4. The sensor element according to claim 3,
wherein the x-axis direction of the second piezoelectric plate is coincident with the B-axis direction.

5. The sensor element according to claim 3,
wherein in the first piezoelectric plate, the second piezoelectric plate, and the third piezoelectric plate, the respective thermal expansion coefficients in the z-axis direction are smaller than the respective thermal expansion coefficients in the x-axis direction and the y-axis direction.

6. The sensor element according to claim 1,
wherein in the second piezoelectric plate and the third piezoelectric plate, respective thermal expansion coefficients in the B-axis direction are different from each other.

7. The sensor element according to claim 1,
wherein a plurality of the first piezoelectric plates, the second piezoelectric plates, and the third piezoelectric plates are respectively stacked.

8. The sensor element according to claim 7,
wherein a plurality of the first piezoelectric plates, the second piezoelectric plates, and the third piezoelectric plates are stacked in the direction of the A-axis direction sequentially in this order.

9. A sensor element which has three stacked piezoelectric plates whose thermal expansion coefficient in at least one direction out of an x-axis direction, a y-axis direction, and a z-axis direction which are orthogonal to one another is different, and which outputs a charge generated by deformation in respectively different directions,
wherein when three directions orthogonal to one another are set to be an A-axis, a B-axis, and a C-axis, the three piezoelectric plates are stacked on one another in the A-axis direction, and
wherein the three piezoelectric plates have respective thermal expansion coefficients in the B-axis direction which are coincident with one other in practice, so that the charge is not generated even if stress is generated in the B-axis direction due to thermal expansion.

10. A force detection device comprising:
a sensor element including when three axes orthogonal to one another are set to be an A-axis, a B-axis, and a C-axis, at least one first piezoelectric plate that is configured to have an X cut quartz crystal plate and outputs a charge in response to an external force along the A-axis direction, at least one second piezoelectric plate that is configured to have a Y cut quartz crystal plate, that is arranged to oppose the first piezoelectric plate, and that outputs a charge in response to the external force along the B-axis direction, and at least one third piezoelectric plate that is configured to have a Y cut quartz crystal plate, that is arranged on a side of the second piezoelectric plate which is opposite to the first piezoelectric plate in a state where the third piezoelectric plate is displaced from the second piezoelectric plate around an axis in a thickness direction of the second piezoelectric plate, and that outputs a charge in response to the external force along the C-axis direction; and
an external force detection circuit that detects the external force, based on a voltage output from the sensor element.

11. The force detection device according to claim 10,
wherein four or more of the sensor elements are disposed.

12. A robot comprising:
at least one arm connection body that has a plurality of arms and is formed by rotatably connecting the arms adjacent to each other within the plurality of arms;
an end effector that is disposed on a distal end side of the arm connection body; and the force detection device according to claim 10, which is disposed between the arm connection body and the end effector, and which detects an external force applied to the end effector.

13. A robot comprising:
at least one arm connection body that has a plurality of arms and is formed by rotatably connecting the arms adjacent to each other within the plurality of arms;
an end effector that is disposed on a distal end side of the arm connection body; and
the force detection device according to claim 11, which is disposed between the arm connection body and the end effector, and which detects an external force applied to the end effector.

14. An electronic component transport device, comprising:
a grip unit that grips an electronic component; and
the force detection device according to claim 10, which detects an external force applied to the grip unit.

15. An electronic component transport device, comprising:
a grip unit that grips an electronic component; and
the force detection device according to claim 11, which detects an external force applied to the grip unit.

16. An electronic component inspection device, comprising:
a grip unit that grips an electronic component;
an inspection unit that inspects the electronic component; and
the force detection device according to claim 10, which detects an external force applied to the grip unit.

17. An electronic component inspection device, comprising:
a grip unit that grips an electronic component;
an inspection unit that inspects the electronic component; and
the force detection device according to claim 11, which detects an external force applied to the grip unit.

18. A component processing device comprising:
a tool displacement unit which has a tool mounted thereon and displaces the tool; and
the force detection device according to claim 10, which detects an external force applied to the tool.

19. A component processing device comprising:
a tool displacement unit which has a tool mounted thereon and displaces the tool; and
the force detection device according to claim 11, which detects an external force applied to the tool.

* * * * *